United States Patent
Hunt et al.

(10) Patent No.: US 12,095,264 B2
(45) Date of Patent: Sep. 17, 2024

(54) INTEGRATED POWER PRODUCTION AND STORAGE SYSTEMS

(71) Applicant: Mitsubishi Power Americas, Inc., Lake Mary, FL (US)

(72) Inventors: David Hunt, DeLand, FL (US); David McDeed, Altamonte Springs, FL (US); Mark Peak, Deltona, FL (US); Peter Luessen, Charlotte, NC (US); Brian Allen, Longwood, FL (US); Jeanfils Saint-Cyr, Orlando, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 18/140,381

(22) Filed: Apr. 27, 2023

(65) Prior Publication Data

US 2023/0291232 A1    Sep. 14, 2023

Related U.S. Application Data

(63) Continuation of application No. 17/446,597, filed on Aug. 31, 2021, now Pat. No. 11,670,960.

(Continued)

(51) Int. Cl.
*H02J 3/38* (2006.01)
*F02C 3/20* (2006.01)
(Continued)

(52) U.S. Cl.
CPC .............. *H02J 15/008* (2020.01); *F02C 3/20* (2013.01); *F02C 6/00* (2013.01); *H02J 3/32* (2013.01);
(Continued)

(58) Field of Classification Search
CPC .. H02J 15/008; H02J 3/32; H02J 3/381; H02J 3/18; H02J 2300/24; H02J 2300/28;
(Continued)

(56) References Cited

U.S. PATENT DOCUMENTS 7,645,930 B2    1/2010  Kelly et al.
11,162,181 B2   11/2021 Harano et al.
(Continued)

FOREIGN PATENT DOCUMENTS

CN    111826669 A     10/2020
DE    102021122661 A1  3/2022

OTHER PUBLICATIONS

U.S. Appl. No. 17/446,597, filed Aug. 31, 2021, Integrated Power Production and Storage Systems.
(Continued)

*Primary Examiner* — Gerald L Sung
*Assistant Examiner* — Rene D Ford
(74) *Attorney, Agent, or Firm* — Schwegman Lundberg & Woessner, P.A.

(57) ABSTRACT

A power plant is configured to output power to a grid power system and comprises a hydrogen generation system configured to produce hydrogen, a gas turbine combined cycle power plant comprising a gas turbine engine configured to combust hydrogen from the hydrogen generation system to generate a gas stream that can be used to rotate a turbine shaft and a heat recovery steam generator (HRSG) configured to generate steam with the gas stream of the gas turbine engine to rotate a steam turbine, a storage system configured to store hydrogen produced by the hydrogen generation system, and a controller configured to operate the hydrogen generation system with electricity from the grid power system when the grid power system has excess energy and balance active and reactive loads on the grid power system (Continued)

using at least one of the hydrogen generation system and the gas turbine combined cycle power plant.

22 Claims, 29 Drawing Sheets

Related U.S. Application Data

(60) Provisional application No. 63/233,383, filed on Aug. 16, 2021, provisional application No. 63/174,275, filed on Apr. 13, 2021, provisional application No. 63/073,282, filed on Sep. 1, 2020.

(51) Int. Cl.
  *F02C 6/00* (2006.01)
  *H02J 3/32* (2006.01)
  *H02J 15/00* (2006.01)
  *H02J 3/18* (2006.01)

(52) U.S. Cl.
  CPC .......... *H02J 3/381* (2013.01); *F05D 2220/32* (2013.01); *F05D 2220/76* (2013.01); *H02J 3/18* (2013.01); *H02J 2300/24* (2020.01); *H02J 2300/28* (2020.01); *Y02E 20/16* (2013.01); *Y02E 60/36* (2013.01)

(58) Field of Classification Search
  CPC . H02J 2300/20; H02J 3/28; H02J 3/46; F02C 3/20; F02C 6/00; F05D 2220/32; F05D 2220/76; Y02E 20/16; Y02E 10/56; Y02E 20/14; Y02E 50/10; Y02P 80/15; Y02T 50/60; F01K 23/101
  See application file for complete search history.

(56) References Cited

U.S. PATENT DOCUMENTS

| | | |
|---|---|---|
| 11,670,960 B2 | 6/2023 | Hunt et al. |
| 2005/0198963 A1* | 9/2005 | Wai .................. F01K 13/02 60/698 |
| 2006/0053792 A1 | 3/2006 | Bourgeois |
| 2010/0232191 A1 | 9/2010 | Mabuchi et al. |
| 2012/0312018 A1 | 12/2012 | Anderson |
| 2013/0240369 A1 | 9/2013 | Mcalister |
| 2013/0252121 A1 | 9/2013 | Oppenheim |
| 2016/0028236 A1 | 1/2016 | Lansing, Jr. et al. |
| 2017/0110880 A1* | 4/2017 | Chen ................ H02M 7/493 |
| 2019/0319285 A1 | 10/2019 | Milos |
| 2021/0262100 A1 | 8/2021 | Marushima et al. |
| 2021/0317588 A1* | 10/2021 | Falk .................... C25B 9/65 |
| 2021/0344291 A1 | 11/2021 | Clayton et al. |
| 2022/0065162 A1 | 3/2022 | Hunt et al. |
| 2023/0291231 A1 | 9/2023 | Hunt et al. |

OTHER PUBLICATIONS

"U.S. Appl. No. 17/446,597, Examiner Interview Summary mailed Dec. 28, 2022", 2 pgs.
"U.S. Appl. No. 17/446,597, Non Final Office Action mailed Nov. 9, 2022", 17 pgs.
"U.S. Appl. No. 17/446,597, Notice of Allowance mailed Feb. 2, 2023", 11 pgs.
"U.S. Appl. No. 17/446,597, Response filed Jan. 4, 2023 to Non Final Office Action mailed Nov. 9, 2022", 12 pgs.
"U.S. Appl. No. 18/140,341, Non Final Action with Restriction Requirement mailed Sep. 21, 2023", 20 pgs.
"U.S. Appl. No. 18/140,341, Notice of Allowance mailed May 7, 2024", 8 pages.
"U.S. Appl. No. 18/140,341, Corrected Notice of Allowability mailed May 29, 2024", 7 pages.

* cited by examiner

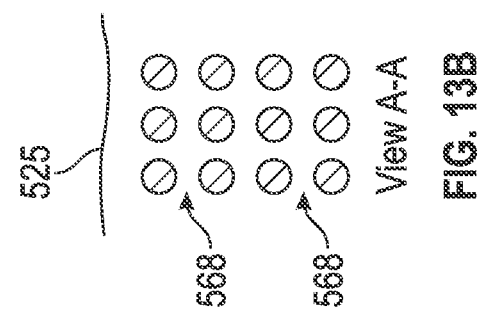
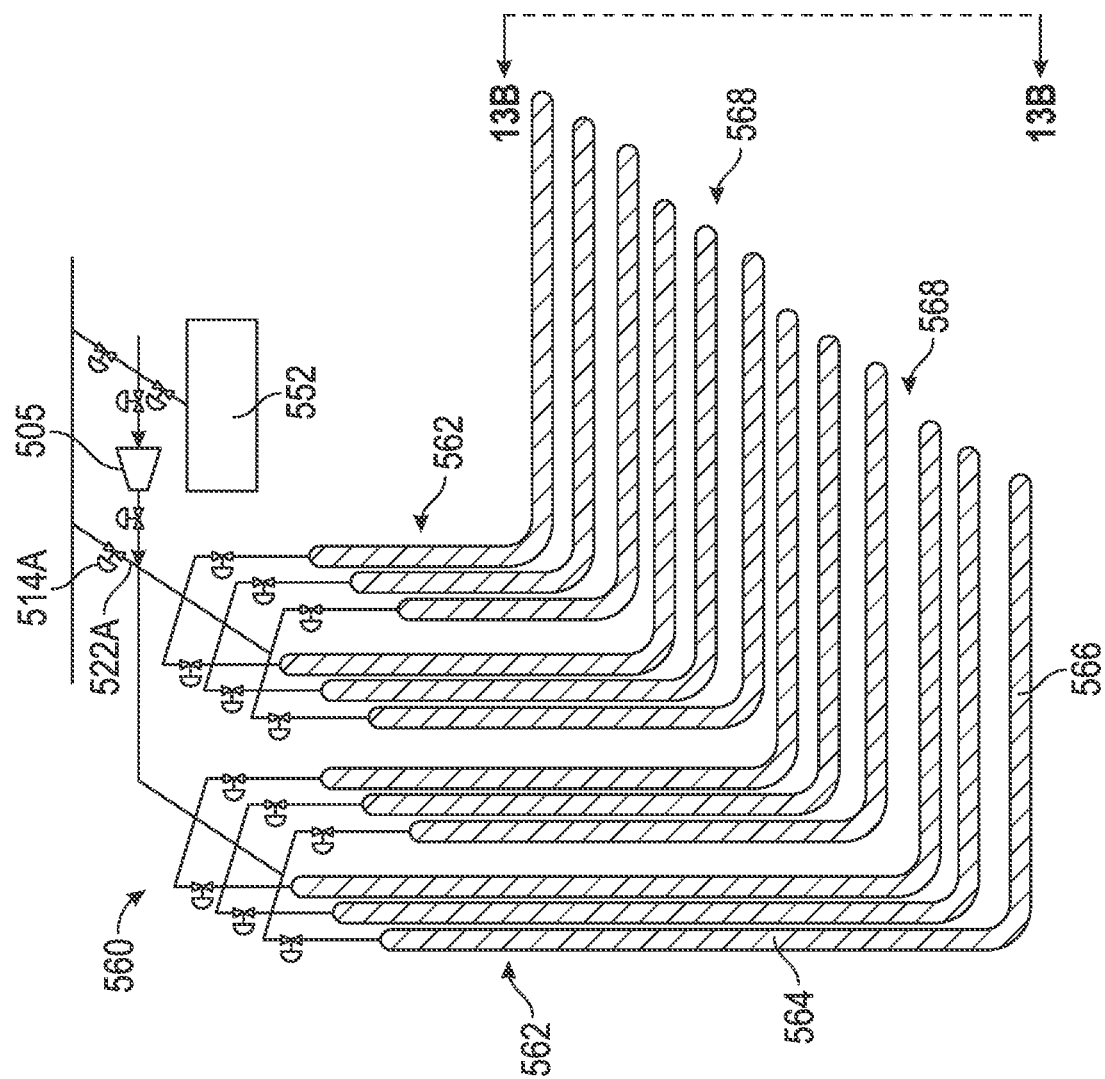

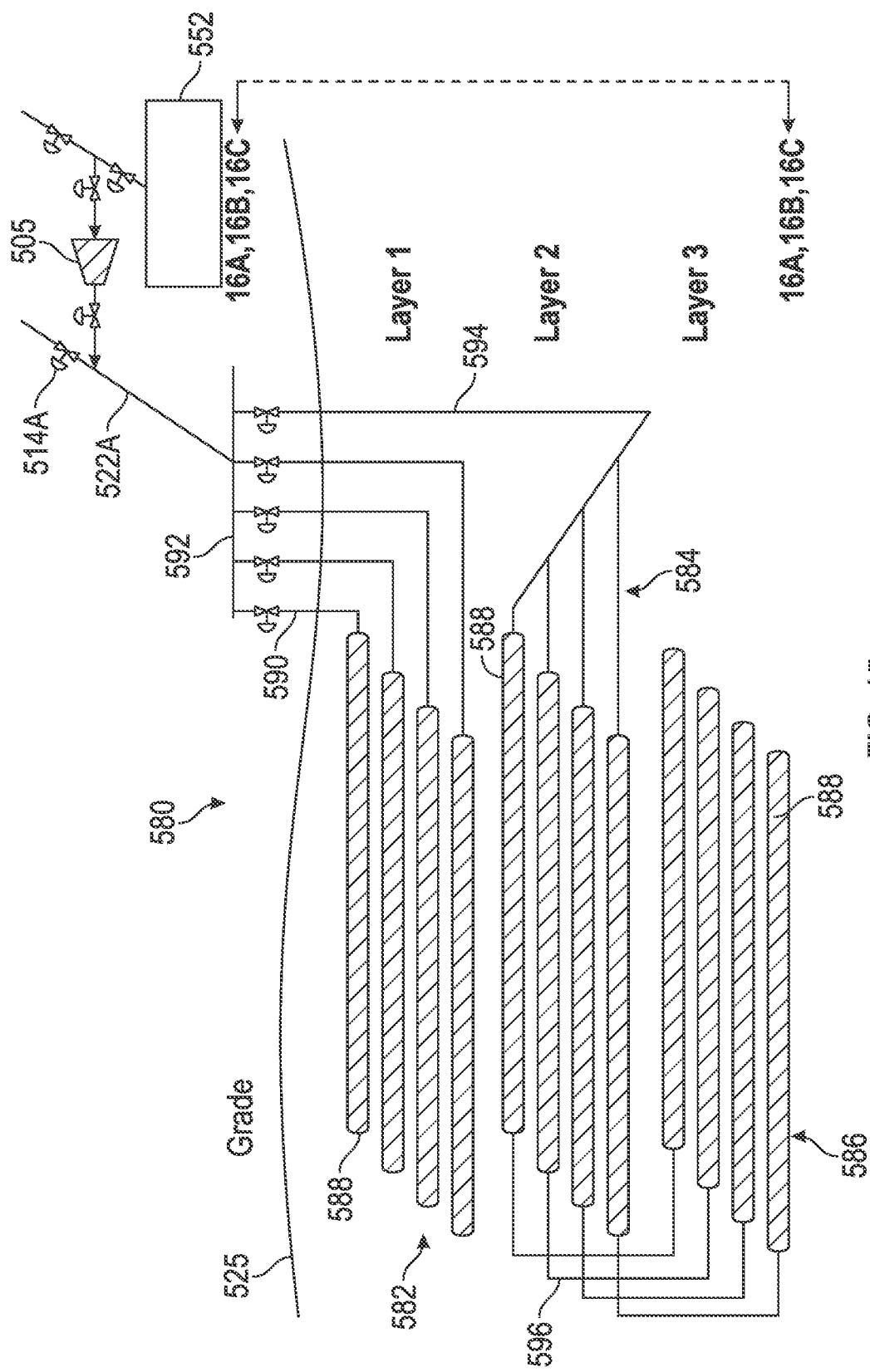

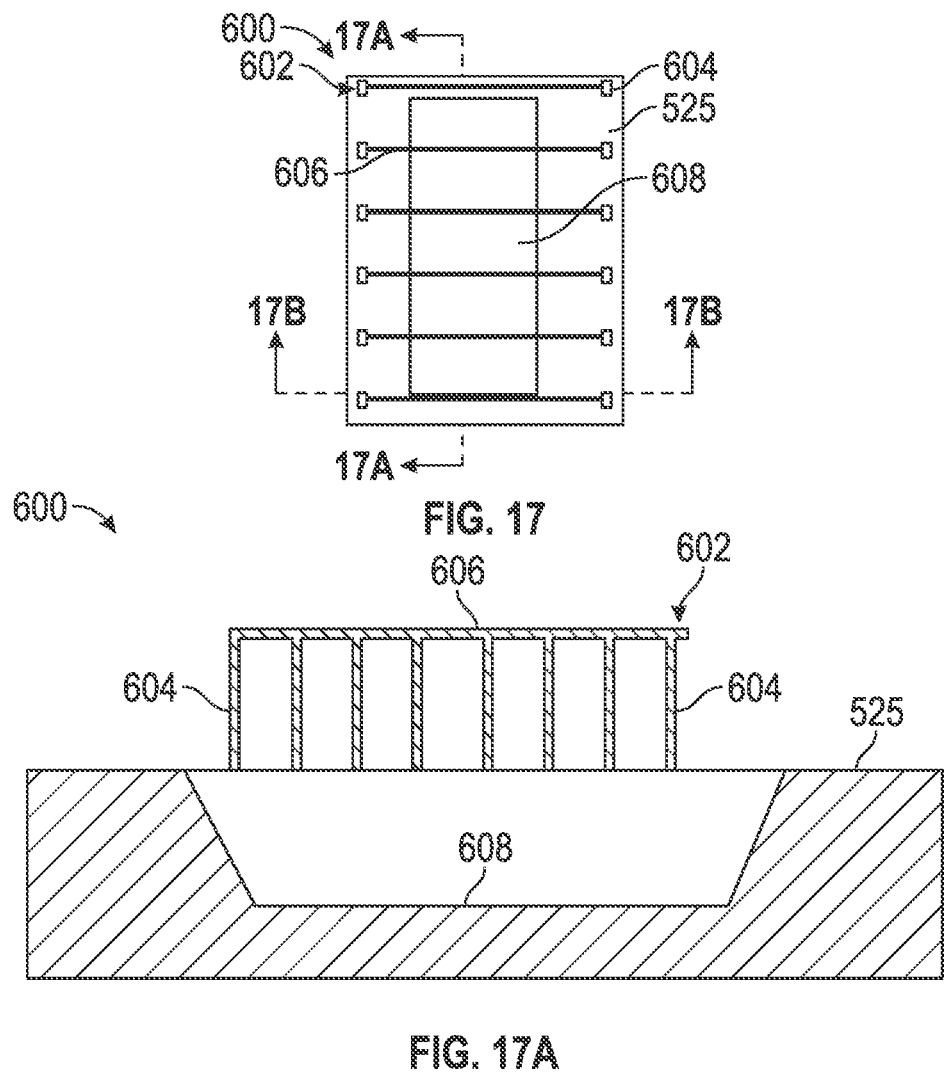
FIG. 17
FIG. 17A
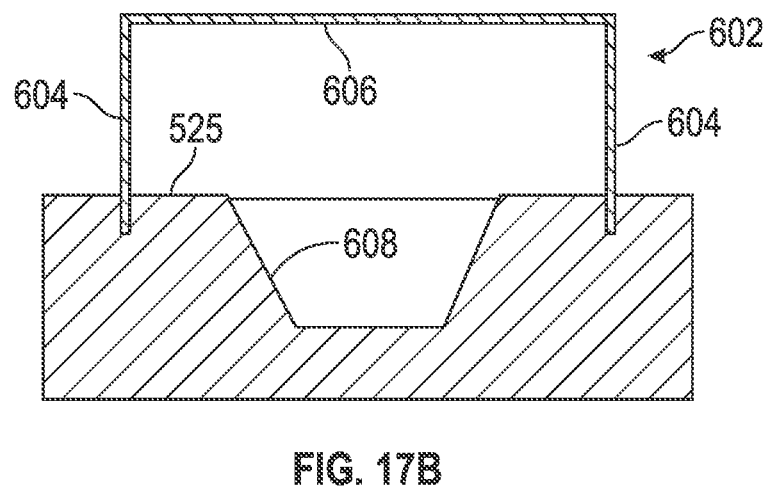
FIG. 17B

INTEGRATED POWER PRODUCTION AND STORAGE SYSTEMS

CROSS-REFERENCE TO RELATED APPLICATION

This patent application is a continuation of U.S. patent application Ser. No. 17/446,597, filed Aug. 31, 2021, which application claims the benefit of priority to U.S. Provisional Patent Application Nos. 63/073,282, filed Sep. 1, 2020; 63/174,275, filed Apr. 13, 2021; and 63/233,383 filed Aug. 16, 2021, each of which are incorporated by reference herein in their entirety

TECHNICAL FIELD

This document pertains generally, but not by way of limitation, to combined-cycle power plants used to generate electricity. More specifically, but not by way of limitation, the present application relates to production, use and storage of hydrogen and oxygen in combined-cycle power plants that can be integrated into manufacturing or production facilities.

BACKGROUND

The grid is a mechanism to balance aggregate energy demand of consumers with aggregate energy supply of power producers, including renewable energy sources and traditional power plants, such as those that burn fossil fuels.

Renewable energy sources can comprise sources of energy that do not include combustion or release of $CO_2$. Typical renewable energy sources include hydroelectric, solar and wind. Solar and wind, particularly, are intermittent and unpredictable.

Power plants can comprise a means to generate power on demand using fuels, such as fossil fuels or hydrogen derived from various sources. Fossil fuels can comprise coal, natural gas or fuel oil. Typical power plants comprise a gas turbine and an electrical generator, and frequently include a steam turbine in a combined-cycle configuration. The gas turbine and steam turbine can create electric power from mechanical energy converted from combustion of fuel and associated steam generation processes.

Consumers of electricity comprise any user of electrical power. Consumers can be a residential consumers, commercial consumers or industrial consumers. Consumers can use energy in different ways, thereby placing widely differing demands on the grid.

Apparent Power, Real Power and Reactive Power

Electric circuits are comprised of different types of power producers, or "generators," and power consumers or "loads." Generators produce power that flows to the loads, and is subsequently returned to the generator to complete the circuit. Active Loads are purely resistive loads that generate no magnetic field and convert electrical power purely to other forms of energy, with examples being heaters and incandescent light bulbs. Reactive Loads are those that generate a magnetic field in order to convert electrical power to other forms of energy, such as rotating mechanical power as in induction motors or sound as in speakers. When Reactive Loads are present in an electric circuit, it appears that more power is supplied by the generator to the loads ("Apparent Power") than the power consumed by the loads ("Real Power") and there exists a difference in the alignment between the voltage and current, known as phase alignment, due to the requirement to generate the magnetic fields. In an AC Circuit, Apparent Power (S) is the product of the voltage (V) and the current (I) given by the equation (S=VI). The amount of phase alignment between voltage and current is represented by the angle ($\Phi$) and has a range of negative ($-$) 90 degrees to positive ($+$) 90 degrees. A phase angle $\Phi$=zero represents voltage and current are in full phase alignment and S=VI represents not only the Apparent Power, but also the Real Power (P) and S=P=VI. This corresponds to a circuit containing purely Active Loads and containing no Reactive Loads. In circuits where Reactive Loads are present, voltage and current are out of phase due to the requirement to create the magnetic fields and it appears that more power is supplied by the generator than is consumed by the loads and $\Phi$ represents the amount of alignment, or phase angle, between voltage and current, and Real Power is given by the equation P=VI cos($\Phi$). The difference between Apparent Power and Real Power is given by the relationship $S=(P^2+Q^2)(\frac{1}{2})$ with Q being defined as "Reactive Power." Reactive Power is then the difference between the Apparent Power and Real Power developed in a circuit, with Reactive Power given by the relationship Q-VI sin($\Phi$) and measured in a unit known as Volt-Amp-Reactive or VAR. Reactive Power can be generated within a generator by raising or lowering the voltage that generates the magnetic field (the "Excitation Voltage") or by managing the amount of reactive loads within a circuit such as dispatching them on or off to manage the overall system VAR flow. Failure to manage balance flows of both Active and Reactive Power can result in fluctuations in both voltage and frequency within a power system leading to damage to electrical equipment.

An Inverter is an electrical device that converts direct current electrical power to alternating current electrical power.

A Rectifier is an electrical device that converts alternating current electrical power to direct current electrical power.

As mentioned, various factors can have a substantial impact on grid stability. Specifically, (1) when a large industrial consumer initiates (or discontinues) use of large quantities of power; or (2) when there are large variations in the demand for power by residential and/or commercial consumers during a) peak periods, such as morning and evening, versus off-peak periods, such as over-night and mid-day and b) seasonal variations in demand such as cooling load in summer, heating load in winter and relatively low demand for either in spring and fall; or (3) when the types of loads change on a system, such as large amounts of active loads being initiated or discontinued such as lighting with the rise and fall of daylight, and electric heaters that are initiated or discontinued as occurs with changing temperatures within the winter season; or (4) when the types of generation available changes, such as wind, solar, nuclear or fossil fuels with changing weather patterns at both a local, regional and national scale, either (a) in the short term in the case of changing weather systems or (b) on a seasonal basis as occurs with the transition from spring to summer to autumn to winter; or 5) how the consumers use the power can influence Active and Reactive power availability in addition to system voltage and frequency. For example, use of large inductive motors by one consumer can result in the need for large quantities of reactive power, which, in effect, can reduce the availability of real power to be used by other consumers or can impact the voltage and frequency on the grid that needs to be adjusted to avoid damage to electrical components and devices. Such demands need to be balanced with all of the aforementioned changes to Apparent Power, Real Power and Reactive Power (collectively, along with other such similar changes in the grid, referred to hereafter as "Active and Reactive Power Changes").

According to the aforementioned Active and Reactive Power Changes, the grid must react to maintain balance between supply and demand of Active Power, Reactive Power, system voltage and frequency. The way the grid currently reacts is to cause at least some suppliers of power from both power plants and renewable sources to increase or reduce their output of Real Power in terms of the amount of watts provided to maintain balance and to change the nature of their operation to balance Reactive Power by providing or consuming the same in terms of the VARS consumed or provided. These various supplies and demands of Active Power, Reactive Power, system voltage and frequency are typically operating in isolation from one another with only the grid controller managing Active and Reactive Power Changes. Such external management can be complex and can require many instances of power producers starting and stopping and varying output levels, which introduces inefficiencies into the overall system.

Overview

The present inventors have recognized, among other things, that problems to be solved in power plants can include inefficient production, usage and storage of electrical power, particularly as consumers change power demand and power producers attempt to react to the changes in demand.

The present inventors have recognized that, ideally, the grid desires to consume as much renewable energy as possible because such energy is perceived to be supplied at lower cost with reduced environmental impacts relative to traditional power plants utilizing fossil fuels. However, availability of such renewable energy is intermittent and unpredictable. The sun is only available for part of the day, and wind is unpredictable, and the availability of both forms of energy varies with the seasons. Therefore, as the supply of renewable energy or demand fluctuates, the output of power plants and reactive power balance is requested to fluctuate. Additionally, as the demand and reactive power balance fluctuates, in some instances measures can be taken to reduce supply from the renewable sources, such as to reduce wind turbine blade pitch. However, this is sub-optimal, as it represents a lost opportunity to utilize power with lower cost and reduced environmental impacts. In some areas where the supply of solar energy is plentiful, power plants can be requested to be "off" (generate no power) during the day and "on" during the evening.

However, a power plant represents a complex system that has substantial physical and thermal mass. These systems often require substantial periods of time to start up or shut down in order to avoid damage that can result from severe thermal gradients associated with a rapid transition in power output. Further, complex systems are typically designed to provide optimum performance at a particular design point, and operation at other points is often sub-optimal. For example a gas turbine is often designed to provide optimum efficiency and emissions outputs at a specific base power output, and operation at other power outputs is less efficient and/or results in increased unfavorable emissions. Therefore, it is desirable that gas turbine power plants: (1) operate as close to their base output design point; and (2) avoid the severe thermal gradients associated with rapid output transition.

In response to system Active and Reactive Power Changes, and a desire to obtain maximum consumption of renewable energy, the grid can ordinarily command a power plant to increase or reduce its power output to match the reduced demand, often at rates of change that are detrimental to the power plant.

The present subject matter can help provide solutions to these problems and other problems, such as by using novel thermal and electrical integration of various equipment, short term and long term storage systems and strategies, and novel operational concepts and controls. The various systems of the present disclosure can 1) stabilize a gas turbine operating profile, 2) provide consistent Active and Reactive Power over a range of scenarios within a power system grid, 3) provide rapid response to the changing demand for Active and Reactive Power 4) provide voltage and frequency support to the grid, 4) maximize the utilization of renewable energy available, and 5) reduce the carbon dioxide emissions of the gas turbine power plant in either simple cycle or combined cycle configurations during fluctuations in renewable energy supply and consumer demand.

For example, under normal circumstances, electrolyzers take time to start operating at large volumes of power consumption due to the need to heat the water within the units. However, through novel integration of the combustion turbine power plant and electrolyzers, the water can be maintained at operating temperature such that in response to a large industrial consumer ceasing its demand for power, the grid can command the electrolyzer to immediately begin to consume electricity to convert water into hydrogen and oxygen gas. For example, the feed water to an electrolyzer can first be conditioned by passing through, or being bled off of, a heat recovery steam generator (HRSG) that captures heat energy from a gas turbine to create steam to drive a steam turbine. If the electrolyzer capacity is equal to or greater than the amount of power that the consumer had been using, initiation of conversion of water can maintain grid balance without any need to alter the operating profile of the gas turbine.

At the same time that the electrolyzer begins to convert water ($H_2O$) into H2 ($H_2$) and O2 ($O_2$), the gas turbine can alter its operation such that it begins to consume H2 and likewise decrease its consumption of fossil fuel (i.e., natural gas or fuel oil). In this manner, the grid can maintain balance while maximizing its use of renewable energy, avoiding severe transitions in gas turbine loading, and reducing consumption and the corresponding purchase and environmental costs associated with combustion of fossil fuel. H2 can be blended with other fuels, or can be the only fuel consumed by the gas turbine. In any event, consumption of H2 represents an improvement in gas turbine emissions, since the only combustion product of H2 is water vapor.

Further, the control system can utilize intelligence to alter operation of the gas turbine. For example, if the control system has reason to expect that the consumer demand will not increase for some time, it can elect to shut down the gas turbine at a transition rate that avoids development of damaging thermal gradients, and in a manner that is most efficient and reduces environmental emissions. As the output of the gas turbine transitions, so can the consumption of the electrolyzer, thereby providing an inherently balanced transition.

Additionally, through the use of inverters and rectifiers, the electrolyzer can be used to balance the reactive power on the grid.

Further, the electrolyzer can be coupled with H2 storage, which can enhance even further the flexibility provided by the system. With sufficient H2 storage, during periods of peak supply, (such as when supply can dramatically outpace demand and the grid would otherwise request the shutdown of the gas turbine or curtail the production of renewable sources), the system can allow the gas turbine to operate at its optimum design point and avoid such curtailment. In such a situation, the surplus power (i.e., difference between supply and demand) can be used to power the electrolyzer to generate and store H2 gas.

Ideally, during such periods, power generation capacity of H2 output of the electrolyzer will exceed the power generation of the gas turbine, such that the gas turbine will be operated at its design point on 100% H2 gas and hydrogen can be stored for future use. In such a scenario, the gas turbine will be operating at its most efficient point with emissions of only water vapor.

The system can utilize differing amounts of H2 storage depending upon the needs. As explained above, the grid balancing benefit and reduction of emissions while avoiding severe thermal gradients can be accomplished with minimal storage. However, with the addition of storage these benefits can be enhanced by allowing maximum use of renewable energy while continuing operation of the gas turbine at its optimum design point (or with sufficiently long transition points to minimize damaging thermal gradients).

For those instances where it is desired to optimize storage, a transportation pipeline can offer substantial storage. For example, it is known that a gas turbine operating at 500 Megawatts power output will consume approximately 27 tons of H2 per hour of operation when operating at 100% H2 content. Typical fuel pressures for gas turbine operation are approximately less than 800 pounds per square inch (psi). A 24 inch diameter pipe with minimum wall thickness of 0.834 inches has sufficient strength to withstand 3,000 psig of H2 gas. Each (1) mile length of such pipe can contain 4.6 tons of H2 gas when cycled between 3,000 psig and 800 psig. That is, each 6 miles of pipe can store 27.6 tons of H2 which can provide approximately one hour of operation of a gas turbine at 500 MW.

If a gas turbine is located sufficient distance from the H2 source, the transportation pipeline itself can provide sufficient storage. Additionally, if the gas turbine and H2 source are co-located, a pipeline, or multiple pipelines, each with one end capped or connected together to form a closed system can be run from the site to some distance away from the site forming an artificial underground storage vessel. However, if additional, onsite storage is necessary or desired, the arrangement of pipes as shown herein can provide an improved storage arrangement. The arrangement of pipes described herein can include alternating arrays of pipe, in an inverted pyramid, arranged underground, with construction fill therebetween. In practice, the construction fill is arranged to provide the inverted pyramid geometry, and the pipes are laid upon each other. Because of hoop strength and the inverted pyramid geometry, no internal framework or structure is necessary.

In an example, a power plant can be configured to output power to a grid power system and can comprise a hydrogen generation system configured to produce hydrogen, a gas turbine combined cycle power plant comprising a gas turbine engine configured to combust hydrogen from the hydrogen generation system to generate a gas stream that can be used to rotate a turbine shaft and a heat recovery steam generator (HRSG) configured to generate steam with the gas stream of the gas turbine engine to rotate a steam turbine, a storage system configured to store hydrogen produced by the hydrogen generation system, and a controller configured to operate the hydrogen generation system with electricity from the grid power system when the grid power system has excess energy and balance active and reactive loads on the grid power system using at least one of the hydrogen generation system and the gas turbine combined cycle power plant.

In another example, a power plant can be configured to output power to a grid power system and can comprise an electrolyzer configured to produce hydrogen and oxygen, a gas turbine combined cycle power plant comprising a gas turbine engine configured to combust hydrogen from the hydrogen generation system to generate a gas stream that can be used to rotate a turbine shaft and a heat recovery steam generator (HRSG) configured to generate steam with the gas stream of the gas turbine engine to rotate a steam turbine, a storage system configured to store hydrogen produced by the hydrogen generation system, and a nozzle configured to introduce oxygen from the electrolyzer into the HRSG of the gas turbine combined cycle power plant.

In an additional example, a method of combusting fuel using a thermal nozzle can comprise (A) providing oxidant having an oxygen concentration of at least 30 volume percent at an initial velocity less than 300 fps within an oxidant supply duct communicating with a combustion zone, (B) providing fuel separately from oxidant into the oxidant supply duct at a high velocity of greater than 200 feet per second and greater than said oxidant initial velocity entraining oxidant into the high velocity fuel, combusting up to about 20 percent of the oxygen of the oxidant provided into the oxidant supply duct with the fuel to produce heat and combustion reaction products in a combustion reaction, and further entraining combustion reaction products and oxidant into the combustion reaction, (C) mixing combustion reaction products with remaining oxygen of the oxidant within the oxidant supply duct and raising the temperature of remaining oxidant within the oxidant supply duct, and (D) passing heated oxidant out from the oxidant supply duct into the combustion zone at an exit velocity which exceeds the initial velocity by at least 300 feet per second, wherein the heated oxidant passes out of the oxidant supply duct from a plurality of orifices arranged in different orientations.

In an example, a power plant configured to output power to a grid power system can comprise an electrolyzer configured to produce hydrogen and oxygen, a power converter electrically connecting the electrolyzer to the grid power system, a gas turbine combined cycle power plant comprising a gas turbine engine configured to combust hydrogen from the hydrogen generation system to generate a gas stream that can be used to rotate a turbine shaft and a heat recovery steam generator (HRSG) configured to generate steam with the gas stream of the gas turbine engine to rotate a steam turbine, a storage system configured to store hydrogen produced by the hydrogen generation system, and a controller configured to balance active and reactive loads on the grid power system using at least one of the power converter, the hydrogen generation system and the gas turbine combined cycle power plant.

In an example, a method of operating an integrated power plant connected to a grid power system can comprise operating a gas turbine engine to drive a first electric generator to provide power to the grid power system, the gas turbine engine operable on at least one of hydrogen and natural gas, operating an electrolyzer to generate hydrogen and oxygen with electricity from the grid power system, storing hydrogen produced by the electrolyzer in a storage system, and coordinating operation of the gas turbine engine and electrolyzer to power demand of the grid power system.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIGS. 13A and 13B are schematic diagrams illustrating perspective and end views of a plurality of vertically disposed piping systems including pipes with directional change.

FIG. 15 is a schematic diagram illustrating a side view of a plurality of horizontally disposed piping systems arranged in a plurality of levels.

FIGS. 17-17B are schematic diagrams illustrating top and side views of an overhead support structure for fabricating and installing piping systems.

Figure 1A:
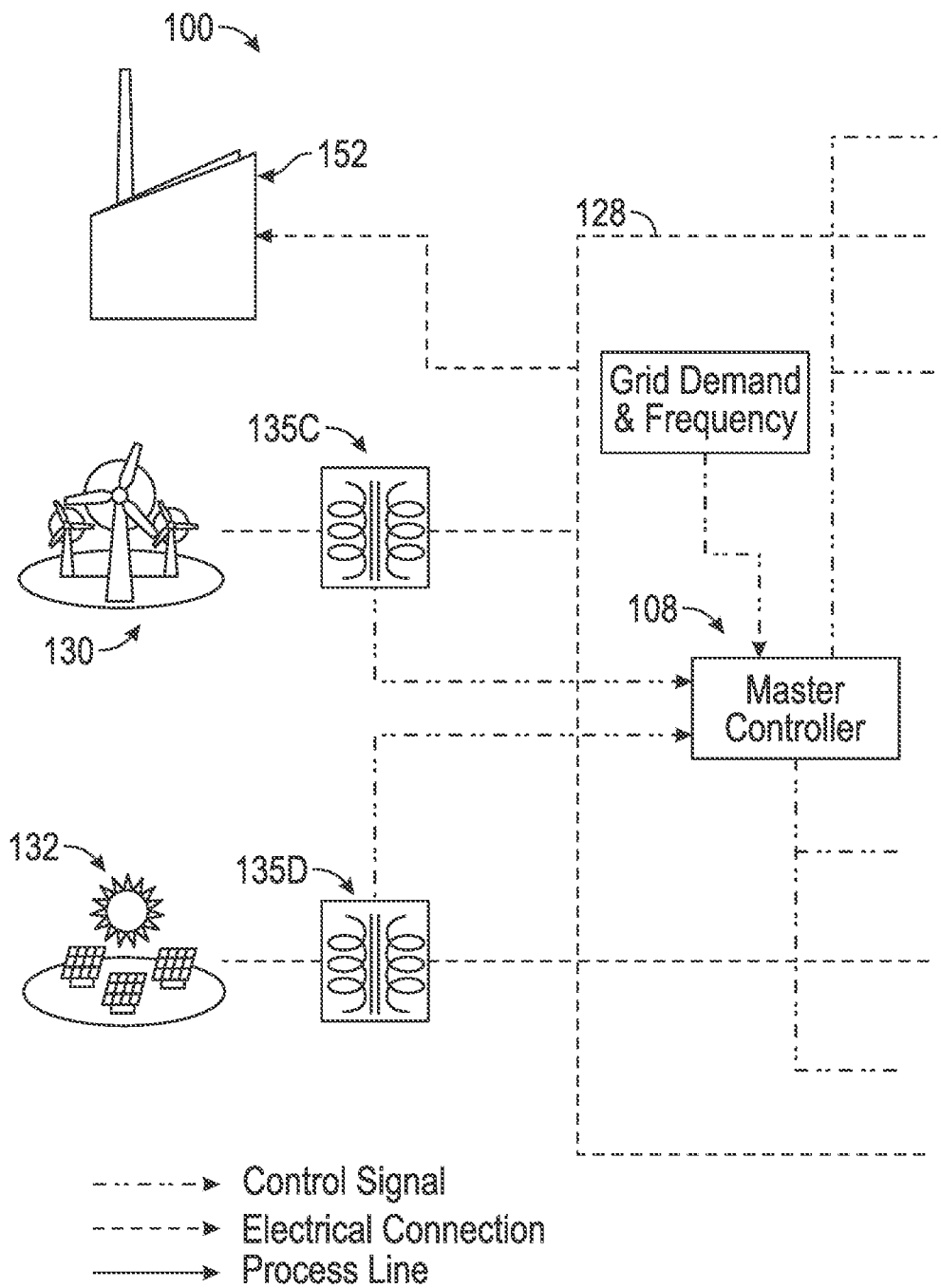
FIGS. 1A and 1B are a schematic diagram illustrating an integrated power production system comprising a combined cycle gas turbine power plant (GTCC), a hydrogen production system, a hydrogen storage system, and a controller.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1B:
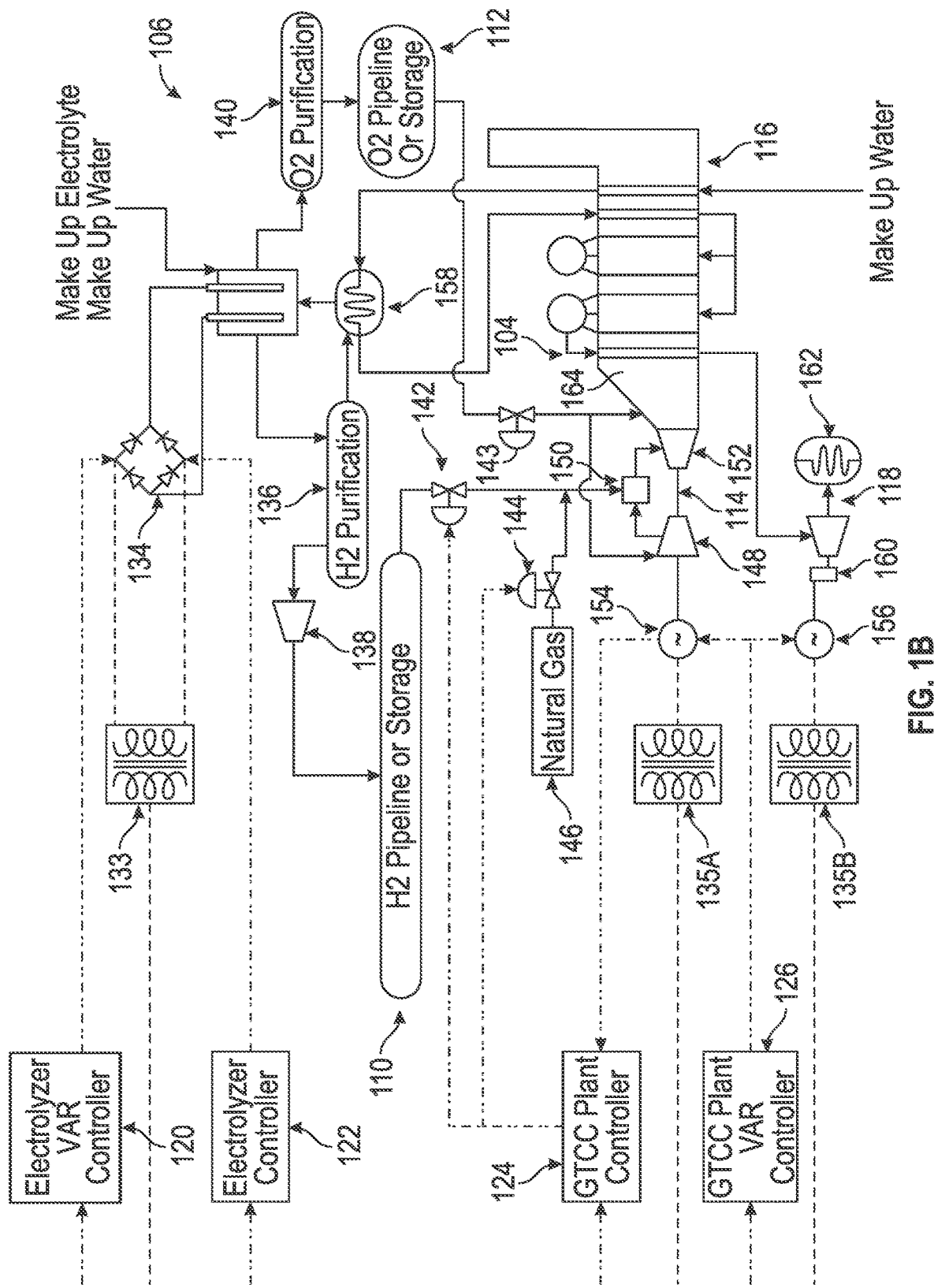

FIGS. 1A and 1B are a schematic diagram illustrating integrated power production system 100 that provides many advantages over standard and prior art systems. System 100 can include combined cycle gas turbine power plant (GTCC) 104, hydrogen production system 106, and controller 108.

Control signals between various components and systems are designated via dash/dot lines, electrical connections through which electricity can flow are designated via dashed lines, and process lines, through which gases or fluids can flow, are designated via solid lines.

In examples, hydrogen production system 106 can comprise an electrolyzer that also produces oxygen. Power production system 100 can also include either or both of hydrogen storage system 110 and oxygen storage system 112.

GTCC 104 can comprise gas turbine 114, heat recovery steam generator 116, and steam turbine 118.

Controller 108 can be connected to hydrogen production system 106 via controllers 120 and 122. Controller 108 can be connected to GTCC 104 via controllers 124 and 126.

Grid 128 provides electrical connection between various supplies of electricity, such as renewable wind electricity sources 130, renewable photovoltaic solar electricity sources 132 or combined cycle gas turbine power plant 104, and consumers 152 of electricity. Example consumers 152 include residential homes, commercial buildings, and industrial facilities. Different consumers 152 can utilize varying levels of active and reactive power.

Although only one consumer 152, one renewable wind electricity source 130, one renewable photovoltaic solar electricity source 132, one GTCC 104, one hydrogen production system 106, one hydrogen storage system 110 and one oxygen storage system 112 are shown in FIGS. 1A and 1B, power production system 100 can include multiple instances of each, either at the same geographic locations or dispersed over a large geographic region.

Master controller 108, among other things, provides command signals to the various supplies of electricity, including wind electricity sources 130, solar electricity sources 132, and gas turbine 104, to ensure that the total supply and demand for electricity remains balanced. Master controller 108, in conjunction with electrolyzer production and VAR set point controllers 122, 120, respectively, and GTCC output and VAR setpoint controllers 124, 126, respectively, can ensure balance between supply and demand of active power, reactive power, system voltage and frequency. Master controller 108 can also regulate when hydrogen is produced, or consumed, and when power is dispatched by using the stored hydrogen or producing H2 for storage. As discussed with reference to FIGS. 4 and 10, for example, power production system 100 can additionally include various battery storage systems for short term storage of power and reactive load regulation, as described herein. As discussed with reference to FIG. 8, for example, integrated power production system 100 can additionally be integrated with industrial plants that consume power from grid 128 and that can receive various inputs from system 100.

Decisions of master controller 108 can be made based on market conditions, renewable power availability, grid electricity costs, and other factors. Thus, master controller 108 can manage power production from renewable wind electricity sources 130, renewable photovoltaic solar electricity sources 132 and combined cycle gas turbine power plant 104 based on demand on grid 128, weather conditions and other factors, while also managing hydrogen production of hydrogen production system 106 using, for example, consumption of hydrogen and oxygen in GTCC 104 and industrial facility 350 (FIG. 8) and long term and short term storage of energy in the form of hydrogen and oxygen storage in hydrogen storage system 110 and oxygen storage system 112, respectively, and power in various batteries.

Electricity from grid 128 can be first provided to transformer 133 to transform the voltage of grid 128 to a selected voltage that is optimized for operation of power converter 134 to convert AC power to DC power. In examples, converter 134 can be a rectifier and can be receptive of alternating current (AC) from grid 128, and productive of direct current (DC) as can be optimal for operation of electrolyzers of hydrogen production system 106. Converter 134 can additionally be a hybrid converter as described herein. GTCC 104, steam turbine 118, wind electricity sources 130 and solar electricity sources 132 can be provided with transformers 135A-135D, respectively, to transform voltage of generated power to a voltage compatible with grid 128.

Hydrogen production system 106 can be connected to hydrogen purification system 136, which can use hydrogen compressor 138 to provide hydrogen to hydrogen storage system 110, and oxygen purification system 140, which can provide oxygen to oxygen storage system 112. Hydrogen purification system 136 can comprise a palladium membrane hydrogen purifier, a dense thin-metal membrane purifier, a pressure swing adsorption system, a catalytic recombination or deoxygenation purifier, or an electrochemical purifier, as well as others. Oxygen purification system 140 can utilize a cryogenic distillation process or a vacuum swing adsorption process. Valve 142 can be used to control flow of stored hydrogen to gas turbine 114. Valve 143 can be used to control flow of stored oxygen to HRSG 116. Valve 144 can be used to control flow of natural gas to gas turbine 114. Natural gas can be provided via natural gas source 146. Controller 108 can control flow of hydrogen, oxygen and natural gas to GTCC 104 based on factors described herein (e.g., availability of renewable energy) to optimize total output (e.g., power and hydrogen) of system 100.

Combined cycle gas turbine power plant 104 includes gas turbine 114, heat recovery generator (HRSG) 116, and steam turbine 118. The functions and operation of combined cycle gas turbine power plant 104 will be appreciated by one of skill in the art and many of the details of which are not described here for brevity. Gas turbine 114 includes compressor 148, combustor 150, and turbine 152. Compressor 148, turbine 150 and electrical generator 154 can be physically connected via one or more shafts, and turn together. Air is introduced to compressor 148, compressor 148 compresses the air, and fuel is introduced to the compressed air in combustor 150. The fuel is ignited, and the combustion products have greatly increased temperature and pressure (and energy) relative to that of the compressed air. The high energy combustion products expand in turbine 152 driving compressor 148 and electrical generator 154.

Figure 8:
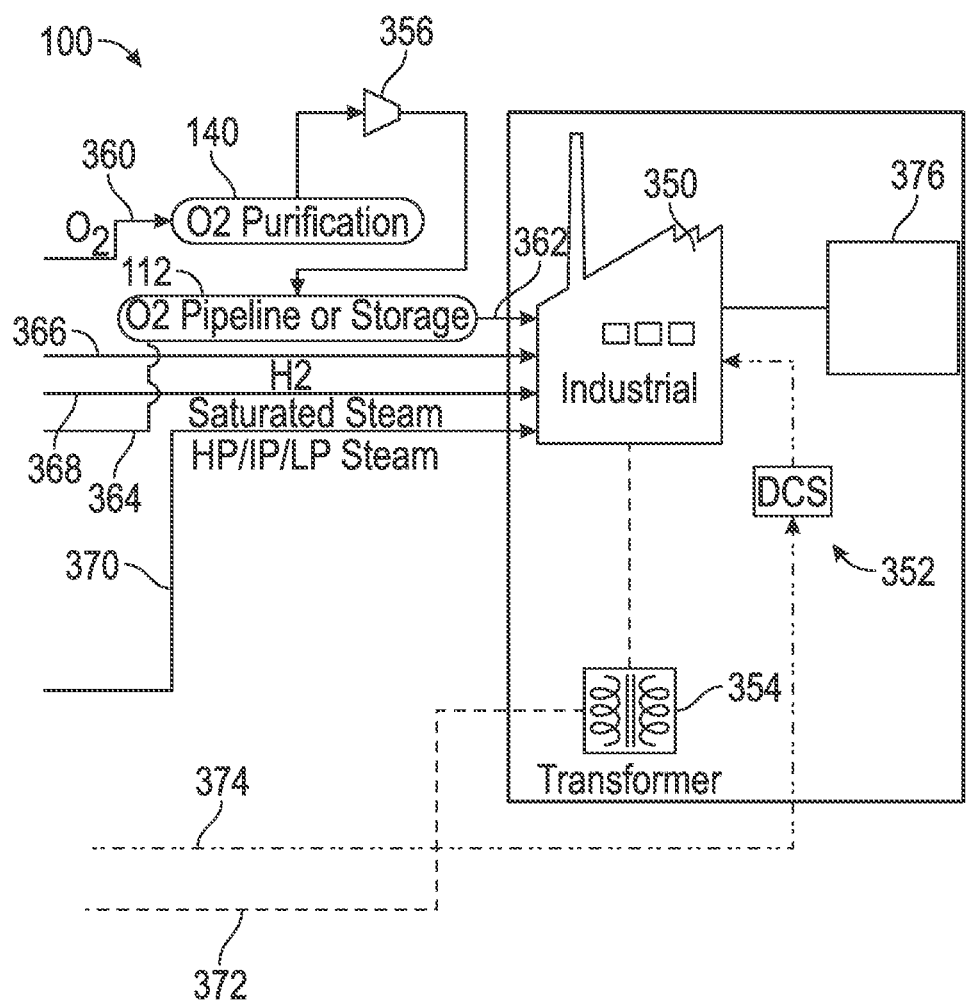
FIG. 8 is a schematic diagram illustrating a poly-generation facility comprising a combined cycle power plant, renewable energy producers, hydrogen and oxygen storage systems and, an electrolyzer connected to an industrial power consumer or plant.

After the high energy combustion products exit gas turbine 114, they are referred to as exhaust gas, and are channeled through HRSG 116. HRSG 116 can include one or more heat exchange assemblies that transfer heat from the exhaust gas to water. The water can be in the form of liquid water or steam. HRSG 116 can have various stages to produce steam at particular properties of temperature and pressure. Furthermore, as is discussed with reference to FIG. 3, heat from the steam can be used to warm electrolyzers of hydrogen production system 106 using, for example, heat exchanger 158 or heat exchanger 162. The steam is then directed to steam turbine 118, which can be physically connected to generator 156 via clutch 160. In examples, clutch 160 can be omitted. From steam turbine 118, the steam can flow into heat exchanger 162, such as a condenser in which the steam can be cooled. Heat from steam and water from HRSG 116 can additionally be put into another system, as is shown in FIG. 8, for example. Generator 156 can, in some examples, be the same generator connected to gas turbine 114, or in other examples can be a separate generator (as is shown in FIGS. 1A and 1B). The steam can expand within steam turbine 118, and transfer torque to generator 156 to create electricity. Thereafter the steam can be condensed to liquid water and return to HRSG 116 to be reheated to the particular properties. As is customary, it will be appreciated that the water can circulate between HRSG 116 and steam turbine 118 in a loop.

In examples, controller 108 is a master controller that is in signal communication with at least of one of electrolyzer VAR (volt-ampere reactive) set point controller 120, electrolyzer production set point controller 122, GTCC plant output controller 124, and GTCC plant VAR setpoint controller 126, each of which can be responsive to command signals provided by master controller 108 as described in further detail below.

Hydrogen production system 106 can produce hydrogen using a number of different processes. Thermochemical processes use heat and chemical reactions to release hydrogen from organic materials, such as fossil fuels and biomass, or from materials like water. Water (H2O) can also be split into hydrogen (H2) and oxygen (O2) using electrolysis or solar energy. Microorganisms such as bacteria and algae can produce hydrogen through biological processes.

In examples, hydrogen production system 106 comprises an electrolyzer. The electrolyzer can be an electrical device that can operate to consume electricity to convert water into its constituent elements, hydrogen and oxygen. Generally, electrolyzers consume direct current electrical power and utilize converter 134 to convert alternating current to direct current. Hydrogen can be stored in hydrogen storage system 110, which can comprise a tank, pipeline, salt cavern or other geologic repository, such as those discussed with reference to FIGS. 11-16F. The electrolyzer of hydrogen production system 106 is generally receptive of inputs of water and electricity, and productive of hydrogen gas and oxygen gas, as would be appreciated by one of skill in the art.

Electricity can be provided via distribution grid 128. Grid 128 can obtain electricity from one or more of a variety of electrical sources, such as renewable wind electricity sources 130 and renewable photovoltaic solar electricity sources 132. Grid 128 can also obtain electricity from other sources, such as from hydroelectric sources, nuclear sources, one or both of generators 154 and 156 of gas turbine 114 and steam turbine 118, respectively, of combined cycle gas turbine plant 104 or other gas turbine generators connected to grid 128.

The operation of the electrolyzer of hydrogen production system 106 can be responsive to production set point controller 122. Production set point controller 122 can control the amount of direct current to provide to the electrolyzer. Provision of direct current and water to the electrolyzer is directly related to the production of hydrogen gas and oxygen gas.

The operation of the electrolyzer of hydrogen production system 106 can also be responsive to electrolyzer VAR set point controller 120. VAR set point controller 122 can control the amount of alternating current that is converted to direct current to be provided to the electrolyzer.

Power inverters convert DC to AC power. Power inverters are grid connected devices that allow for putting power into grid 128. Typical use of power inverters is unidirectional, and can be at photovoltaic solar electricity sources 132 or fuel cells, for example.

In examples, converter 134 can include thyristor rectifier technology with transistor electronics, that can convert 1, 2, or 3 phase AC power to DC power. Such DC power output is typically unidirectional, not smooth, and is commonly used for electroplating, DC processes, and electrolyzer stacks.

In examples, converter 134 can include chopper rectifier technology, with a combination of silicon controlled rectifiers (SCRs) and insulated-gate bipolar transistors (IGBTs), that convert 1, 2, or 3 phase AC power to DC power. Such DC power output is typically unidirectional, not smooth and is commonly used for electroplating, DC processes, and electrolyzer stacks.

In examples, converter 134 can be a power conversion system (PCS) that will use IGBTs, and PWM (pulse wave modulation) to convert 1, 2 and 3 phase AC power to DC as well as taking DC power from a source, such as an electrochemical battery or wind or solar generators, and convert the DC power to AC power. Such PCSs are bidirectional and both AC and DC are "clean", close to pure waveforms, with no harmonics or "ripple", and is the typical technology used to provide active and reactive power services to grid 128.

In examples, converter 134 can be a "hybrid power conversion" system. The hybrid power conversion system can use the PCS topology on the AC (grid 128) connected side and the chopper/thyristor topology on the DC side connected to the electrolyzer of hydrogen production system 106. This will produce "non-clean" DC suitable for use by the electrolyzer to perform electrolysis at a lower cost, while providing a "clean" AC power capable of adjusting phase angle and providing reactive power services to grid 128. It will be appreciated that this hybrid power conversion will be capable of providing valuable grid services such as the reactive power services typically provided by full PCS topology at a lower total cost. Because the "hybrid power conversion" system can be connected to grid 128 and provide reactive services, it can be desirable to be certified to UL Standard UL1741 or equivalent. Examples of hybrid power conversions systems for converter 134 are discussed further with reference to FIG. 10.

It will be appreciated that the electrolyzer of hydrogen production system 106 can be receptive of water and DC electricity from converter 134 to produce hydrogen gas and oxygen gas. Some examples of the electrolyzer can also require an input of electrolyte, such as potassium hydroxide. The hydrogen gas can proceed to hydrogen purification system 136, hydrogen compressor 138, and into hydrogen storage system 110. Likewise, the oxygen gas can proceed to oxygen purification system 140 and into oxygen storage system 112. A similar oxygen compressor (e.g., compressor 356 of FIG. 8) can optionally be used. Although examples have been described herein as hydroxide electrolytic electrolyzes, it will be appreciated that the scope of the disclosure is not so limited, and is contemplated to include other electrolyzer arrangements, such as polymer electrolyte membrane (PEM) electrolysis units.

Hydrogen storage system 110 can include a salt cavern to store the hydrogen gas. In some examples, hydrogen storage system 110 can include one or more lengths of pipe or pressure vessels such as "bullet" shape or spheres that are highly pressurized to store the hydrogen. Examples of hydrogen storage system 110 are described in greater detail with reference to FIGS. 11-16F.

The hydrogen gas within the hydrogen storage system 110 can be used as a fuel, and provided to combustor 150 of gas turbine 114. Flow valves 142 and 144 can be responsive to GTCC plant output controller 124 to provide a flow of hydrogen and natural gas fuels to gas turbine 114. Under some conditions, controller 124 can command valves 142 and 144 such as to provide only one fuel (either natural gas or hydrogen) to gas turbine 114. Under other conditions, controller 124 can command valves 142 and 144 such as to provide a blend of both natural gas and hydrogen to gas turbine 114.

Relative to natural gas, combustion of hydrogen occurs at a higher temperature. Higher temperature combustion can be expected to result in increased production of oxides of nitrogen (NOx). In examples, the oxygen from oxygen storage system 112 can be provided, as "hot oxygen", to inlet duct 164 of the HRSG 116 to reduce the production of NOx, such as by using nozzle 300 of FIG. 9.

While examples of the disclosure have been described with regard to the use of hydrogen as an energy storage medium, it will be appreciated that the scope of the disclosure is not so limited, and that other energy storage mediums can be created with excess renewable energy for later use as a fuel (or carrier of energy, the decomposition of which can yield a fuel, including hydrogen, for example), such as ammonia, for example.

As is discussed below with reference to TABLE 1, integrated power production system 100 can be operated to utilize available resources to produce energy for direct consumption or storage, via production of hydrogen that can be stored or electricity that can be stored. In addition, for example, use of renewable energy and hydrogen fuel can be increased, either by using renewable energy sources when available or stored hydrogen produced during periods of low demand to reduce emission of GTCC 104. Thus, for example, overall operation of GTCC 104 can be smoothed out to eliminate or reduce ramp up and ramp down periods of inefficient and high mechanical demand operation.

Figure 2:
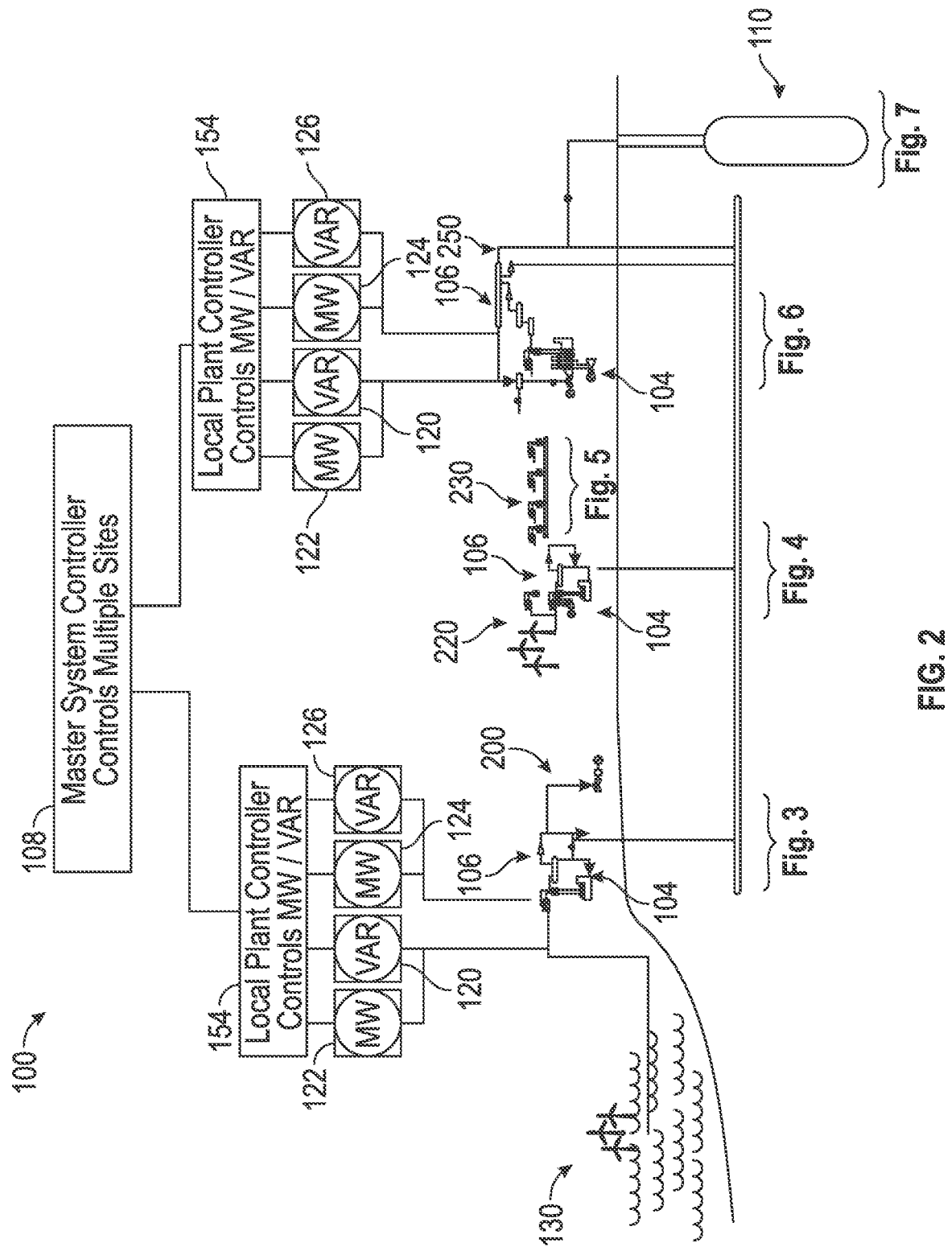
FIG. 2 is a schematic diagram illustrating an example master control system for the sub-systems of FIGS. 3-10 suitable for use in an integrated power production system of FIGS. 1A and 1B.

FIG. 2 represents another view of a control approach of system 100 shown in FIGS. 1A and 1B. Master controller 108 can be in communication through various plant controllers 154 to more specific set point controllers 120-126 (FIGS. 1A and 1B) for one or more instances of GTCC 104 and electrolyzers of hydrogen production system 106 within system 100. FIG. 2 illustrates that different instances of electricity producers, such as GTCC 104 and renewable wind electricity sources 130, and hydrogen production systems 106 can be combined to provide integrated power production system 100.

As is discussed with reference to FIG. 3, GTCC 104 can be combined with hydrogen production system 106 to permit HRSG 116 to heat electrolyzer 201 and electrolyzer 201 to provide hydrogen to gas turbine 114.

As is discussed with reference to FIG. 4, GTCC 104 can be combined with hydrogen production system 106 and renewable wind electricity sources 130 to provide power to battery 222 for use during intermittent downtime of renewable wind electricity sources 130 as well as frequency support, and oxygen can be expanded to allow cooling of electrolyzer 201. In examples, battery 222 can be replaced with another electrolyzer 201.

As is discussed with reference to FIG. 5, a plurality of electrolyzers 201 can be connected to a plurality of converters 134 and heating or cooling loop 230 to selectively heat or cool one or more of electrolyzers 201 and converters 134.

As is discussed with reference to FIG. 6, HRSG 116 can be combined with electrolyzer 201 to provide heating, steam turbine 118 to provide synchronous condensing, and hydrogen compressors 138 and 254 to provide hydrogen storage and surge capabilities for coordinating burning of hydrogen and natural gas in gas turbine 114.

As is discussed with reference to FIG. 7, any or all of hydrogen production system 106 of FIGS. 1-6 can be connected to hydrogen storage system 110, which can take on the form of various underground storage facilities described with reference to FIGS. 11-16F.

The various sub-systems described with reference to FIGS. 3-7 can be combined into a configuration of integrated power production facility 100 that are jointly operated by master controller 108 to smooth out periods of high and low demand on grid 128 by producing electricity for short term storage in batteries and hydrogen for long term storage in storage vessels during periods of low grid demand for later use during periods of high grid demand, while simultaneously lowering emissions via efficient use of available renewable energy sources and production of hydrogen for burning in gas turbine engines.

Figure 3:
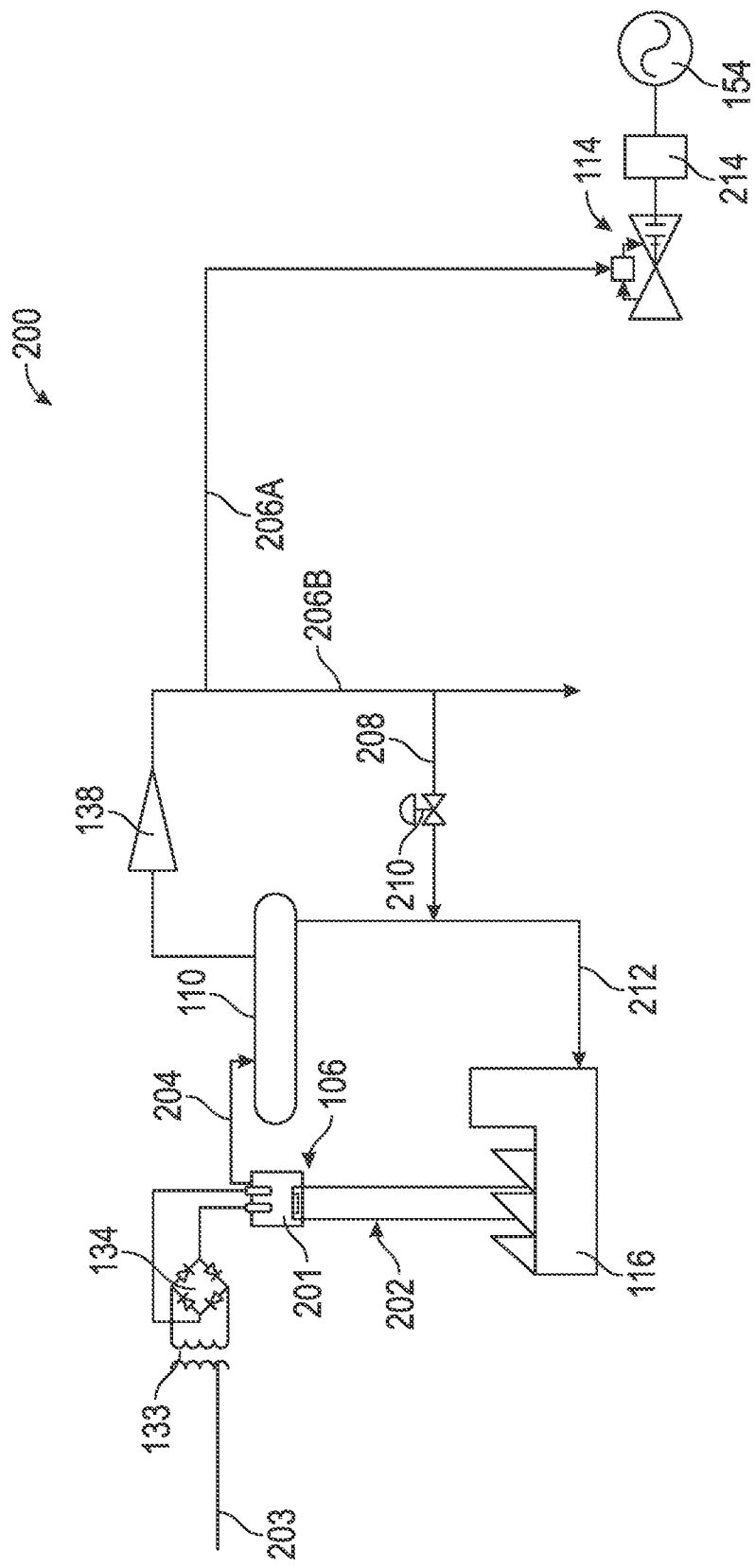
FIG. 3 is a schematic diagram illustrating an example combined cycle power plant having a an electrolyzer connected to a hydrogen receiving tank and power conversion equipment.

FIG. 3 is a schematic diagram illustrating system 200 comprising combined cycle power plant 104 (FIG. 1B) having gas turbine 114 (FIG. 1B), HRSG 116 and hydrogen production system 106. Hydrogen production system 106 can comprise electrolyzer 201. Hydrogen production system 106 can be connected to hydrogen receiving tank 110 and power conversion equipment including converter 134. FIG. 3 represents another view of some components suitable for use in integrated power production system 100 of FIGS. 1A and 1B. FIG. 3 illustrates a system for utilizing heat from the exhaust gas of turbine 114, as captured by HRSG 116, with integrated power production system 100. System 200 can be connected to master controller 108 (FIG. 1).

Power line 203 can be used to deliver electricity to hydrogen production system 106 from grid 128 (FIGS. 1A and 1B) to, for example, control generation of hydrogen with electrolyzer 201 based on other parameters of system 100. Hydrogen generated by hydrogen production system 106 can be provided to hydrogen receiver tank 110 via hydrogen line 204. Hydrogen compressor 138 can be used to increase a pressure of hydrogen and move hydrogen to another location. Hydrogen compressor 138 can feed gas turbine 114 via line 206A and another process, such as industrial or fuel uses, via line 206B. Additionally, compressed hydrogen can be sent back to hydrogen receiver tank 110 via line 208 and valve 210. Furthermore, hydrogen can be provided to HRSG 116 via line 212 to, for example, provide supplemental firing capabilities and the like.

Gas turbine 114 can be configured to provide exhaust gas to HRSG 116 as discussed with reference to FIGS. 1A and 1B. However, gas turbines configured to receive hydrogen from hydrogen production system 106 can be located anywhere on grid 128 away from hydrogen production system 106. Gas turbine 114 can comprise a multiple shaft gas turbine engine and can be connected to generator 154 via clutch 214, such that generator 154 can be configured to operate as a synchronous condenser. For example, clutch 214 can be operated by controller 108 to disconnect generator 154 from gas turbine 114 and generator 154 can be provided with AC power from grid 128 to alter or adjust the phase angle (@) of grid 128. Gas turbine 114 can be configured to operate as a simple cycle electrical producer or in conjunction with a combined cycle facility. Gas turbine 114 can be located away from electrolyzer 201. Gas turbine 114 can be configured to use hydrogen from hydrogen production system 106, hydrogen storage 110 of FIGS. 1B, 3 and 7, and other hydrogen sources or storage systems, such as those shown in FIGS. 11 to 16F.

Heat from HRSG 116 can advantageously be used by other industrial processes that are located with or near system 100, such as for chemical production or for facility environmental thermal control, as is illustrated in FIG. 8.

In the illustrated example, electrolyzer 201 of hydrogen production system 106 can be heated by steam or water from HRSG 116 using fluid lines 202. As such, electrolyzer 201 can be maintained in a warmed state or a standby mode whereby electrolyzer 201 can be brought up to operating capabilities rapidly as compared to starting from ambient temperature, thereby providing rapid response production of hydrogen. Fluid can circulate between HRSG 116 and hydrogen production system 106 using fluid lines 202 to provide heating, or cooling, as desired. In examples, heat can be provided to hydrogen production system 106 from an industrial process, or other heat sources. In additional examples, cooling can be provided to hydrogen production system 106 by a source of cooling fluid from other than HRSG 116, such as expanded oxygen.

Figure 4:
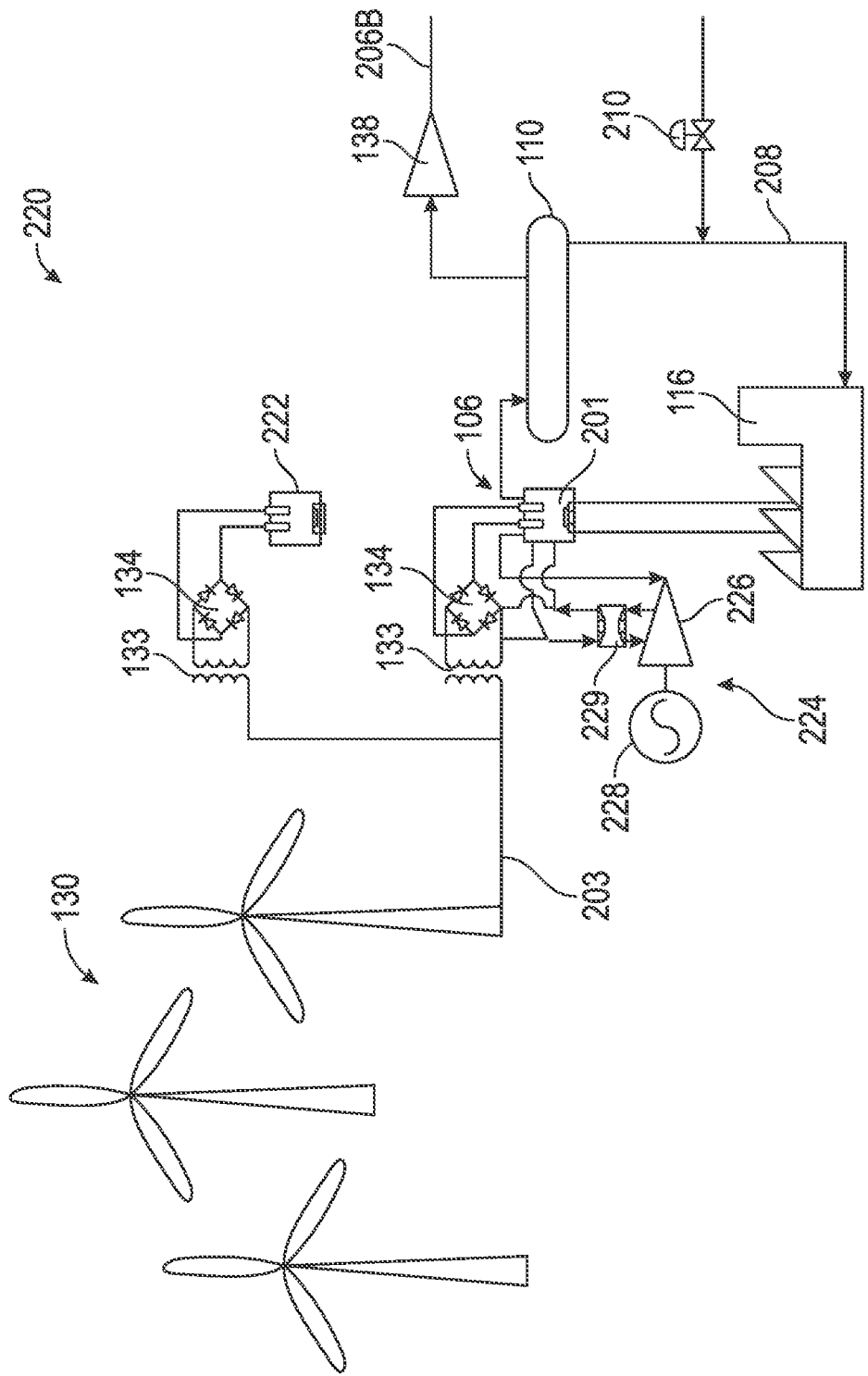
FIG. 4 is a schematic diagram illustrating a heat recovery steam generator connected to an electrolyzer, which is also connected to a battery and a renewable energy source.

FIG. 4 is a schematic diagram illustrating system 220 comprising heat recovery steam generator 116 connected to hydrogen production system 106, which is also connected to battery 222 and wind electricity source 130. Hydrogen production system 106 can be connected to cooling system 224, which can comprise expansion turbine 226, electrical generator 228 and heat exchanger 229. Hydrogen production system 106 can be connected to hydrogen receiving tank 110 and power conversion equipment including transformer 133 and converter 134. Battery 222 can be connected to wind electricity source 130 via power conversion equipment including transformer 133 and converter 134. FIG. 4 represents another view of some components suitable for use in integrated power production system 100 of FIGS. 1A and 1B. FIG. 4 illustrates a system for storing electricity at battery 222 to, for example, provide power load and frequency support capabilities and for using pressurized O2 (or H2) from electrolyzer 201 for generating electricity and cooling one or both of converters 134 and electrolyzer 201. System 220 can be connected to master controller 108 (FIG. 1) to, for example, control flow of fluid to electrolyzer 201 and operation of battery 222 based on other parameters of system 100. Power line 203 can be used to deliver electricity to hydrogen production system 106 and battery 222 from grid 128 (FIGS. 1A and 1B).

There are various manners in which the oxygen from hydrogen production system 106 can be advantageously integrated with other components within integrated power production system 100. For example, oxygen from oxygen storage system 112 (FIGS. 1A and 1B) or directly from hydrogen production system 106 can be expanded, such as through an orifice, expander valve, or through expanding turbine 226. It will be appreciated that expansion of pressurized oxygen will result in a reduction of temperature. This reduced temperature oxygen, can be used as a fluid to cool converter 134 connected to hydrogen production system 106 via heat exchanger 229. Similarly, the reduced temperature oxygen can be used to cool electrolyzer 201, which can be beneficial in expediting cooldown so that maintenance and other procedures can be performed. Fluid lines for heat exchanger 229 can include various valves operable by controller 108 to control flow of the reduced temperature oxygen based on grid conditions. In examples, expanding turbine 226 can be connected to electrical generator 228 to provide additional electricity to grid 128. In examples, expanding turbine 226 can be connected to hydrogen compressor 138 (FIG. 3) to provide rotational power to hydrogen compressor 138, thereby also recovering energy expended by system 220 in cooling electrolyzers 201. In such configurations, expanding turbine 226 can increase total output or reduce auxiliary loads, to enhance system efficiency.

As discussed herein, electrolyzer 201 can be heated using heat from HRSG 116, industrial process heat, district heating sources, commercial building heat and the like.

Battery 222 can be used to store electricity generated by wind electricity source 130. Battery 222 can additionally assist in both power load and frequency support capability when, for example, power from wind electricity source 130 may be reduced. Controller 108 can provide regulation up or down, frequency up or down, or reactive power management. The oxygen cooling described above can also be used for thermal management of battery 222. In examples, battery 222 can be included at the location of hydrogen production system 106.

Figure 5:
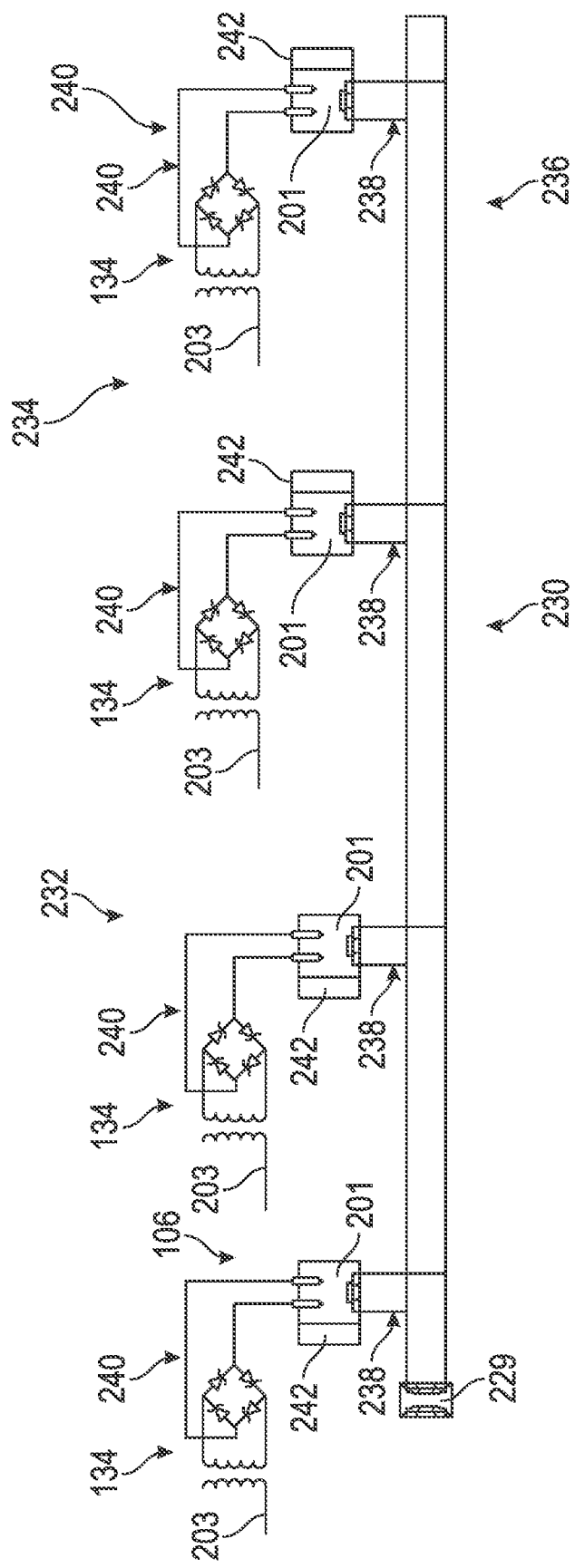
FIG. 5 is a schematic diagram illustrating a cooling loop for an electrolyzer bank.

FIG. 5 is a schematic diagram illustrating fluid loop 230 for electrolyzer bank 232, which can be connected to rectifier bank 234. Fluid loop 230 can comprise heat exchanger 229, fluid lines 236 and electrolyzer lines 238. Electrolyzers 201 can be connected to power converters 134 via electrical lines 240. Fluid loop 230 can provide thermal input (e.g., heat) or cooling to electrolyzers 201 and power converters 134 can provide electrical input to electrolyzers 201 such that electrolyzers 201 can produce hydrogen and oxygen outputs (not shown in FIG. 5). FIG. 5 represents another view of components suitable for use with integrated power production system 100 of FIGS. 1A and 1B. FIG. 5 illustrates how electrolyzers 201 can be maintained in a ready state using heat from loop 230 or can be quickly cooled down after use using loop 230. Loop 230 can be connected to master controller 108 (FIG. 1) to, for example, control flow of fluid through loop 230 based on other parameters of system 100. Power line 203 can be used to deliver electricity to electrolyzers 201 via converters 134 individually from grid 128 (FIGS. 1A and 1B).

During those times when one or more of electrolyzers 201 are not operating to produce hydrogen and oxygen, it can be desirable to provide heat to at least one of electrolyzers 201 to maintain such electrolyzer in a ready state to quickly and efficiently commence production of hydrogen. There are various manners in which the thermal management of electrolyzers 201 can be advantageously integrated with other components within the integrated system 100. In examples, the heat can be provided via HRSG 116 (See FIG. 3), which can provide steam or water to loop 230 at temperatures sufficient to maintain electrolyzers 201 is a standby mode. In examples, heat can be provided by converters 134 of operating electrolyzers 201 to keep in a ready state electrolyzers that are not currently operating, thereby additionally cooling the converters 134 associated with the operating electrolyzers 201. In additional examples, the heat can be provided via dedicated heating devices 242. In examples, heating devices 242 can comprise resistance heaters, which can be provided with electrical power from grid 128 (FIGS. 1A and 1B) or another source. In examples, heating devices 242 can comprise burners that can be provided with hydrogen fuel via electrolyzers 201 for combustion.

Heat exchanger 229 or another heat exchanger can additionally be connected to a loop of cooling fluid, such as expanded oxygen from turbine 226 of FIG. 4. The expanded oxygen can be used to cool electrolyzers 201, such as after electrolyzers 201 are shut down so to, for example, allow for maintenance of electrolyzers 201 sooner after shutdown. In additional examples, converters 134 can be provided with cooling via heat exchanger 229 of FIG. 4.

Although not illustrated in FIG. 5, loop 230 can be connected to converters 134 via additional fluid lines to provide cooling of converters 134 to, for example, allow converters 134 to operate at efficient temperatures.

Each of these examples discussed with reference to FIG. 5 represent synergistic uses of thermal exchange to facilitate one or more of cooling of converters 134 and heating electrolyzers 201 in standby mode.

Figure 6:
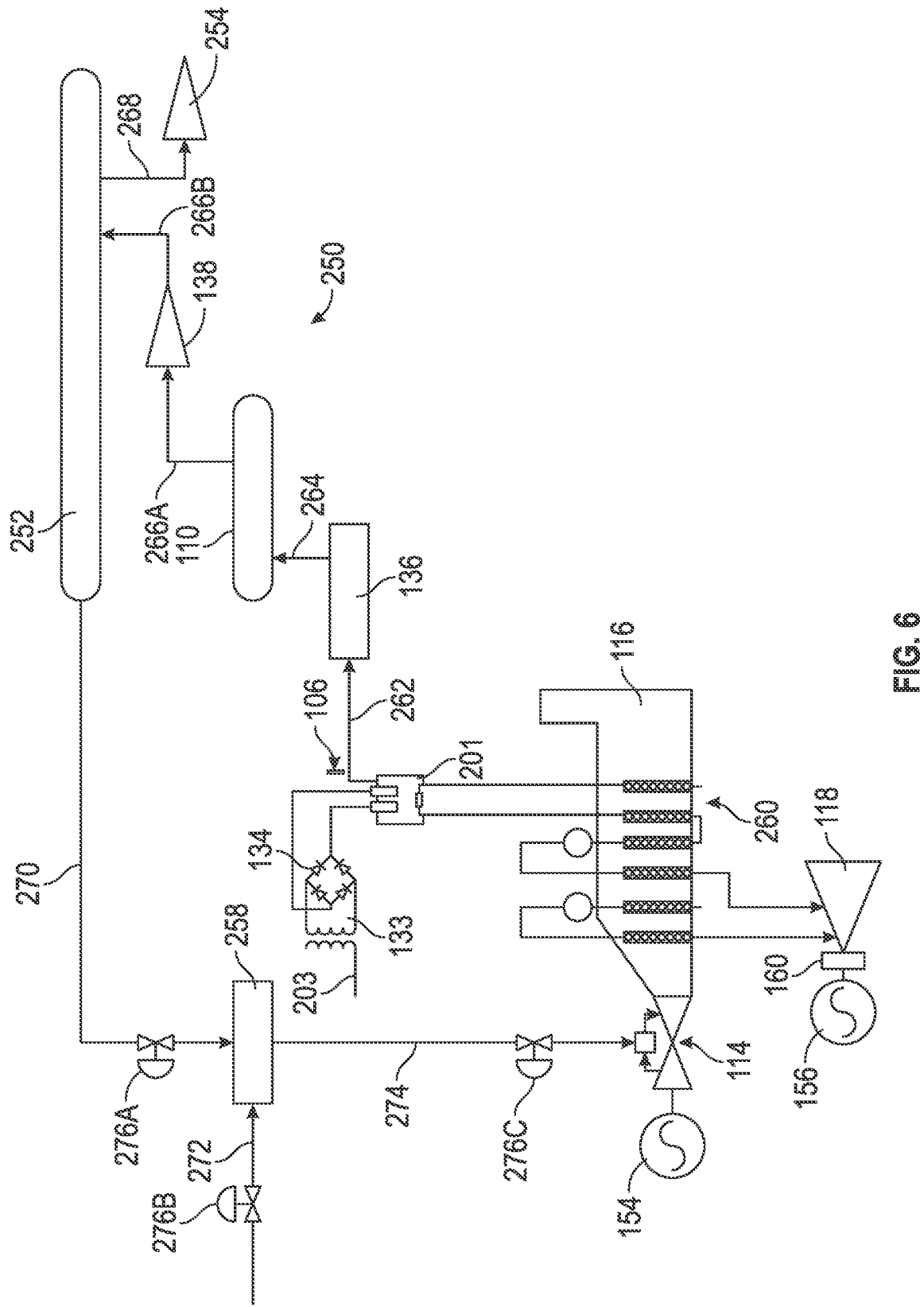
FIG. 6 is a line diagram illustrating a heat recovery steam generator connected to an electrolyzer and a hydrogen surge system.

FIG. 6 is a schematic diagram illustrating heat recovery steam generator 116 connected to electrolyzer 201 and hydrogen surge system 250. Hydrogen surge system 250 can comprise hydrogen storage system 110, hydrogen compressor 138, hydrogen surge tank 252, hydrogen surge compressor 254, hydrogen purifier 136, and mixing tank 258. FIG. 6 represents another view of components suitable for use with integrated power production system 100 of FIGS. 1A and 1B. FIG. 6 illustrates how hydrogen generated with electrolyzer 201 can be incorporated into electric power generation of integrated power production system 100. System 250 can be connected to master controller 108 (FIG. 1) to, for example, control flow of hydrogen and natural gas to gas turbine 114. Power line 203 can be used to deliver electricity to electrolyzer 201 from grid 128 (FIGS. 1A and 1B).

HRSG 116 can comprise low, medium and high temperature steam circuits within steam circuit 260 configured to heat water and provide steam to steam turbine 118. Electrolyzer 201 can output hydrogen at line 262 to provide hydrogen to purifier 136. Hydrogen from purifier 136 can be provided to hydrogen storage system 110 via line 264. Hydrogen storage system 110 can comprise a tank or the like, as is discussed with reference to FIG. 7 and FIGS. 11-16F. Hydrogen compressor 138 can provide compressed hydrogen to surge tank 252 via lines 266A and 266B. Hydrogen within surge tank 252 can be connected to surge compressor 254 via line 268 and mixing tank 258 via line 270. Mixing tank 258 can be connected to a source of natural gas via line 272 and the combustor of gas turbine 114 via line 274. Hydrogen surge system 250 can additionally comprise valves 276A, 276B and 276C that can be operated by controller 108 to control flow of fuel through system 250.

There are various manners in which thermal management of the components can be advantageously integrated with other components within the integrated system 100. For example, feedwater in HRSG 116 within circuit 260 can be used to heat electrolyzer 201. Additionally, electrolyte of electrolyzer 201 can be heated by exhaust of gas turbine 114 via an economizer coil within HRSG 116. Alternatively, electrolyzers 201 can be cooled via feedwater of HRSG 116, depending on where the feedwater is taken out of HRSG 116. In an additional example, cooling circuits for gas turbine 114 can be used to heat electrolyzer 201.

Steam turbine 118 can be connected to generator 156 via clutch 160, allowing generator 156 to spin freely from steam turbine 118 and function as a synchronous condenser for reactive power and/or voltage support. For example, clutch 160 can be operated by controller 108 to disconnect generator 156 from steam turbine 118 and can be provided with AC power from grid 128 to alter or adjust the phase angle (@) of grid 128.

Hydrogen compressor 138 can be driven by a variety or combination of motive sources. For example, hydrogen compressor 138 can be driven by an electric motor. In other examples, hydrogen compressor 138 can be driven by steam provided by HRSG 116 or other heat sources, such as converters 134. Other examples can include a mechanical drive from gas turbine 114 or steam turbine 118 to hydrogen compressor 138.

Figure 7:
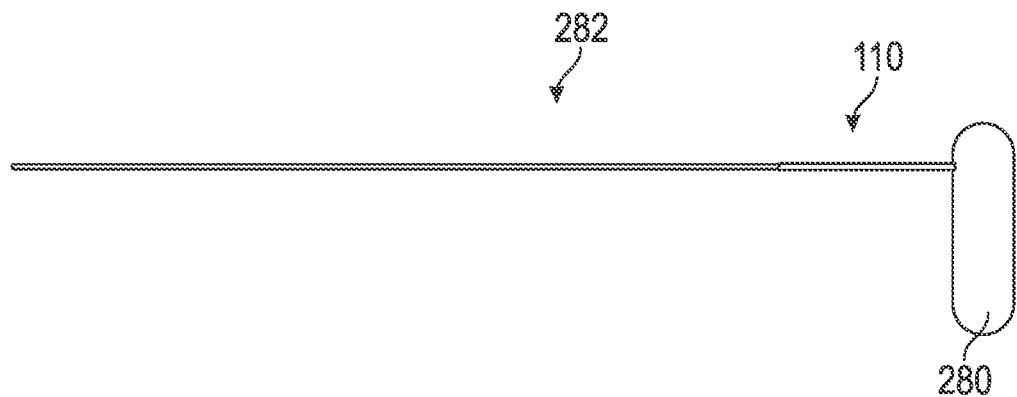
FIG. 7 is a schematic diagram illustrating of a hydrogen storage system.

FIG. 7 is a schematic diagram illustrating hydrogen storage system 110. Hydrogen storage system 110 can comprise storage tank 280 and pipeline 282. FIG. 7 represents another view components suitable for use with integrated power production system 100 of FIGS. 1A and 1B. FIG. 7 illustrates that hydrogen can be stored in various containers, including tank 280, located far away from hydrogen production system 106 via pipeline 282. There are various manners of providing hydrogen storage 110, such as those illustrated in FIGS. 11 to 16F. In the example of FIG. 7, hydrogen storage 110 can comprise a pipeline of various lengths, with the pipeline pressurized above the typical operating pressure to accommodate storage of hydrogen. System 110 can be connected to master controller 108 (FIG. 1) to, for example, control flow of hydrogen to and from tank 280.

FIG. 8 is a schematic diagram illustrating integrated power production system 100 of FIGS. 1A and 1B operable in conjunction with industrial facility 350. It will be appreciated that industrial facility 350 can be productive of one or more of various fuel, chemical, or material (such as steel, aluminum, etc.) products as an output product 376. Industrial facility 350 can comprise controller 352 and transformer 354. As shown in FIGS. 1A and 1B, integrated power production system 100 can comprise oxygen storage system 112 and oxygen purification system 140. Oxygen purification system 140 can be configured to provide purified oxygen to oxygen storage system 112 via compressor 356. Industrial facility 350 can have a plurality of inputs, including oxygen input line 360, or 362, hydrogen input line 366, saturated steam line 368, and pressurized steam line 370.

Oxygen input line 360 can connect to system 100 at output of electrolyzer 201. Oxygen compressed by compressor 356 can flow into oxygen storage system 112, after being purified by purifier 140. Oxygen from oxygen storage system 112 can pass to industrial facility 350 at line 362. Oxygen can further pass from oxygen storage system 112 back to system 100 at HRSG 116 via extension of line 364. Hydrogen input line 366 can connect to system 100 at output of hydrogen purification system 136. Saturated steam line 368 can connect to system 100 between HRSG 116 and heat exchanger 158. Pressurized steam line 370 can connect to system 100 at the inlet of steam turbine 118 or any drum of HRSG 116, as would be appreciated by one of skill in the art.

Industrial facility 350 can receive electrical power from grid 128 (FIGS. 1A and 1B) via power line 372 which may have its voltage changed via transformer 354. Controller 352 can be in communication with master controller 108 (FIGS. 1A and 1B) via control line 374. Industrial facility 350 can be operated using inputs 360-366 and other inputs to output product 376. Controller 352 can work in conjunction with controller 108 to produce output product 376 using resources from integrated power production system 100 based on availability of hydrogen, oxygen and steam due to conditions of grid 128. As such, lines 360-370 can include valves that can be operated by controller 108 and controller 352.

Figure 9:
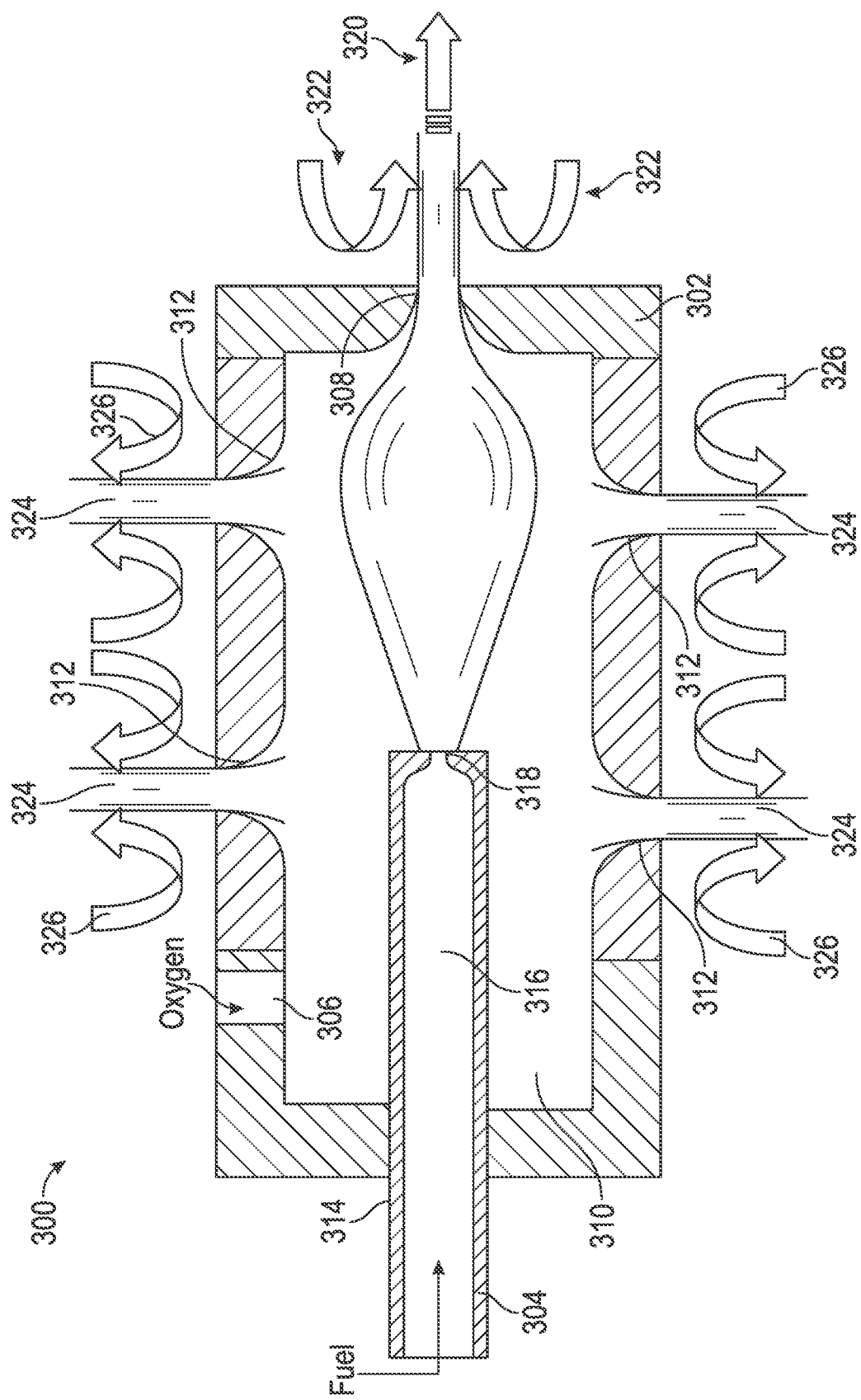
FIG. 9 is a schematic diagram illustrating a nozzle for generating hot oxygen to inject into a heat recovery steam generator.

FIG. 9 is a schematic illustration of thermal nozzle 300 that can be used to produce hot oxygen. Thermal nozzle 300 can comprise housing 302, injector 304, inlet port 306 and outlet orifice 308. Housing 252 can comprise chamber 310 to which openings 312 can connect and into which injector 304 can be inserted through port 314. Port 314 can be configured to axially align injector 304 with outlet orifice 308. Injector 304 can comprise a tube having lumen 316 and discharge orifice 318. Thermal nozzle 300 can receive oxygen and a fuel. In examples, thermal nozzle 300 can be configured similar to thermal nozzles described in U.S. Pat. No. 5,266,024 to Anderson, the entirety of which is incorporated herein by reference thereto. However, thermal nozzle 300 additionally includes openings 312. As described in U.S. Pat. No. 5,266,024 combustion of the fuel in the oxygen rich environment can produce oxygen jet 320 of hot oxygen that produces mixing 322 in the axial direction. The additional of openings 312 can further provide oxygen jets 324 of hot oxygen that produce mixing 326 in the radial direction.

Oxygen jets 320 and 324 can be expelled from thermal nozzle 300 with the following properties: high velocity, typically greater than 750 m/s to create recirculation and mixing 322 and 326, and a high concentration of radicals to support reaction kinetics. This drives lower temperature "oxidation" reactions vs. higher temperature "combustion" reactions. Demonstrated reactivity and kinetics are due to injection of highly reactive gas. In examples, the preheated oxygen destroys CO and NOx precursors (NH3 and HCN) with little or no generation of NOx.

With reference back to FIGS. 1A and 1B, thermal nozzle 300 can be disposed directly within inlet duct 164 of HRSG 116. In examples, the oxygen provided to thermal nozzle 300 can be provided directly from oxygen storage system 112. In examples, the oxygen provided by oxygen storage system 112 can be in thermal communication with one or more of (i) the heated water of HRSG 116, (ii) heated steam of HRSG 116; (iii) the exhaust gas flowing through HRSG 116. Any suitable heat exchanger can be used to transfer heat between the oxygen and the foregoing streams.

The example nozzle of U.S. Pat. No. 5,266,024 can provide a high velocity output that can be well suited for injection into a generally laminar flow stream, such as within a pipe, intended to provide rapid mixing of the hot oxygen within the laminar flow stream. Openings 312 can function as output orifices that are disposed in multiple locations around housing 302 of nozzle 300. It is contemplated that examples can include other equipment to alter the condition of the oxygen prior to introduction into inlet duct 164. Examples of such equipment can include pumps to increase the pressure (and/or temperature) of the oxygen from oxygen storage system 112, expansion nozzles or valves to decrease the pressure (and/or temperature) of the oxygen from oxygen storage system 112, as well as heat exchangers that can be located at various stages of heat recovery steam generator 116 to either heat or cool the oxygen supplied from oxygen storage system 112. Other examples can include thermal communication between oxygen from storage system 112 with other electronic or process components that can benefit from an exchange of heat, such as controllers 108, 120-126, power conversion equipment 133, 134, hydrogen production system 106, or gas turbine 114.

TABLE 1

| Case | 1 | 2 | 3 | 4 | 5 | 6 |
|---|---|---|---|---|---|---|
| Case Description | Shut down GTCC over weekend, Cheap Power producing H2, but emergency call for Max Power | Parked GTCC overnight, Cheap Power producing H2, power demand goes up and price begins increasing | Producing max power, but a big industrial load trips off | Electrolyzer running 50%, GTCC down | Producing H2 on cheap electricity from grid, grid then demands more power | Condensing to power transition |
| GTCC Start Condition | Cold, 0% Load | Min Load (~30%) on natural gas | Max load (100%) on mix of hydrogen and natural gas | Down | FSNL on H2 | GTCC on sync condensing |
| Electrolyzer Start Condition | Hot, 100% Load | Hot, 100% Load | Warm, 0% Load (assuming electrolyzer warm and ready) | Running 50%, 50% cold | Full H2 production | Producing H2 as part of grid support |
| Signal from Grid | Deliver Max Power | Deliver Max Power | Reduce Power nearly instantly | Renewable power drops, signal to reduce load | Need more power | Load demand |
| GTCC Response | Cold Start to 100% Load to optimize LTSA cost (not fast start) | Ramp to 100% Load at fastest rate that does not impact LTSA | Slow ramp down to min load (whatever rate has no impact to LTSA) | Stays in standby until grid needs power | Ramp up to load, blending in NG if needed | Start to ramp up - first with NG, then transition to H2 |
| Electrolyzer Response | Fast shut down . . . releasing that load back to grid, mimicking a facility fast start. | Fast shut down . . . releasing that load back to grid, mimicking a facility fast start. | Fast start to absorb as much load as quickly as possible . . . allowing GTCC to ramp slowly. | Shuts down as needed to balance load | Reduce H2 Production, which appears to be GT production (in net) | Start to ramp down | openings 312 provide enhanced mixing of hot oxygen within a large turbulent zone, such as within inlet duct 164 of HRSG 116.

As shown in FIG. 1B, in examples, oxygen provided by oxygen storage system 112 can be provided directly to an inlet of gas turbine 114. The introduction of oxygen into gas turbine 114 inlet can reduce the percentage composition of nitrogen in the gas turbine mass flow, and thereby reduce NOx production and emission. The oxygen from oxygen storage system 112 can be provided directly to the inlet of gas turbine 114 in the form of hot oxygen produced by thermal nozzle 300 as described above. In examples, the oxygen from oxygen storage system 112 can be provided directly to inlet duct 164 in the condition of oxygen storage system 112 (i.e. absent use of the thermal nozzle 300). Other As summarized in TABLE 1, there are various potential operating conditions that can be provided via collaboration between master controller 108 with the other controllers 120, 122, 124, 126, as well as various other controllers of the various subsystems shown with respect to FIGS. 3-7 and 10. Examples of such controllers are described with reference to FIG. 29.

Case 1: GTCC plant 104 is shut down, such as over a weekend, when power demand by consumers 152 is comparatively low. Surplus power provided by renewable electricity sources 130, 132 (beyond that required by consumers 152) is provided via grid 128 to the transformer 133, converter 143, and electrolyzer of hydrogen production system 106 to produce hydrogen to be stored within hydrogen storage system 110. Because GTCC plant 104 has been shut down, it is in a comparatively "cold" thermal state. Within such "cold" thermal state, it is desired to slowly ramp up the power output of GTCC plant 104, in order to minimize thermal gradients and stresses. However, as can sometimes be the case, grid 128 can be called upon to provide for a large demand for electricity, perhaps from a large industrial consumer starting its factory. Ordinarily, GTCC plant 104 can be called upon for a "fast start" that can impose high thermal gradients and stresses within gas turbine 114. The integration of components of system 100 provides an alternate solution that allows gas turbine 114 to have a preferable slow start, while immediately providing the large demand of electricity. In this case, an electrolyzer of hydrogen production system 106 can be shut down immediately or as soon as is practicable, with the energy previously consumed by the electrolyzer now immediately or as soon as is practicable being available for grid 128 to distribute from renewable sources 130, 132 to consumers 152. At the same time, while the electricity previously consumed by the electrolyzer is made available to consumers 152, GTCC plant 104 can begin warm-up processes with a preferred ramp up rate. That is, the near-immediate shut down of the electrolyzer simulates a "fast start" by GTCC 104 without imposing the high thermal gradients and stresses upon gas turbine 114 of GTCC 104.

Case 2: GTCC 104 is "parked", running at a minimum (approximately 30%) load, running on natural gas. Because demand for power on grid 128 is low, power is cheap, and the electrolyzer of hydrogen production system 106 can be running at full load, consuming power from grid 128 and/or GTCC 104 to produce hydrogen gas to be stored in hydrogen storage system 110. As with Case 1, an immediate increase in power from consumers 152 can be desired. Again, the electrolyzer can be quickly shut down providing an apparent near immediate supply of power to grid 128. Because GTCC 104 is running at minimum load, its capability to produce power can be ramped up faster than that of Case 1. Again, the demand for rapid power can be fulfilled by curtailing consumption of the electrolyzer, rather than a fast ramp of GTCC 104. It will be appreciated that if, instead of running on natural gas, GTCC 104 is "parked" and running on hydrogen, the emissions can be merely water vapor, with no carbon dioxide.

Case 3: Demand for power is high, but drops rapidly. Consider that a large industrial consumer 152 suddenly trips off, and the demand for power from grid 128 drops suddenly. Because demand was high, GTCC 104 operates at base (full) load, and the electrolyzer of hydrogen production system 106 can be producing not very much hydrogen (not consuming very much energy from grid 128). If electrolyzers are kept in a warm state (such as via heat from HRSG 116, as described herein with reference to FIGS. 3-6, for example), the electrolyzers can immediately increase to 100% production of hydrogen, and begin to immediately consume the power previously consumed by the large industrial consumer 152. That is, rapid start of the electrolyzers can quickly replace the drop in demand from industrial consumer 152. As such, GTCC 104 can initiate a slow ramp down (in balance with the electrolyzers of hydrogen production system 106), to reduce cool-down thermal gradients on GTCC 104. Excess power consumed by electrolyzers can be stored in the form of hydrogen in hydrogen storage system 110 for later conversion to electricity by GTCC 104.

Case 4: GTCC 104 is off, and the electrolyzers of hydrogen production system 106 are running at partial load. As the availability of renewable power from sources 130, 132 declines, the electrolyzers can reduce hydrogen production to maintain balance of grid 128.

Case 5: GTCC 104 is operating at full speed with no load (up to temperature and speed, but no electricity production), and running on hydrogen from hydrogen storage system 110. Grid 128 recognizes an increase in power demand, and responsive there to, GTCC 104 can begin to ramp up to load while the production of hydrogen by the electrolyzers of hydrogen production system 106 can decrease. If there is a shortage of hydrogen available to power gas turbine 114, GTCC 104 can begin to open the natural gas flow via valve 144.

Case 6: Generator 154 of gas turbine 114 is operating as a synchronous condenser, and the electrolyzers of hydrogen production system 106 are consuming power from grid 128 to maintain grid 128 balance and produce hydrogen gas. As grid 128 begins to sense an increasing demand for electricity, master controller 108 can direct the other controllers 120-126, as well as other controllers of the sub-systems of FIGS. 3-7 and 10, to ramp down the electrolyzers and ramp up GTCC 104, initially on natural gas fuel via valve 144, to be subsequently replaced with hydrogen gas via storage system 110 and valve 142.

Although 6 discrete cases are described above, it will be appreciated that the scope of the disclosure is not so limited, and includes various combinations of each or all of the above cases, such as any intermediate operating conditions between those specific conditions described, and to operate on all natural gas, all hydrogen, or any combination of the two.

Figure 10:
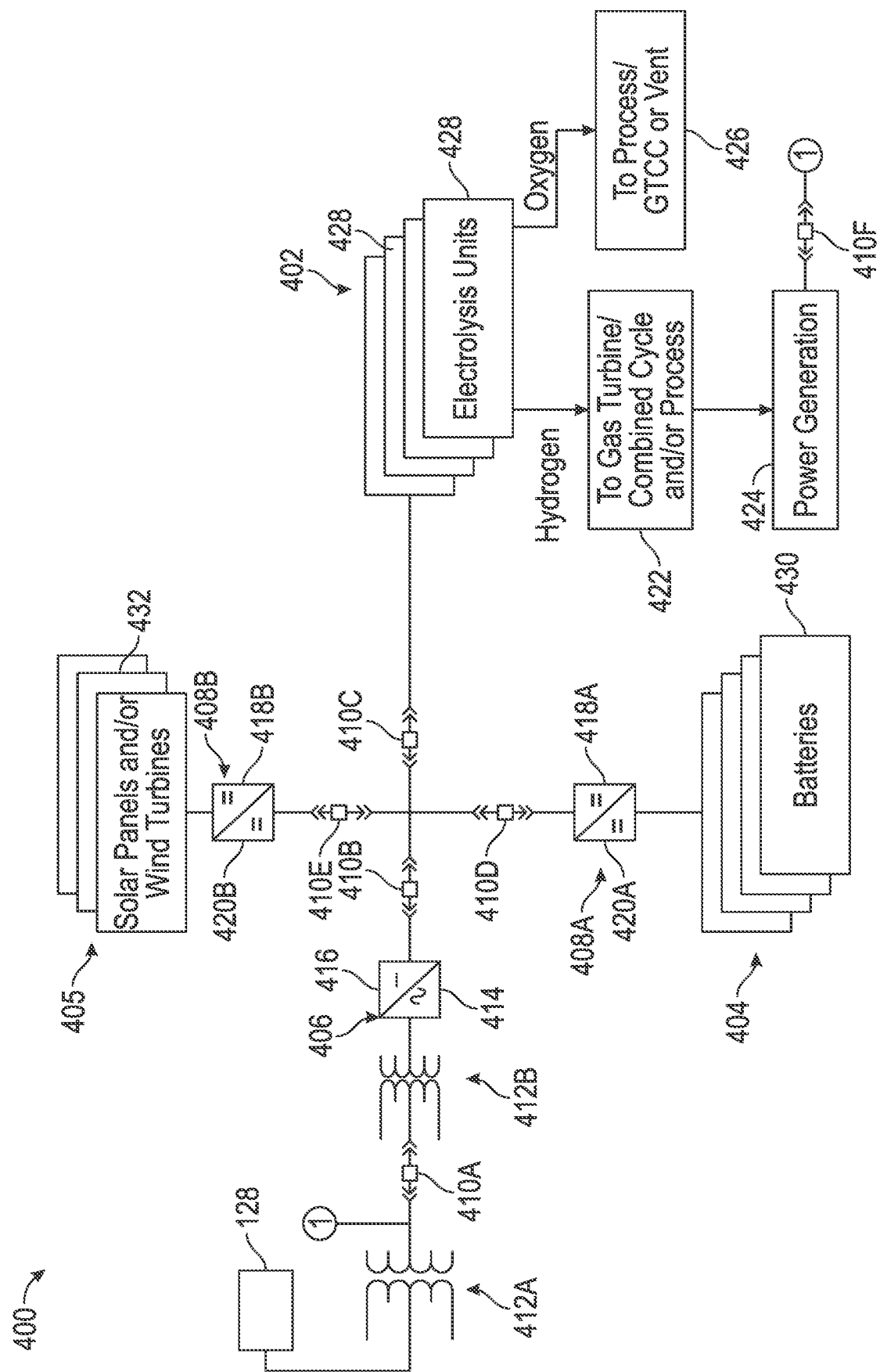
FIG. 10 is a schematic diagram illustrating a hybrid power converter connecting the grid to an electrolyzer bank, a battery bank and renewable energy sources.

FIG. 10 is a schematic diagram of hydrogen generation system 400 comprising electrolysis pack 402, battery pack 404 and renewable energy producers 405 connected to grid 128 via bi-directional inverter 406 and DC-DC inverters 408A and 408B. System 400 can further comprise first breaker 410A, second breaker 410B, third breaker 410C, fourth breaker 410D, fifth breaker 410E and sixth breaker 410F. Power from grid 128 can be transmitted to system 400 through transformers 412A and 412B. Bi-directional inverter 406 can comprise AC converter 414 and DC converter 416. DC-DC inverter 408A can comprise first converter 418A and second converter 420A. DC-DC inverter 408B can comprise first converter 418B and second converter 420B. Electrolysis units 402 can be connected (via their output of Hydrogen) to GTCC 422, which can be connected to generator 424. Electrolyzer units 402 can also be connected to oxygen consumer 426.

Transformer 412A can transfer power from grid 128 to hydrogen generation system 400. Likewise, transformer 412B can transfer power from transformer 412A to converter 406. B-directional inverter 406 can convert alternating current from transformer 412A to direct current via AC converter 414. Electrolysis pack 402 can comprise a plurality of electrolysis units 428 that can be electrically connected together, such as in series or parallel, to receive current from inverter 406. Each electrolysis unit 428 can be configured to convert an input of water (H2O) into hydrogen (H2) and oxygen (O2) gas using electricity, such as via DC.

Inverter 408A can convert DC from inverter 406 from one voltage to another voltage that is suitable for use with battery pack 404. Battery pack 404 can comprise a plurality of battery units 430 that can be electrically connected together, such as in series or parallel, to receive or provide current from or to, respectively, inverter 408A.

Renewable energy producers 405 can comprise a plurality of instances 432 of one or both of solar panels and wind turbines that can be connected together in series or parallel to provide electrical input to inverter 408B. Inverter 408B can convert DC from one voltage to another, such as converting DC from renewable energy producers 405 to a voltage suitable for use with inverter 406.

TABLE 2

Breaker Positions

| Closed | Open | State | Local Solar/Wind - Breaker 5 State | GTCC Breaker 6 - State | Service |
|---|---|---|---|---|---|
| 1, 2, 4 | 3 | Batteries charging from Grid | Breaker 5 open, PV not providing power. Breaker 6 closed, PV adding to charging batteries | Breaker 6 open with GTCC shut down or closed and GTCC operating at min load for stand by services. | Excess renewable grid power storage using batteries. Benefits.: Store excess power from grid that exceeds electrolysis capacity and can be used later to feed to grid or electrolysis. |
| 1, 2, 4 | 3 | Batteries discharging or connected as stand by to Grid | Breaker 5 open, PV not providing power. | Breaker 6 Open GTCC shut down, batteries offering traditional services or acting as spinning reserve for GTCC. Breaker 6 closed, GTCC and batteries adding power to the grid. | Traditional battery energy storage services. Benefits: Peak power, Freq. Reg., Voltage, Reactive power, Shifting, Non-spinning/ spinning reserve . . . traditional BESS services. |
| 1 | 2, 3, 4 | PCS grid connected | Breaker 5 open, PV not providing power. | Breaker 6 open, GTCC shut down. Breaker 6 closed, power, reactive services, inertia. | Reactive power services. |
| 1, 4 | 2, 3 | PCS grid connected, PV battery connected | Breaker 5 closed, PV charging batteries. | Breaker 6 open, GTCC shut down. Breaker 6 closed, power, reactive services, inertia. | Reactive power services. |
| 1, 2, 3 | 4 | Electrolysis Grid connected. | Breaker 5 open, PV not providing power. Breaker 5 closed, PV adding to Hydrogen production. | Breaker 6 open, GTCC shut down. Breaker 6 closed, GTCC operating at min load for stand by services. | Hydrogen and Oxygen produced for long duration storage. |
| 3, 4 | 1, 2 | Electrolysis connected to Batteries. | Breaker 5 open, PV not providing power. Breaker 5 closed, PV adding to Hydrogen production. | Breaker 6 open, GTCC shut down. Breaker 6 closed, GTCC operating at min load for stand by services. | Recover excess power for electrolysis for Hydrogen and Oxygen production (shifting short term storage to long term storage). |
| 1, 2, 3, 4 | | Hydrogen production and simultaneous battery charging | Breaker 5 open, PV not providing power. Breaker 5 closed, PV adding to Hydrogen production and battery charging. | Breaker 6 open, GTCC shut down. Breaker 6 closed, GTCC operating at min load for stand by services. | Balance electrolysis for Hydrogen and Oxygen production for long duration storage and charging battery energy storage for short duration storage. |

In a first state, breakers 410A-410D can be closed. In such a state, electrolysis units 428 can be actively converting electricity and water to hydrogen and oxygen and battery units 430 can be simultaneously charging. The first state can be used when hydrogen and oxygen production is being stored, such as in hydrogen storage system 110 and oxygen storage system 112 (FIG. 1), for long term storage and energy is being stored in battery units 430 for short term storage. The first state can occur when there is an excess of energy available to grid 128, such as when renewable energy sources, e.g., wind electricity sources 130 and solar electricity sources 132 (FIG. 1), are operating at high capacity.

In the first state, breakers 410E and 410F can be open or closed. With breaker 410E open, renewable energy sources 405 can be in a non-producing state. With breaker 410E closed, renewable energy sources 405 can be producing and providing electricity to, for example, produce hydrogen with electrolysis units 428 and store power in battery units 430. With breaker 410F open, GTCC 422 can be shut down. With breaker 410F closed, GTCC 422 can be operating for standby services, such as at minimum load.

In a second state, breakers 410A, 410B and 410D can be closed and breaker 410C can be open. In such a state, excess power from grid 128 can be stored in battery units 430. Thus, excess power from grid 128 that during periods when it may be desired not to operate electrolysis pack 402, can be stored for later usage with electrolysis pack 402.

In the second state, breakers 410E and 410F can be open or closed. With breaker 410E open, renewable energy sources 405 can be in a non-producing state. With breaker 410E closed, renewable energy sources 405 can be producing to, for example, store power in battery units 430. With breaker 410F open, GTCC 422 can be shut down. With breaker 410F closed, GTCC 422 can be operating for standby services, such as at minimum load.

In a third state, breakers 410A, 410B and 410D can be closed and breaker 410C can be open. In such a state, battery units 430 can be discharging to grid 128 or can be connected to grid 128 in a standby mode. Thus, battery units 430 can be used for energy storage services. The benefits of operating in the third state include peak power (e.g., providing additional power from battery units 430 to grid 128), frequency regulation (e.g., using battery units 430 to adjust the frequency of grid 128), voltage, reactive power, including traditional Battery Energy Storage Systems (BESS) services.

In the third state, breaker 410E can be open with renewable energy sources 405 not providing power. With breaker 410F open, GTCC 422 can be shut down, battery units 430 can be offering traditional services or acting as spinning reserve. With beaker 410F closed, GTCC 422 and battery units 430 can be adding power to grid 128.

In a fourth state, breaker 410A can be closed and breakers 410B, 410C and 410D can be open. In such a state, bi-directional inverter 406 can be connected to grid 128 to provide power conversion system services and to provide reactive power services.

In the fourth state, breaker 410E can be open with renewable energy sources 405 not providing power. With breaker 410F open, GTCC 422 can be shut down. With breaker 410F closed, GTCC 422 can be providing power, reactive services and inertia.

In a fifth state, breakers 410A and 410D can be closed and breakers 410B and 410C can be open. The fifth state can be useful for providing power conversion system services to grid 128, providing reactive power services, and connecting renewable energy sources 405 to battery units 430.

In the fifth state, breaker 410E can be closed so that renewable energy sources 405 can charge battery units 430. With breaker 410F open, GTCC 422 can be shut down. With breaker 410F closed, GTCC 422 can be providing power, reactive services and inertia.

In a sixth state, breakers 410A, 410B and 410C can be closed and breaker 410D can be open. In such a state, system 400 can be electrolysis grid connected. The sixth state can be useful for hydrogen and oxygen production for long duration storage (e.g., via storage of hydrogen and oxygen in systems 110 and 112, respectively).

In the sixth state, breakers 410E and 410F can be open or closed. With breaker 410E open, renewable energy sources 405 can be not producing. With breaker 410E closed, renewable energy sources 405 can be producing to, for example, provide power to electrolysis units 428 to produce hydrogen. With breaker 410F open, GTCC 422 can be shut down. With breaker 410F closed, GTCC 422 can be operating for standby services, such as at minimum load.

In a seventh state, breakers 410C and 410D can be closed and breakers 410A and 410B can be open. In such a state, electrolysis pack 402 can be connected to battery pack 404. The seventh state can be useful for recovering excess power stored in battery units 430 for use with electrolysis units 422 to produce hydrogen and oxygen, thereby shifting short term storage to long term storage (e.g., via storage of hydrogen and oxygen in systems 110 and 112, respectively).

In the seventh state, breakers 410E and 410F can be open or closed. With breaker 410E open, renewable energy sources 405 can be in a non-producing state. With breaker 410E closed, renewable energy sources 405 can be producing to, for example, provide power to electrolysis units 428 to produce hydrogen. With breaker 410F open, GTCC 422 can be shut down. With breaker 410F closed, GTCC 422 can be operating for standby services, such as at minimum load.

FIG. 10 illustrates a system where electrolysis units 428 can be integrated into system 100. System 400 can provide a DC sub-system within breaker 410A that is not connected to grid 128 such that system 400 can operate independent of grid 128. Thus, energy from renewable energy producers 405 can be stored in batteries or directly used by electrolysis units 428. The inclusion of battery units 430 can additionally be used to reduce the number of electrolysis units 428 or wear and tear on electrolysis units 428. For example, battery units 430 can be used to maintain electrolysis units 428 in an operating state or in a warmed-up state when electricity from renewable energy producers 405 or grid 128 is not available, thereby reducing cycling of electrolysis units 428. In examples, the components of system 400 can comprise components of FIGS. 1A-9 having similar names with different reference numerals. For example, electrolysis units 428 can comprise electrolyzers 201 and battery units 430 can comprise battery 222.

Storage Systems

The present application additionally discloses multiple storages systems that can be used for hydrogen storage, means and methods for installing storage systems and ways of connecting such storage systems to integrated power production facilities.

It is known to store hydrogen, as well as other gases, in various storage vessels. Common storage vessel arrangements include forged tubes that can be certified to ASME and/or DOT standards that incorporate transportation safety requirements, particularly for vessels that can be portable. These storage vessels can incorporate specific design features, such as flanged and/or hemispherical ends to meet such standards. Vessels with such margins of safety and certifications are expensive to produce.

The present disclosure provides a plurality of configurations for stationary pipelines that can be safe, easy to install and inexpensive. Stationary pipelines, via pressurization above standard pressures, can be used as storage vessels for hydrogen. Additionally, where pipelines cannot be readily available or in use, standard pipes can be arranged as storage containers, both above and/or below ground.

Figure 11:
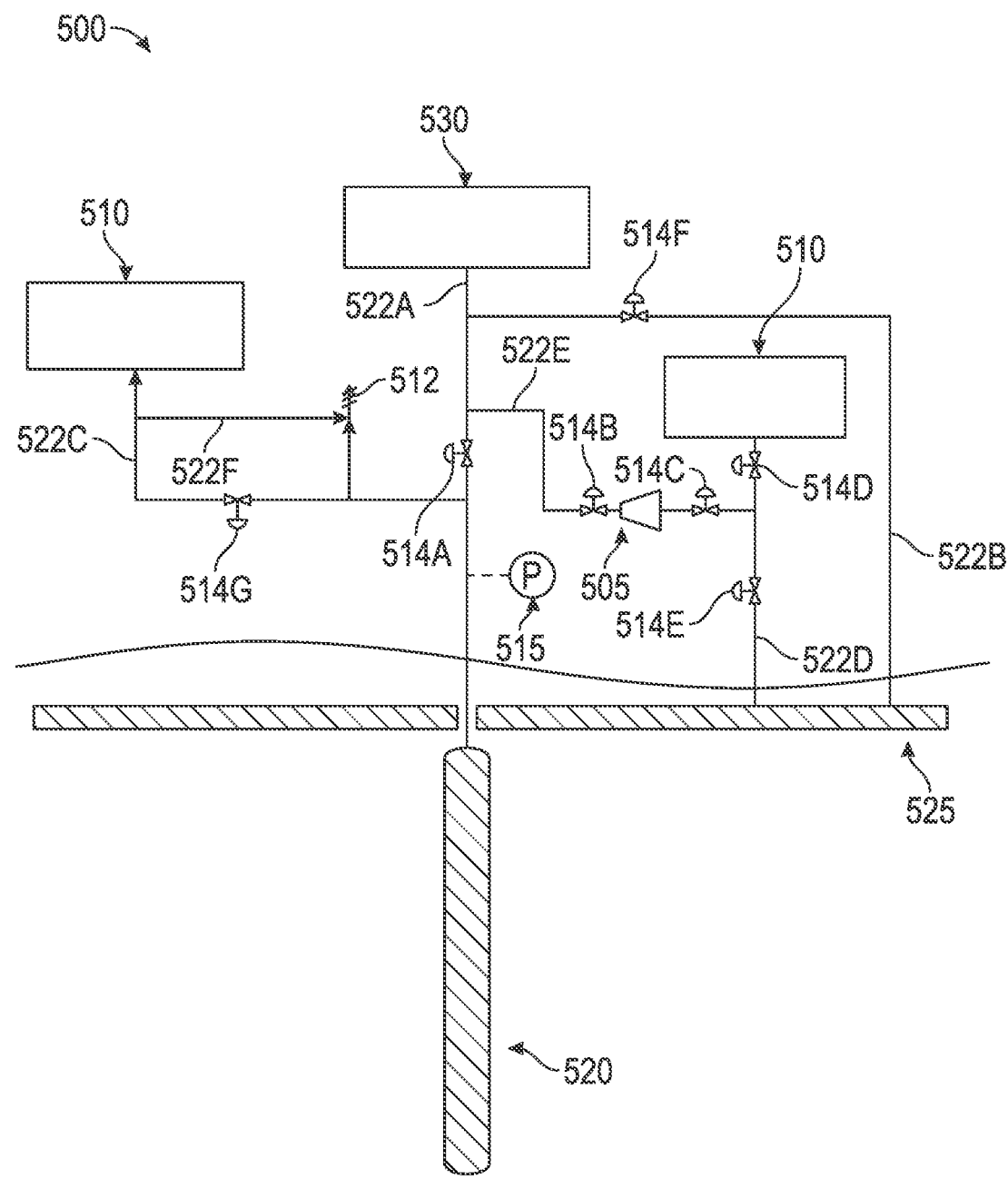
FIG. 11 is a schematic diagram illustrating a vertically disposed piping system suitable for use as a hydrogen storage system.

FIG. 11 depicts vertically disposed piping system 500 that can be utilized as a gaseous storage system, such as to store hydrogen, for example. Piping system 500 can include various subsystems to provide and maintain acceptable amounts and pressures of the hydrogen, including compressor 505, one or more venting sub-systems 510, vent 512, valves 514A-514G, appropriate sensors 515, such as pressure transducers, storage pipes 520 and connecting lines 522A-522F. In examples, storage pipe 520 can be buried beneath ground 525. In examples, system 500 can be connected to adjacent storage system 530 that can be similar to system 500 or other systems described herein to increase a storage capacity of system 500.

Figure 12:
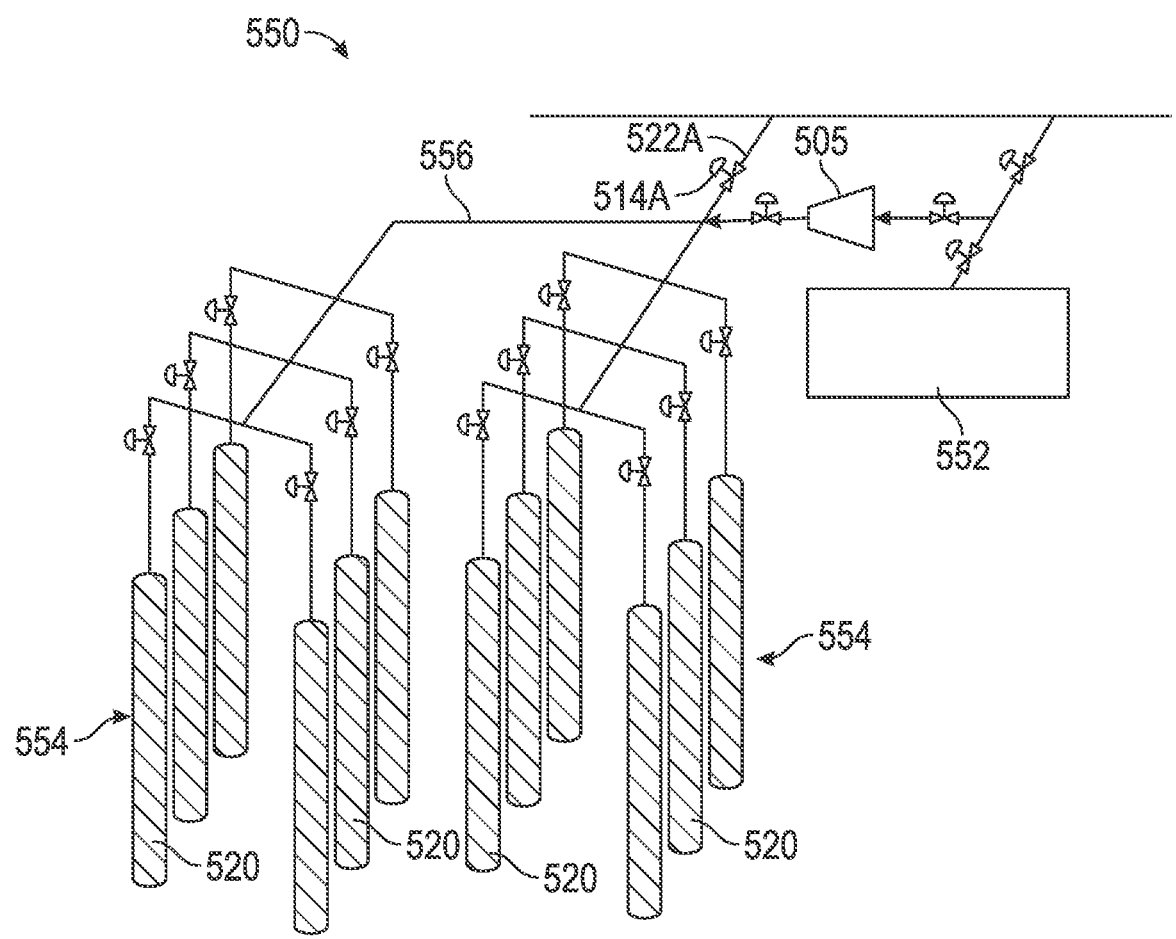
FIG. 12 is a schematic diagram illustrating a plurality of vertically disposed piping systems.

FIG. 12 illustrates storage system 550 comprising a plurality of storage pipes 520 interconnected into clusters 554. System 550 can be connected to one or more producers 552 that generate or produce hydrogen, such as electrolysis units. Clusters 554 can comprise packs of pipes 520 connected to a common header pipe 556 that connects to an above-ground portion of system 550, such as line 522A. In the illustrated example, each of clusters 554 includes six of pipes 520. It will be appreciated that with current drilling technology, it is contemplated that systems 550 can include pipes 520 that can be buried up to two miles beneath ground 525 level. For comparison, pipes 520 can be stacked end-to-end a length that is equivalent to nine Empire State buildings as a comparative reference. In examples of system 500 of FIG. 11 or system 550 of FIG. 12, the depths utilized are expected to be directly related to the amounts of hydrogen needed to be stored. That is, longer pipes can be extended further underground to store higher amounts (e.g., volumes) of hydrogen.

In examples, pipe 520 can be a steel pipe that has been inserted into a well bore. In examples, pipe 520 can be made of other material, such as fiber reinforced composite materials and other metals and alloys. In examples, pipe 520 can comprise a standard well casing, or plurality of well casings that have been joined in a manner sufficient to contain the hydrogen. In examples, other storage arrangements can be used, such as to treat the well to make it suitable to contain the hydrogen, such as to make the geology surrounding the well impermeable to hydrogen.

The vertical cylindrical tank or vessel of pipe 520 can store gas at a high pressure $P_{high}$ and supply a volume of hydrogen, when needed, down to a lower pressure $P_{low}$. As such, the storage capacity of hydrogen in any such pipe can be the amount of hydrogen that can be stored within the volume of pipe 520 at $P_{high}$ minus the amount of hydrogen that can be stored within the volume of pipe 520 at $P_{low}$. Installation techniques for placing pipes 520 below ground 525 can include excavation or drilling. Additionally, pipes 520 can be installed in an existing (such as an abandoned) oil and/or gas production well. The various supporting subsystems, such as valves, transducers, headers, and/or manifolds can be installed either above or below the grade of ground 525.

It will be appreciated that compressor 505 consumes energy to compress the hydrogen up to the required storage pressures, such as $P_{high}$. It is expected that during times of low demand for hydrogen (and/or electricity), which can coincide with times of peak production and availability of renewable electricity, compressor 505 can be operated to compress the hydrogen to the required storage pressures. Likewise, during periods of high demand for hydrogen (and/or electricity), compressor 505 can be turned off to conserve electricity, and hydrogen can be drawn from pipes 520 to provide energy, such as electricity, via thermal combustion and/or one or more fuel cells.

As the pressure of hydrogen in pipes 520 can approach (or even fall below) $P_{low}$, compressor 505 can be used to draw hydrogen from pipes 520 and provide it at any particular, desired pressure, which can be greater than the pressure within pipes 520.

FIG. 13A illustrates storage system 560. Storage system 560 can be similar to storage system 500 (FIG. 1). However, storage system 560 can comprise vessels 562 (such as pipes) that includes a directional change. Vessels 562 can comprise vertical portion 564 and horizontal portion 566. It is contemplated that directional drilling techniques utilized in other industries (such as oil, gas, and/or water exploration) can be utilized to increase the storage capacity of a system 500 without the need to dig as deep, or when an obstruction impedes or obstructs drilling as deep as would otherwise be desired. As described above, multiple systems 560 can be arranged within clusters 568 in fluid communication together to provide increased storage capacity. As shown in FIG. 13B, each cluster 568 can comprise a matrix of six vessels 562 from one of systems 560. Clusters 568 can be stacked vertically.

Figure 14A:
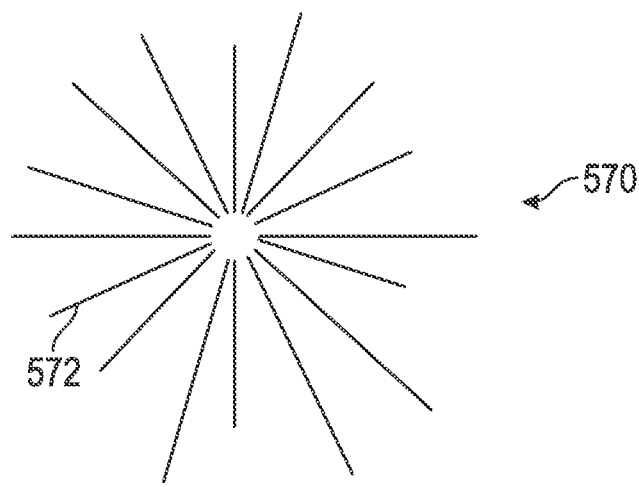
FIGS. 14A and 14B are schematic diagrams illustrating side and top views of a plurality of vertically disposed piping systems including pipes disposed in a radial arrangement.
Figure 14B:
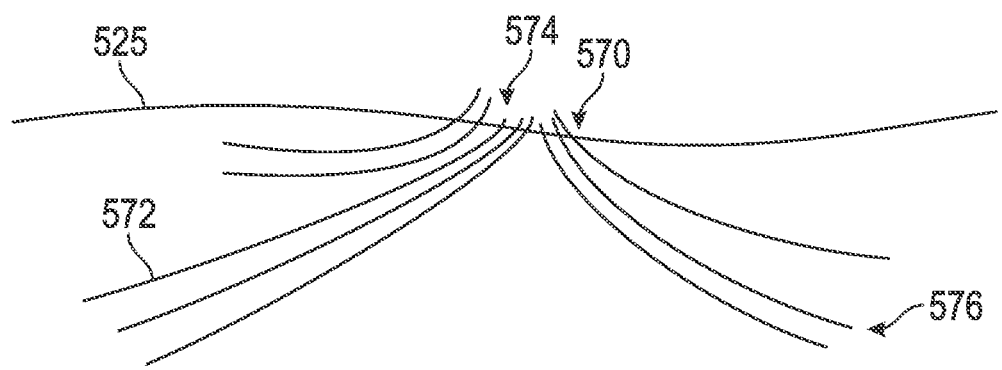

FIGS. 14A and 14B depict a top view and a side view of cluster arrangement 570. Cluster arrangement 570 comprises a radial shape that can allow for efficient use of the space above ground, such that all of the associated subsystems can be located near a common connection point to many storage vessels. Cluster arrangement 570 can comprise vessels 572 arranged where first ends of vessels 572 are located near center portion 574 where end of vessels are close together and vessels 572 can extend radially away from center portion 574 to outer portion 576 where ends of vessels 572 are far apart. Vessels 572 can comprise pipes as described herein and can be arranged in straight configurations or configurations having directional changes, either curved or angular.

FIG. 15 is a schematic illustration of storage system 580. System 580 depicts an arrangement having three layers 582, 584, 586 of vessels 588. Layers 582-586 can connect to line 522A in a variety of manners. Vessels 588 in each layer 582, 584, 586 can be individually piped above grade using lines 590, such as is shown by layer 582 of Layer 1 at header pipe 592. Individual vessels 588 can be connected to common header 592 via line 594 prior to piping above grade, such as is shown by the arrangement of layer 584 of Layer 2. Individual layers can be independent, such as shown by Layer 1, or be in fluid communication with layers above or below, such as is shown in the connection between layer 584 of Layer 2 and layer 584 of Layer 3 using lines 596.

Figure 16A:
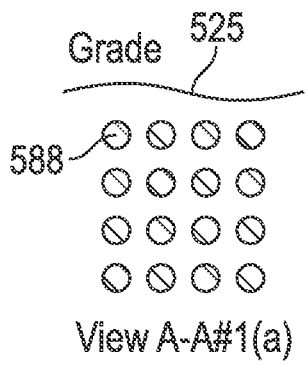
FIGS. 16A-16F are schematic diagrams illustrating various arrangements of layering of piping systems of the present disclosure.
Figure 16B:
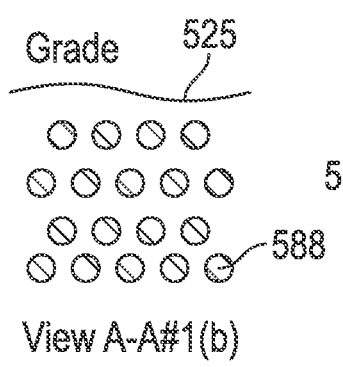
Figure 16C:
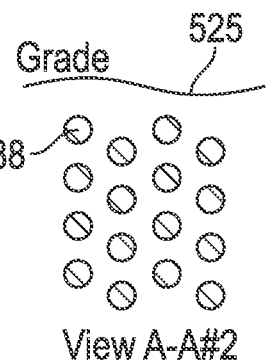

FIGS. 16A-16C show various section views of layers 582-586. FIG. 16A shows layers 582-586 arranged in a symmetrical manner. FIGS. 16B and 16C show layers 582-586 arranged in an asymmetrical manner. Layers 582-586 can be arranged for purposes of minimizing cost of mechanical supports between individual vessels 588, as well as reducing the overall space required. In examples, vessels 588 can be secured in place by earth or by artificial supports.

Figure 16D:
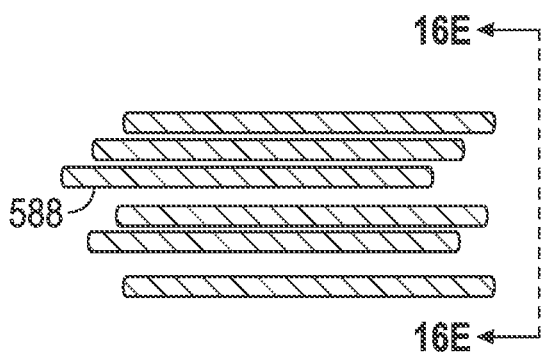
Figure 16E:
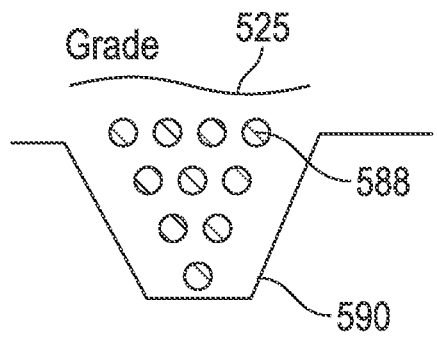

FIGS. 16D and 16E illustrate an alternative layering arrangement where vessels 588 are arranged in trench 590.

Figure 16F:
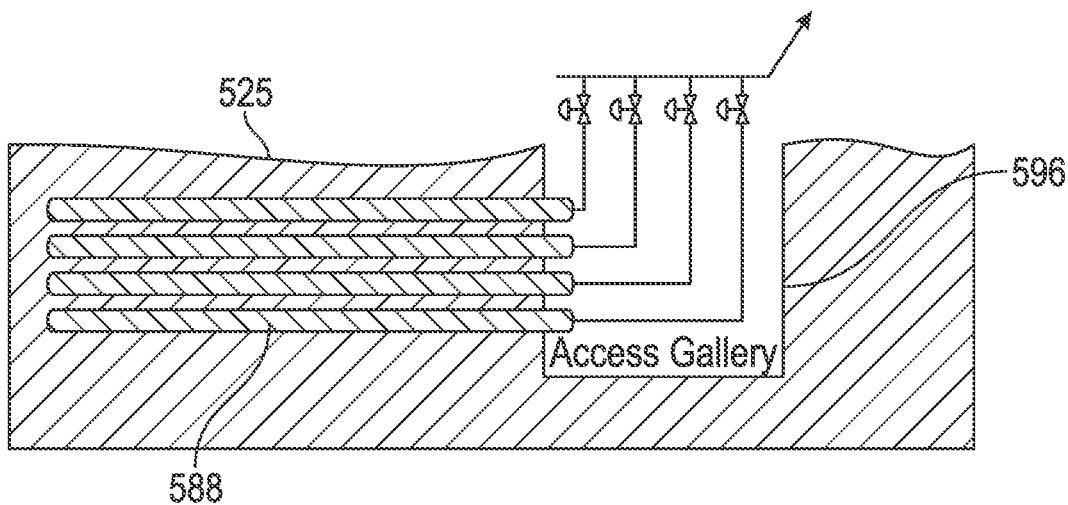

Vessels 588 in any configuration can be installed fully subsurface or with access gallery 596 at the end for maintenance and inspections, or location of various subsystems, as shown in FIG. 16F. Thus, valves connected to ends of vessels 588 can be accessible.

FIGS. 17, 17A and 17B illustrate views of gantry system 600. Gantry system 600 can be used for fabrication and installation of various vessels described herein.

FIG. 17 illustrates an overhead view of gantry system 600 comprising support structures 602 having vertical portions 604 and horizontal portions 606. FIG. 17A is a side view of gantry system 600 showing vertical portions 604 spaced apart. FIG. 17B is a side view of gantry system 600 showing vertical portions 604 connected by horizontal portion 606.

Gantry system 600 can be installed above trench 608. Vertical portions 604 can be installed into ground above grade 525 along opposite sides of trench 608. Horizontal portions 606 can connect vertical portions 604 on opposite sides of trench 608. Vertical portions 604 and horizontal portions 606 can form temporary support structure 602.

Figure 18:
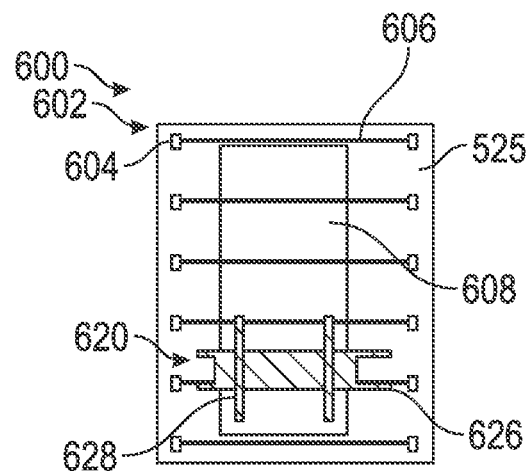
FIGS. 18-18B are schematic diagrams illustrating top and side views of an overhead welding gantry system for fabricating and installing piping systems.
Figure 18A:
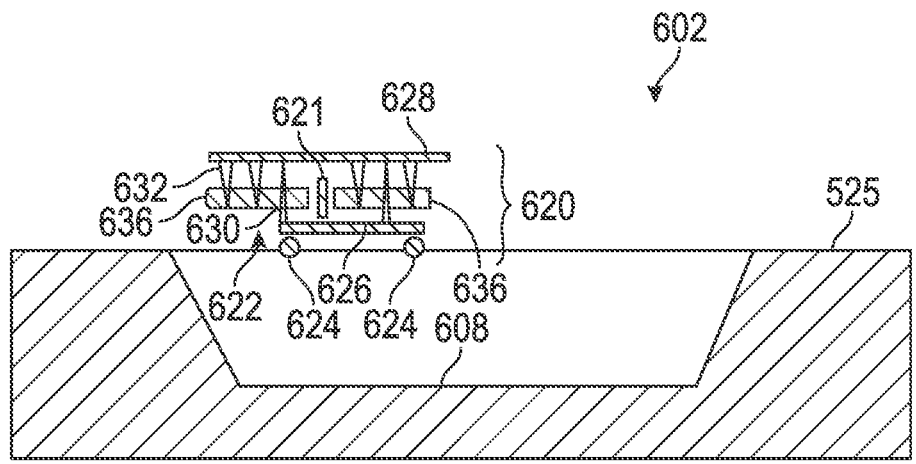
Figure 18B:
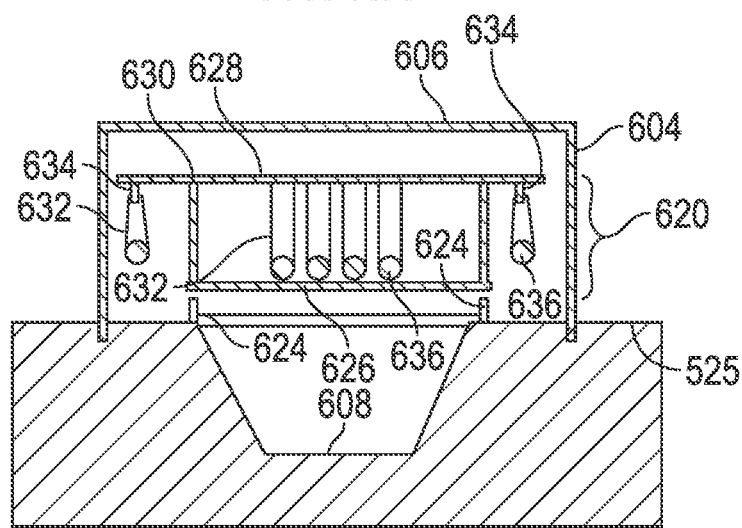

FIG. 18 illustrates an overhead view of welding gantry 620 relative to support structure 602 of gantry system 600. FIG. 18A is a side view of welding gantry 620 showing vessel 622 and welding unit 621, with gantry system 600 omitted for clarity. FIG. 18B is a side view of gantry system 600 showing welding gantry 620 disposed on wheels 624 within support structure 602.

Welding gantry 620 can comprise lower frame 626 to which wheels 624 can be mounted. Lower frame 626 can be connected to upper frame 628 via supports 630. Vessels 622 can be suspended from upper frame 628 using cables 632 and hoists 634. Welding gantry 620 can comprise welding unit 621 that can weld together discrete sections 636 to form vessel 622 that is greater in length than discrete sections 636 individually. Welding unit 621 can be totally enclosed to manage pre and post weld heat treatment, radiography, climate control etc. In examples, welding unit 621 can also be open to atmosphere or partially sheltered in order to provide a lower cost alternative for applications for which the requirements can be less demanding. Welding gantry 620 can be robotically controlled to move along gantry system 600 and to perform welding operations with welding unit 621.

In examples, a first step can be to excavate away earth at grade 525 to provide a location for trench 608 for vessels 622. Following excavation of the site, temporary support structure 602 can be installed. Temporary support structure 602 can comprise vertical portions 604 and horizontal portions 606. After the installation of support structure 602, welding gantry 620 with welding unit 621 can be installed, and various sections 636 of pipes can be joined to obtain the desired vessel length. Welding gantry 620 can include hoist 634 with a trolly for moving pipe sections 636 into place on the work platform. Gantry 620 can include hoists 634 on each side of temporary support structure 602, so that sections 636 of pipe can be provided on either side of the structure, to optimize construction efficiency, such as welding procedures.

Figure 19:
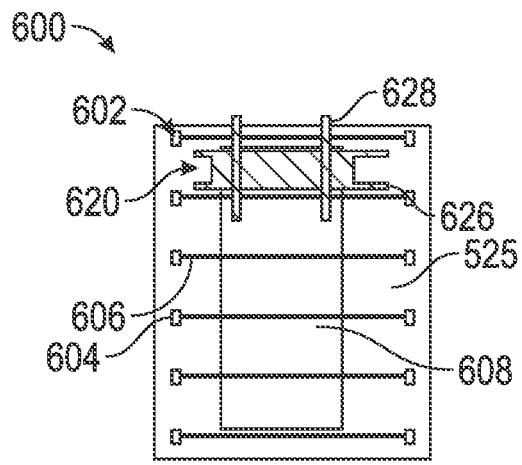
FIGS. 19-19B are schematic diagrams illustrating top and side views of the overhead welding gantry system of FIGS. 18-18B with further sections of pipe assembled.
Figure 19A:
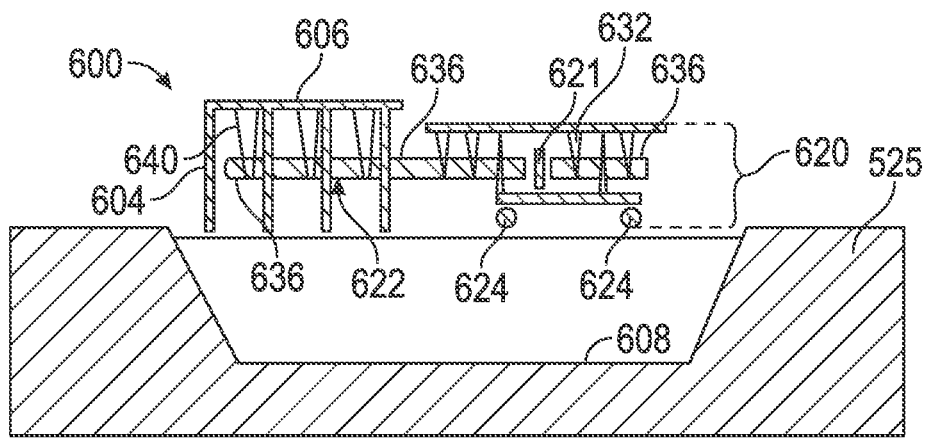
Figure 19B:
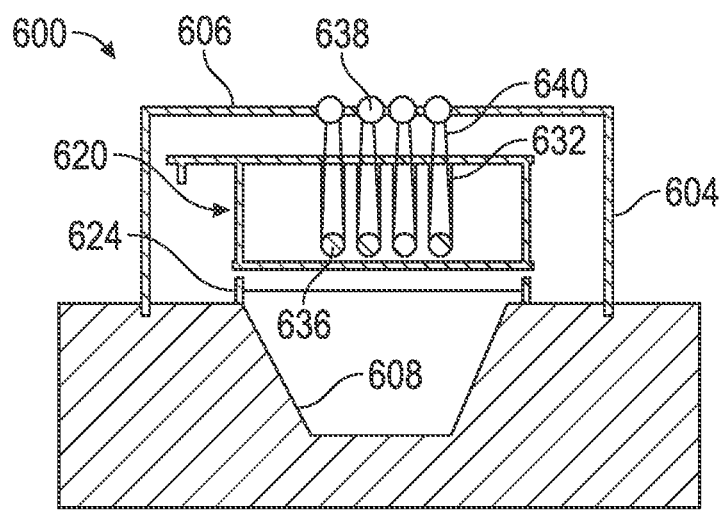

FIG. 19 illustrates an overhead view of gantry system 600 showing the location of welding gantry 620 relative to trench 608. FIG. 19A is a side view of gantry system 600 showing temporary support structure 602 supporting section 636 of assembled pipe forming vessel 622 and welding gantry 620 supporting another section 636 of pipe. FIG. 18B is a side view of gantry system 600 showing temporary support structure 602 and welding gantry 620 holding sections 636 of pipe at the same horizontal level.

Figure 20:
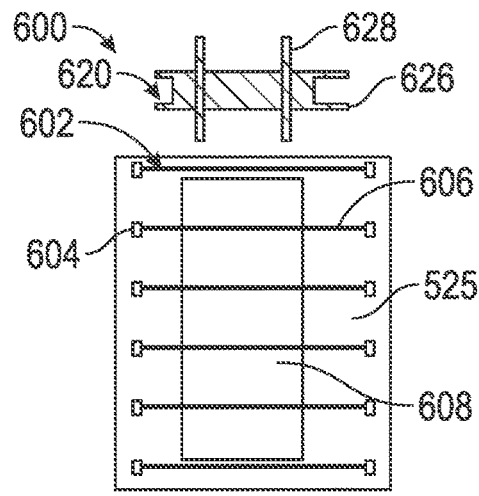
FIGS. 20-20B are schematic diagrams illustrating an assembled pipe vessel being lowered into a trench.
Figure 20A:
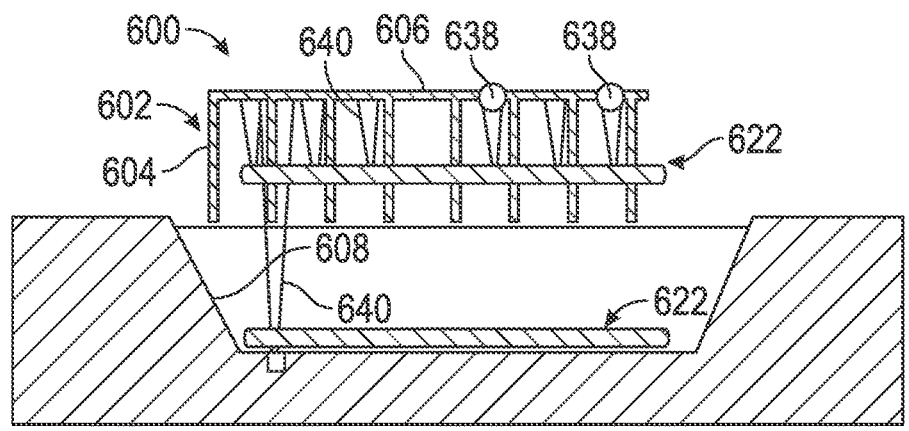
Figure 20B:
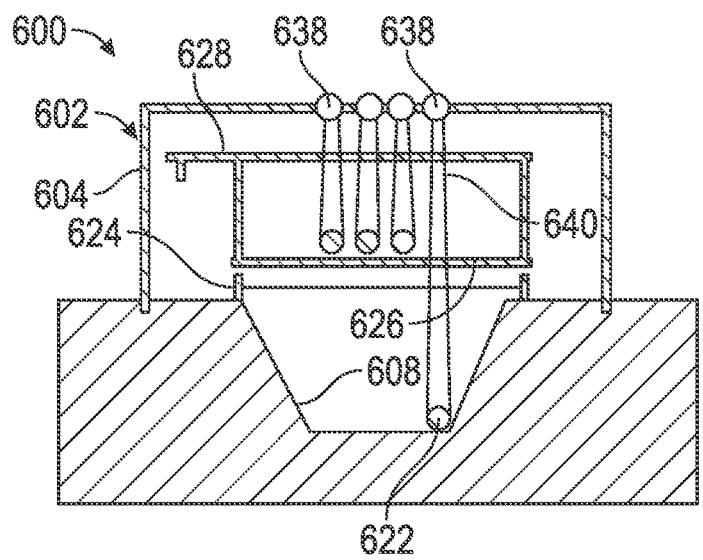

FIGS. 20-20B illustrate further construction details and installation steps relating to use of system 600. Temporary support structure 602 can include wire ropes 640 that are connected to synchronized hoists 638 in order to evenly lower vessels 622 into trench 608. Welding gantry 620 can be supported by structure 602, beneath sections 636 of pipe, and can move from section to section to weld together the ends thereof to form vessels 622 of desired length.

Figure 21:
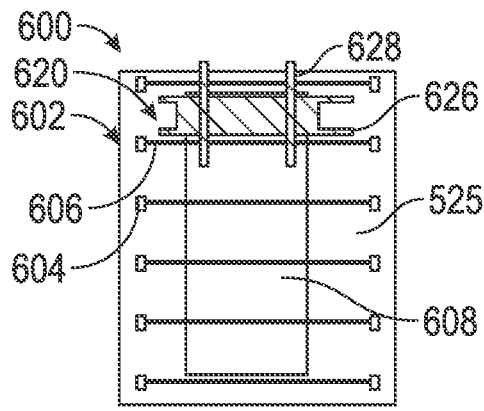
FIGS. 21-21B are schematic diagrams illustrating a second pipe vessel being assembled.
Figure 21A:
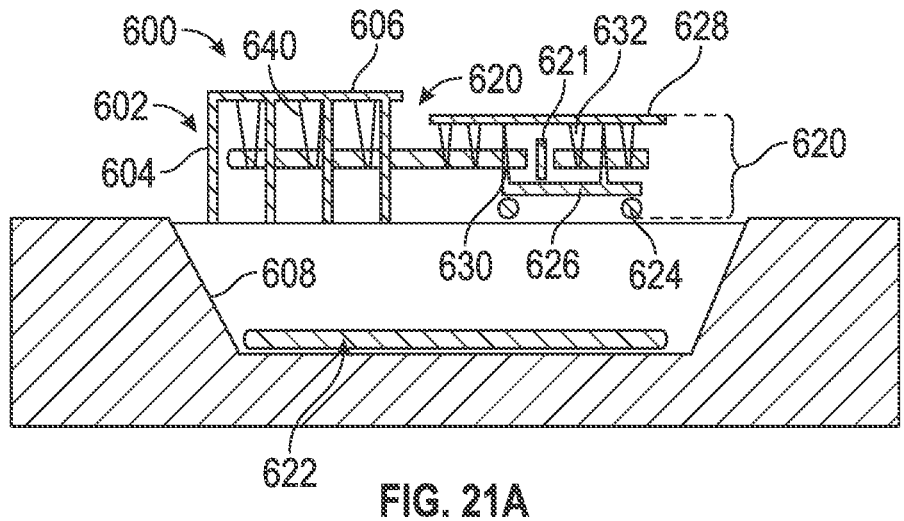
Figure 21B:
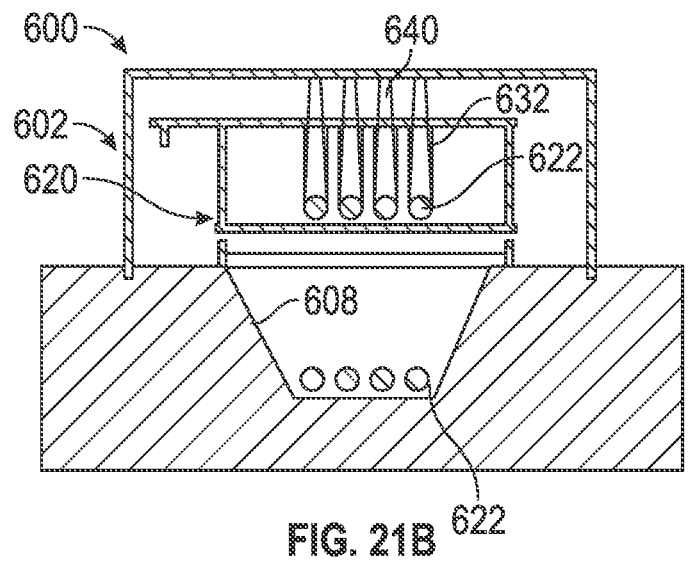
Figure 22:
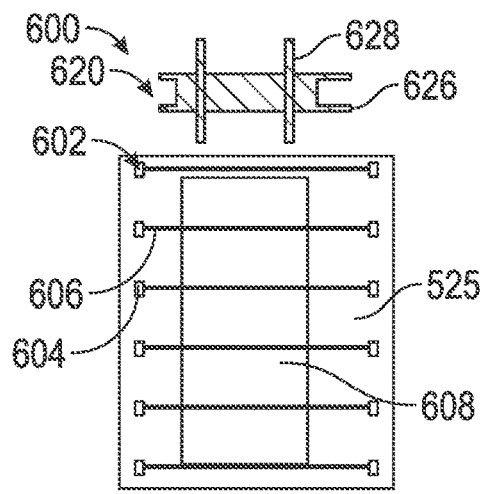
FIGS. 22-22B are schematic diagrams illustrating the second pipe vessel lowered into the trench and a third pipe vessel being assembled.
Figure 22A:
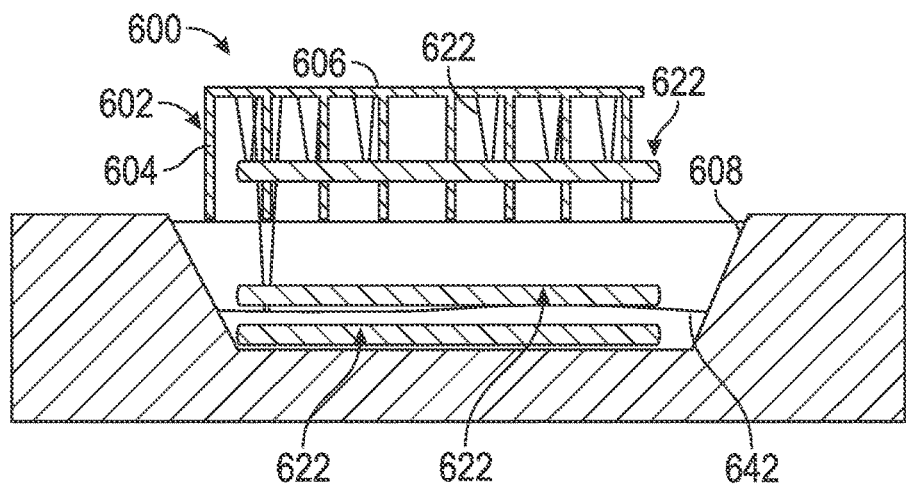
Figure 22B:
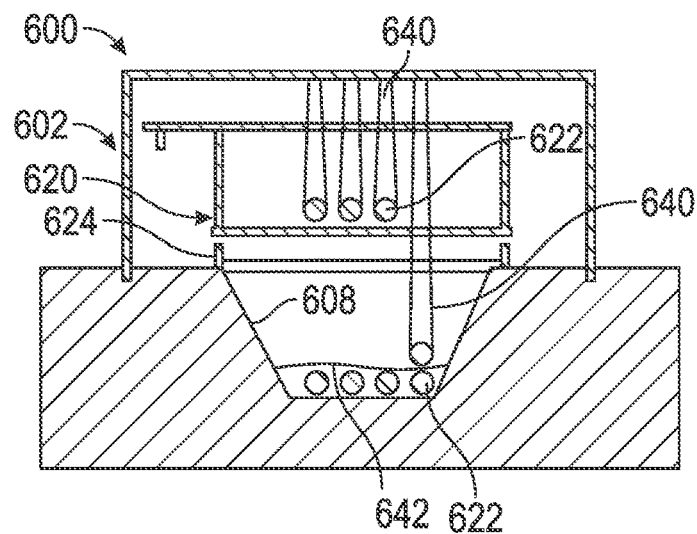
Figure 23A:
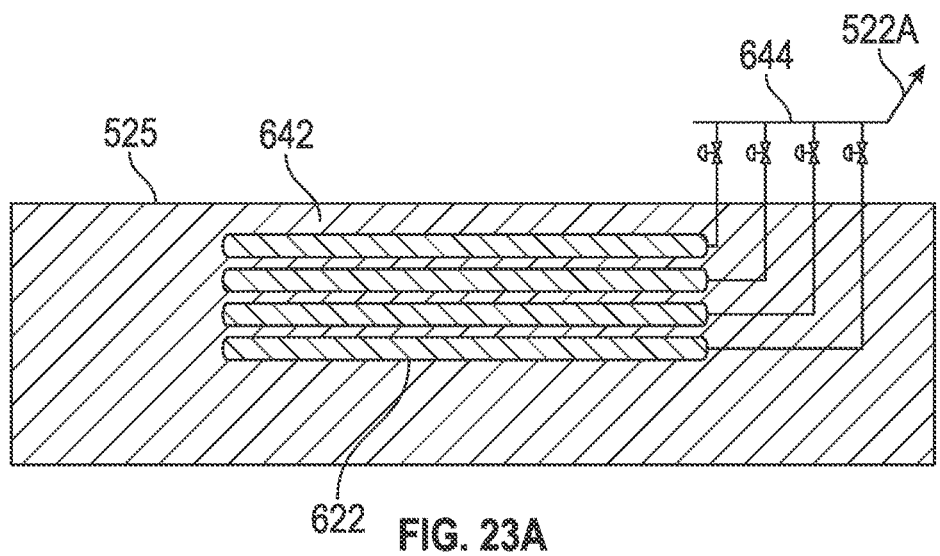
FIGS. 23A-23C are schematic diagrams illustrating a plurality of elongate, horizontal piping systems installed in a plurality of layers with and without an access gallery.
Figure 23B:
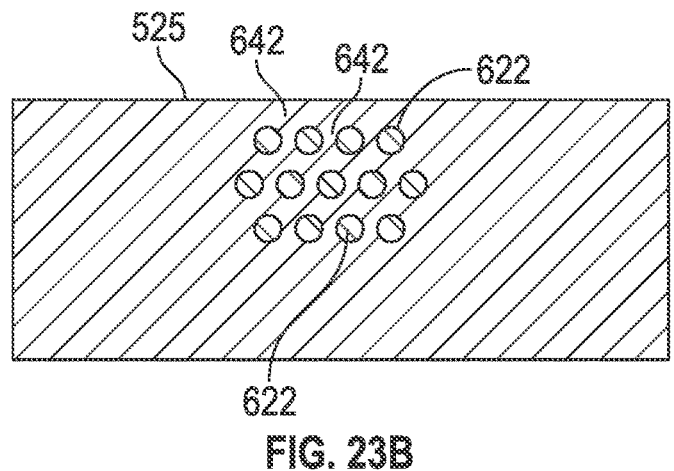
Figure 23C:
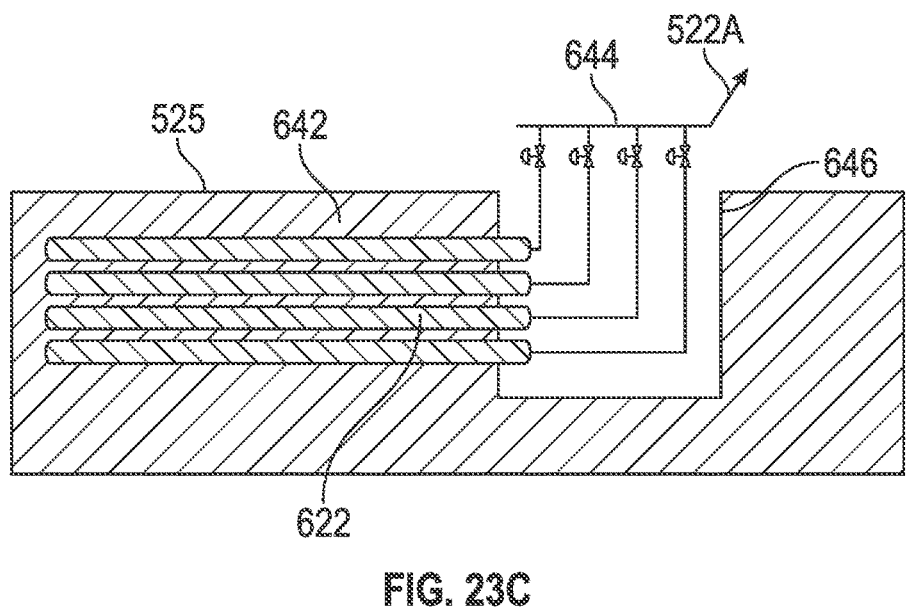

FIGS. 21-22B depict further installation steps using system 600. As each vessel 622 is welded together to the desired length, each vessel 622 can be lowered via hoists 638 into trench 608, and arranged as desired. As a layer of vessels 622 is completed, earth 642 can be backfilled into trench 308 onto the first layer of vessels 622 to support the following layer of vessels 622. If a gallery access is to be employed (see FIG. 16F), earth 636 will not cover the end for the gallery. This will continue until, as is shown in FIG. 23A-23C, the full arrangement of layers of vessels 622 are provided and backfilled with earth, or other support structure as are be appropriate. FIG. 23A shows vessels 622 completely buried with just header pipe 644 extending above grade 525 of earth 642.

Gantry system 600 including temporary support structure 602 and welding gantry 620 can allow for in-place assembly of long lengths of assembled pipe that can be lowered into place as fabricated. Hoists 638 can move side-to-side and lengthwise along support structure 602 to provide access to all of trench 608. Wire ropes 640 can move sections of pipe vertically relative to trench 608. As such, sections of pipe can be moved into various three-dimensional positions in trench 608. Welding gantry 620 can move lengthwise within support structure 602 above trench 608. Hoists 634 can move side-to-side and on gantry 620 to provide access to all of trench 608. Cables 632 can move sections of pipe vertically relative to trench 608. As such, sections of pipe can be moved into various three-dimensional positions in trench 608. Thus, welding gantry 620 can be used to load sections of pipe into support structure 602 and assemble additional sections of pipe onto sections of pipe supported by support structure 602. Welding gantry 620 can move out of the way of support structure 602 or work with support structure 602 to move assembled lengths of pipe sections into trench 608.

FIGS. 24-27 depict storage system 700 over a sequence of steps in which pipe storage systems 702, 704, 706 and 708 are sequentially added, as can accommodate a need for increasing hydrogen storage capacity. Storage system 700 can comprise storage controller 710 for communicating with master controller 108 for communicating with grid 128 (FIGS. 1A and 1B).

Figure 24:
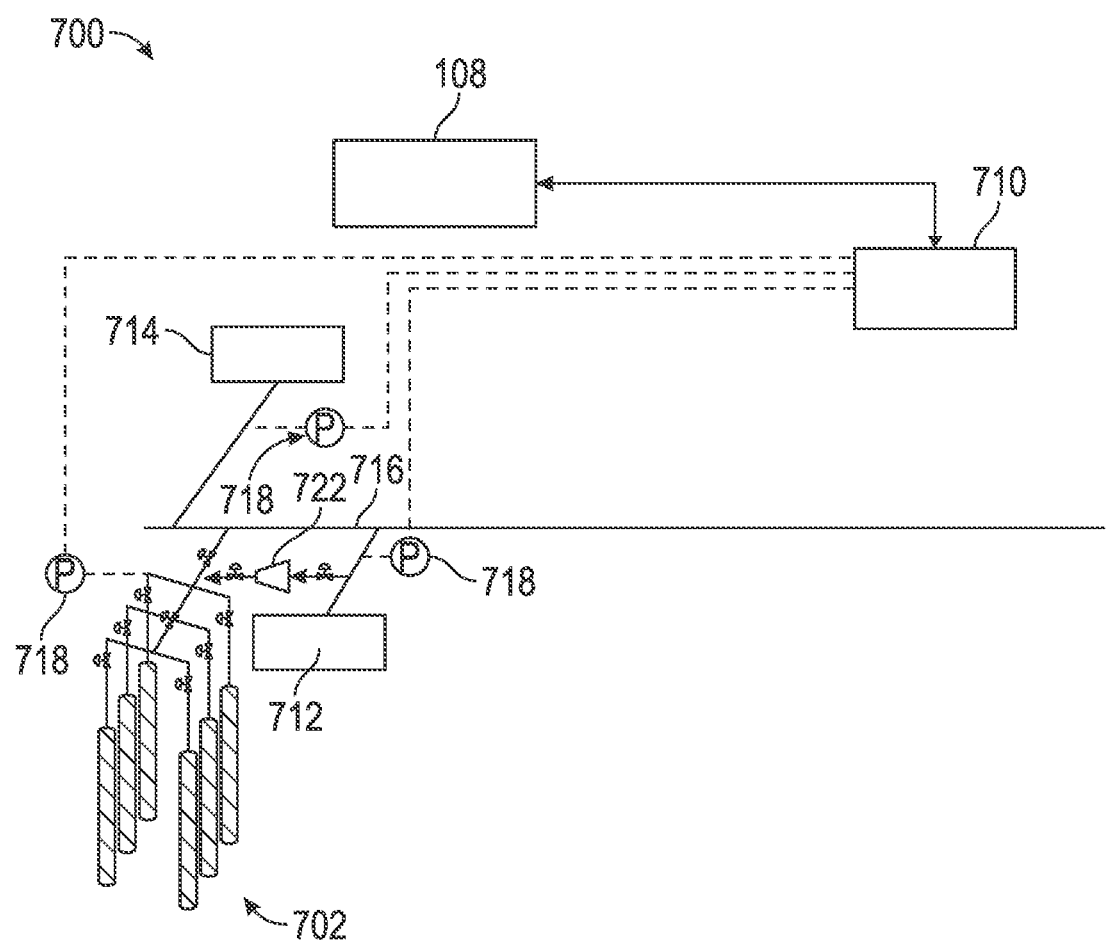
FIG. 24 is a schematic diagram illustrating a plurality of vertically disposed piping systems connected to a grid network including consumers.

FIG. 24 depicts first system 702 that includes hydrogen production unit 712 and consumer 714 that consumes hydrogen. Hydrogen production unit 712 and consumer 714 can be connected by piping 716. Additionally, system 702 can include appropriate sensors 718 and actuators and be in signal and control communication with a storage controller 710, which is capable to operate system 700 and associated subsystems (as described above with reference to other figures herein, particularly FIGS. 11-23C) in order to store and provide hydrogen in response to appropriate conditions, as can be defined, or directed by, grid controller 108. Compressor 722 can be provided in piping 716 to compress and move hydrogen throughout system 702. In examples, first system 702 can be configured similarly as system 550 of FIG. 12.

Figure 25:
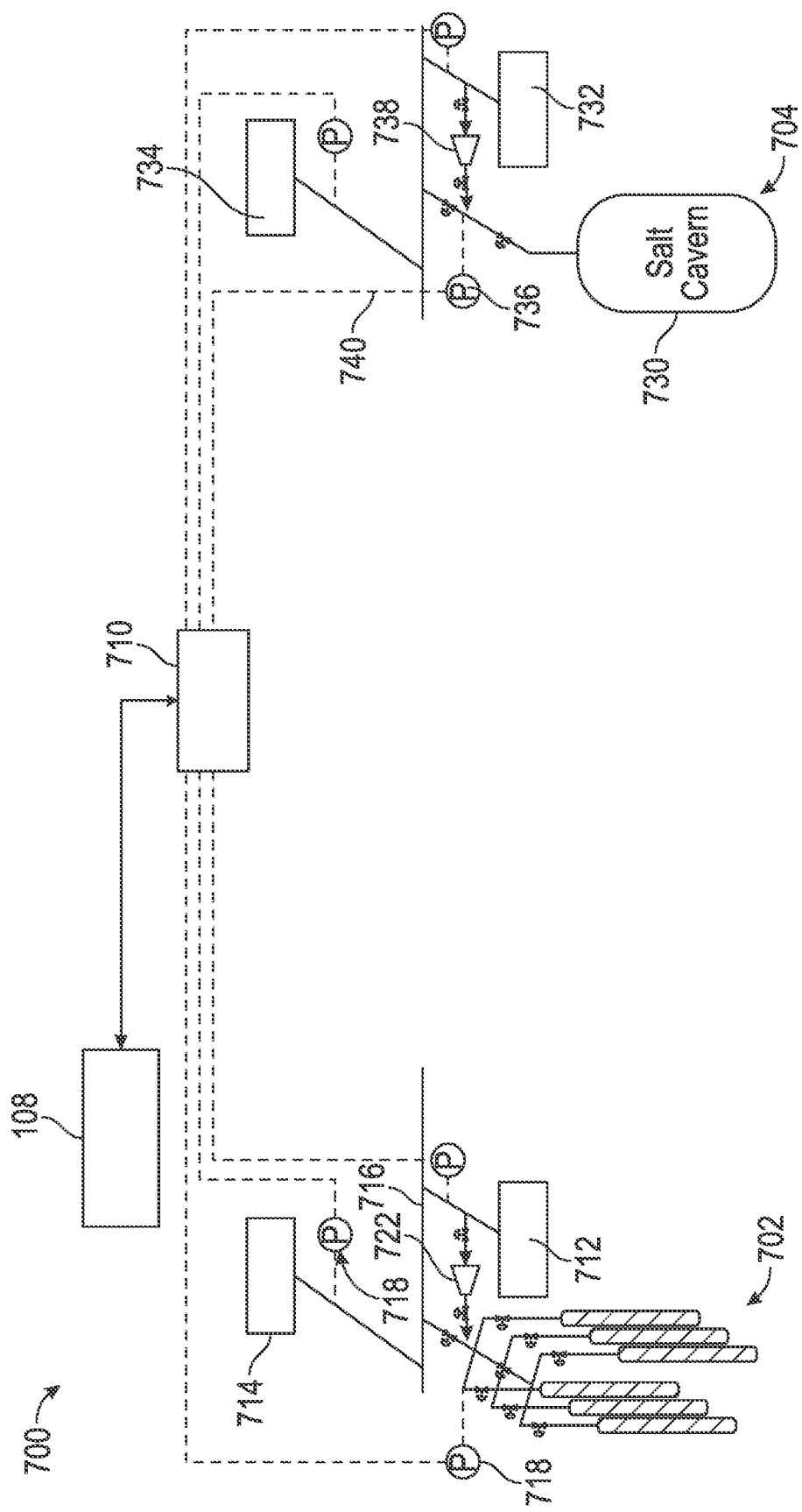
FIG. 25 is a schematic diagram illustrating a plurality of vertically disposed piping systems and an underground storage cavern connected to a grid network including consumers.

FIG. 25 depicts the addition of second storage system 704 having salt cavern 730 as a storage system, rather than the vessels described above. System 704 can have hydrogen production unit 732 and consumers 734. Additionally, system 704 can include appropriate sensors 736 and actuators, and be in in signal and control communication with the storage controller 710, which is capable to operate system 704 associated subsystems (as described above with reference to other figures herein, particularly FIGS. 11-23C) in order to store and provide hydrogen in response to appropriate conditions, as can be defined, or directed by, grid controller 108. Compressor 738 can be provided in piping 740 to compress and move hydrogen throughout system 704. As depicted in FIG. 25, systems 702 and 704 can each be in signal and control communication with controller 710, but are separated in terms of the ability of each to distribute hydrogen. That is, storage of system 702 cannot receive hydrogen from producer 732 of system 704 and cannot provide hydrogen to consumer 734 of system 704. Likewise, the hydrogen stored within system 704 cannot be exchanged with the producer 712 or consumer 714 of system 702.

Figure 26:
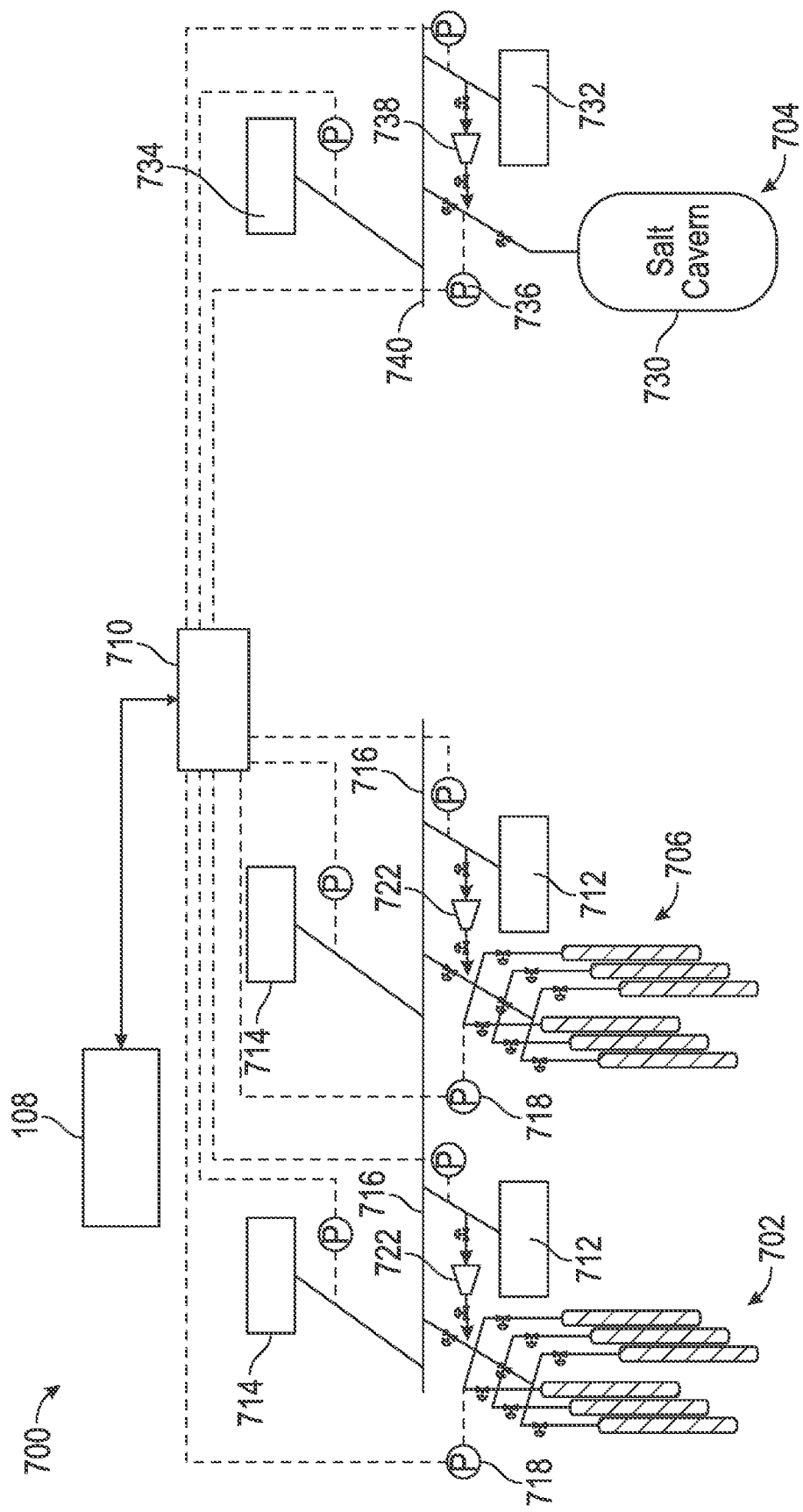
FIG. 26 is a schematic diagram illustrating a plurality of vertically disposed piping system banks and an underground storage cavern connected to a grid network including consumers.

FIG. 26 depicts the addition of third storage system 706. As will be appreciated, storage system 706 includes the same components as system 702 and described with reference to FIG. 24, which will not be described here for the sake of brevity. As depicted in FIG. 26, all systems 702, 704 and 706 can each be in signal and control communication with storage controller 710. Systems 702 and 706 are connected in terms of their ability to distribute hydrogen. That is, storage of system 700 can receive hydrogen from producer 712 of system 706 and can provide hydrogen to consumer 714 of system 706. Likewise, the hydrogen stored within system 706 can be exchanged with producer 712 or consumer 714 of system 700. However, as depicted in FIG. 26, systems 700 and 706 are separated from system 704 in terms of the ability of each to distribute hydrogen to system 704.

Figure 27:
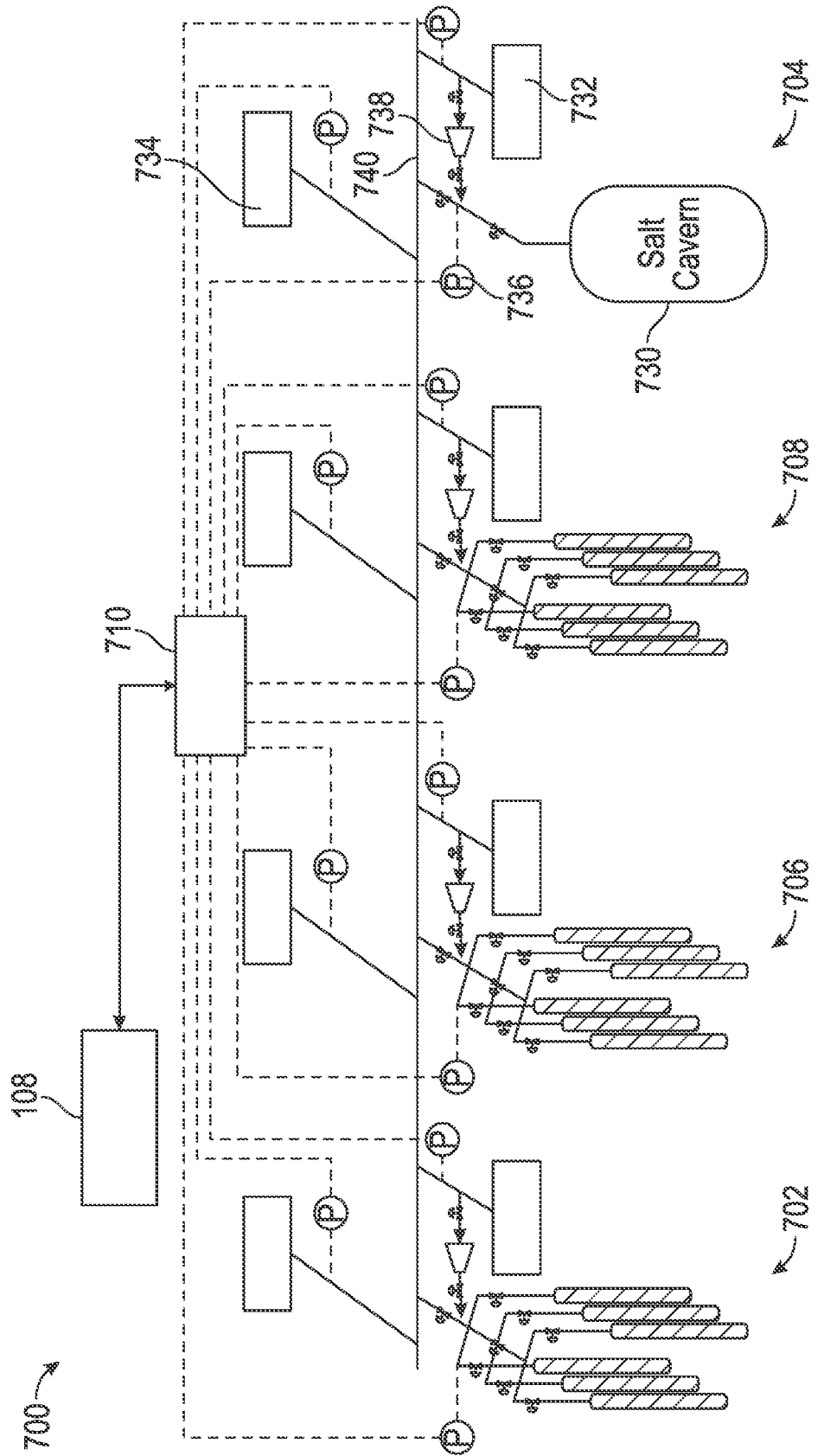
FIG. 27 is a schematic diagram illustrating a plurality of vertically disposed piping system banks and an underground storage cavern connected to each other and a grid network including consumers.
Figure 28:
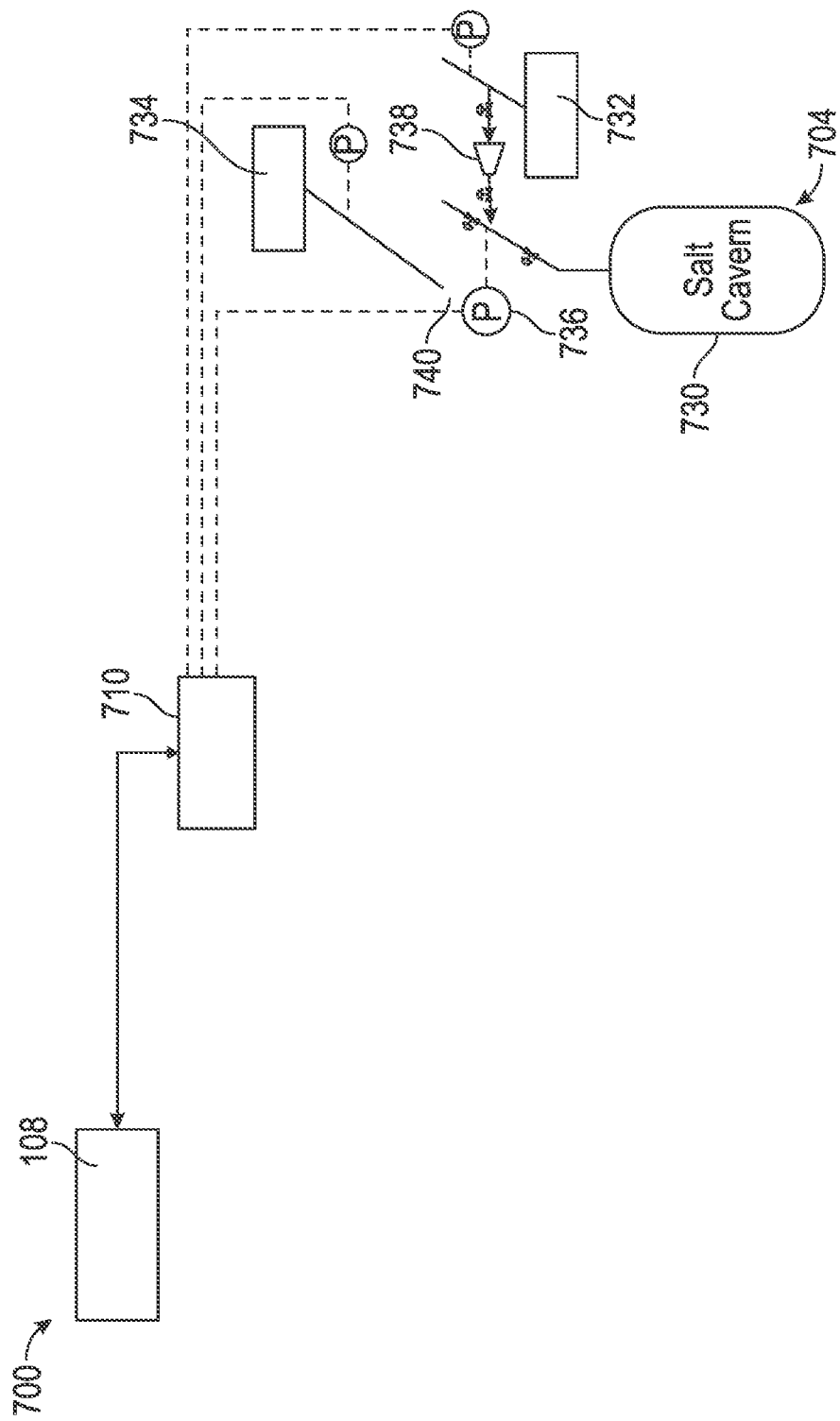
FIG. 28 is a schematic diagram illustrating an underground storage cavern connected to a grid network without piping systems.

FIG. 27 depicts the addition of fourth storage system 708. As will be appreciated, storage system 708 includes the same components as system 702 and described with reference to FIG. 24, which will not be labeled or described here for the sake of brevity. As depicted in FIG. 27, systems 702, 704, 706 and 708 can each be in signal and control communication with the storage controller 710. FIG. 27 depicts that the introduction of system 708 "bridges together" systems 702 and 706 with system 704. Systems 702, 704, 706, and 708 are thereby all connected in terms of the ability of each to distribute hydrogen amongst each other. That is, the storage of each of the systems 702, 702, 704 and 708 can receive hydrogen from producers 712 and producer 732 of any of the other systems 702, 704, 706 and 708 and can provide hydrogen to consumers 714 and producer 734 of any of the other systems 702, 704, 706 and 708. In such a situation, the vast storage quantities of hydrogen related to the salt cavern 704 can be utilized by the other systems. Additionally, if any hydrogen producer from any of the systems 702, 704, 706, or 708 becomes inoperative, or is unavailable as a result of maintenance or repair, the hydrogen produced or stored by any of the other systems can be available for use by the consumer associated with the system that is otherwise unavailable.

Storage system 700 can comprise an example of hydrogen storage system 110 of FIGS. 1A and 1B. In additional examples, hydrogen storage system 110 of FIGS. 1A and 1B can comprise one of systems 702, 704, 706 and 708.

Figure 29:
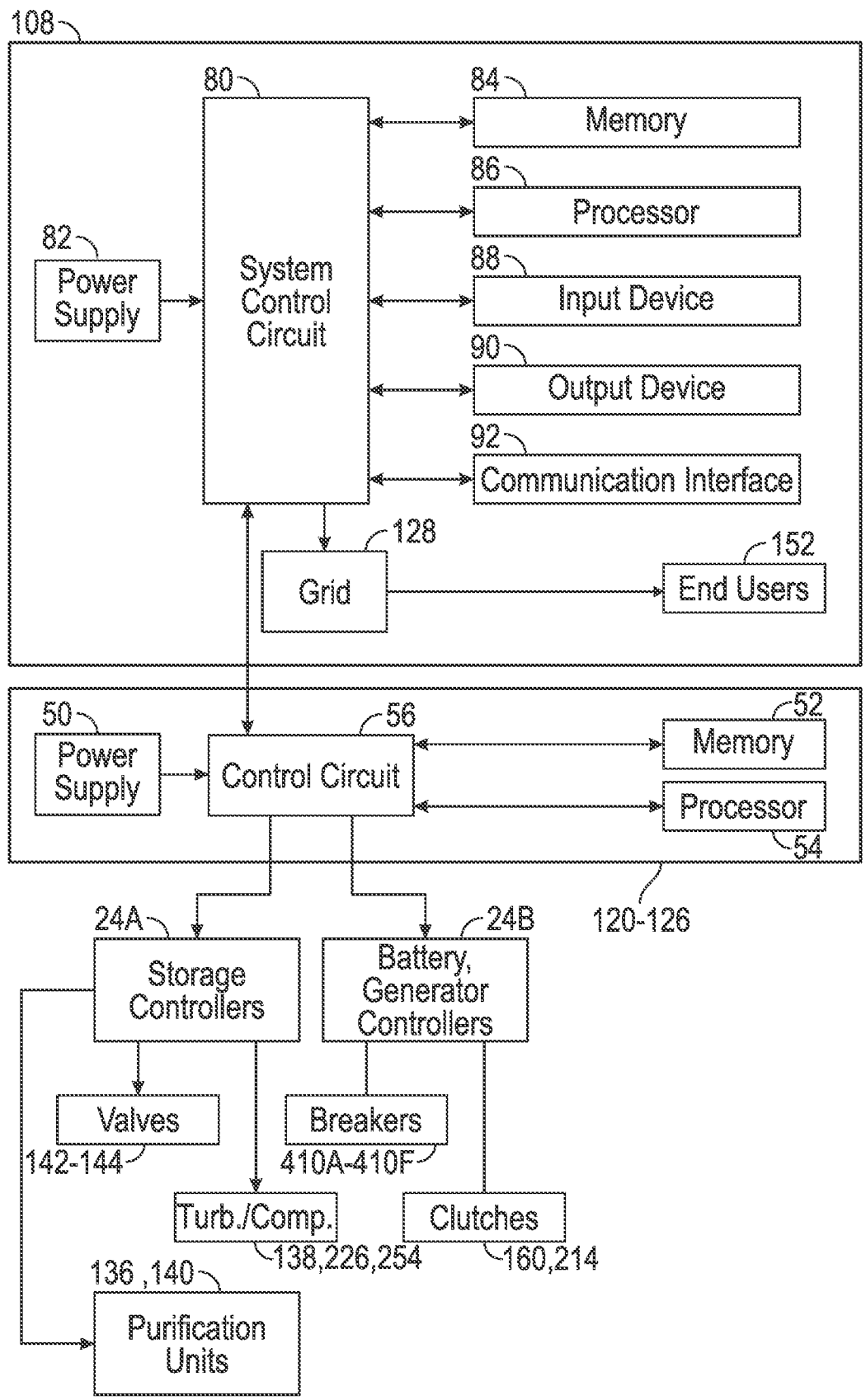
FIG. 29 is a schematic diagram illustrating components of controllers for operating the integrated power production system of FIGS. 1A and 1B.

FIG. 29 is a schematic diagram illustrating components of controller 108 for operating integrated power production system 100 and controllers 120-126 for operating hydrogen production system 106 and GTCC 104. Controller 108 can include circuit 80, power supply 82, memory 84, processor 86, input device 88, output device 90 and communication interface 92. Controller 108 can be in communication with grid 128, which can provide power to end users or consumers 152. Controller 108 can also be in communication with controllers 120 and 122 for hydrogen production system 106 and controllers 124 and 126 for GTCC 104, which can be in communication with one or more sub-system controllers, such as storage controller 24A and battery and generator controller 24B. Controller 24A can be in communication with hydrogen storage system 110 and oxygen storage system 112, as well as various components thereof, such as valves 142-144, compressor 138, turbine 226 and compressor 254, and purification units 136 and 140. Controller 24B can be in communication with batteries 222 and 430, as well as various other components, such as breakers 410A—410F and clutches 160 and 214.

Controllers 120-126 and controllers 24A and 24B can also include various computer system components that facilitate receiving and issuing electronic instructions, storing instructions, data and information, communicating with other devices, display devices, input devices, output devices and the like. For example, power controllers 120-126 can each include power supply 50, memory 52, processor 54, control circuit 56 and the like.

Circuit 80 can comprise any suitable computer architecture such as microprocessors, chips and the like that allow memory 84, processor 86, input device 88, output device 90 and communication interface 92 to operate together. Power supply 82 and power supply 100 can comprise any suitable method for providing electrical power to controller 108 and controllers 120-126, respectively, such as AC or DC power supplies. Memory 84 and memory 52 can comprise any suitable memory devices, such as random access memory, read only memory, flash memory, magnetic memory and optical memory. Input device 88 can comprise a keyboard, mouse, pointer, touchscreen and other suitable devices for providing a user input or other input to circuit 80 or memory 84. Output device 90 can comprise a display monitor, a viewing screen, a touch screen, a printer, a projector, an audio speaker and the like. Communication interface 92 can comprise devices for allowing circuit 80 and controller 108 to receive information from and transmit information to other computing devices, such as a modem, a router, an V/O interface, a bus, a local area network, a wide area network, the internet and the like.

Controller 108 can be configured to operate grid 128 and, as such, can be referred to the "home office" for system 100. Grid 128 can comprise hydrogen production system 106, GTCC 104, renewable energy sources 130 and 132, high voltage transmission lines that carry power from distant sources to demand centers, and distribution lines that connect consumers 152. Grid 128 can be configured to operate at a control frequency where all power input into the grid from disparate sources in input at the same frequency to facilitate integration of the power. In an example, grid 128 can operate at a control frequency of 60 Hertz (Hz).

Controller 108 can determine the demand being placed on grid 128, such as by monitoring the consumption of consumers 152. Controller 108 can coordinate generation of power from GTCC 104 and renewable energy sources 130 and 132. Controller 108 can assign or instruct GTCC 104 how much power output they should contribute to grid 128, and such assignment may be dynamic and reactive based upon the capabilities and availability of any of GTCC 104 and renewable energy sources 130 and 132. Controller 108 can ensure that the total power generated by GTCC 104 and renewable energy sources 130 and 132 meets the power demand of consumers 152. If power demand of consumers 152 exceeds or is less than power supplied by GTCC 104 and renewable energy sources 130 and 132, controller 108 can dictate response strategies for GTCC 104. Thus, controller 108 can interface with controller 124 and 126 for GTCC 104.

Circuit 80 can communicate with, that is, read from and write to, a memory device such as memory 84. Memory 84 can include various computer readable instructions for implementing operation of grid 128. Thus, memory 84 can include instructions for monitoring demand on and power being supplied to grid 128. Circuit 80 can be connected to various sensors to perform such functions. Memory 84 can also include information that can assist controller 108 in providing instruction to controllers 120-126. For example, memory 84 can include the type, size (capacity), age, maintenance history, location, the location within the geography covered by grid 128, and proximity to consumers 152 of each of GTCC 104. Memory 84 can also include instructions for determining the percentage of GTCC 104, as well as other power plants, contribution to the total power supply.

Controllers 120-126 can be configured to operate GTCC 104 and hydrogen production system 106. Memory 52 can include various computer readable instructions for implementing operation of GTCC 104 and hydrogen production system 106. Thus, memory 102 can include instructions for monitoring a power generation assignment from controller 108, instructions for power generation for each generators 156 and 158, and the like. Memory 102 can additionally include instructions for operating electrolyzers 201 and electrolysis units 428.

Additionally, memory 52 can include operational efficiency information, such as productive and economical efficiency information for each of generator units 156 and 158, including gas turbine 114. For example, memory 52 can include the electrical production efficiency of each of turbine 114. Memory 52 can include economical information such as maintenance and economical history for gas turbine 114, as well as time since last service, repair, overhaul, refurbishment status, etc. Memory 52 can also include information relating to operational efficiency of GTCC 104 including the financial efficiency of each of gas turbine 114, such as various contractual obligations for operators of various power plants and manufacturers of and service providers for gas turbine 114.

Controllers 120-126 can operate or be in communication with controllers 24A and 24B to operate compressor 138, turbine 226, compressor 254, valves 142-144, purification units 136 and 140, breakers 410A-410F and clutches 160 and 214, as well as other components of system 100.

Controller 108 can work in conjunction with controllers 120-126 to operate controllers 24A and 24B to maximize or most efficiently operate system 100, such as by controlling operation of hydrogen production systems 106 to produce hydrogen when conditions on grid 128 permit. Thus, memory 52 and memory 84 can include instructions for operating or performing any of the methods described herein, such as those described with reference to TABLE 1 and Cases 1-6 and the seven operating states described with reference to FIG. 10.

VARIOUS NOTES & EXAMPLES

Integrated Power Generation System

Example 1 is a power plant configured to output power to a grid power system, comprising: a hydrogen generation system configured to produce hydrogen; a gas turbine combined cycle power plant comprising: a gas turbine engine configured to combust hydrogen from the hydrogen generation system to generate a gas stream that can be used to rotate a turbine shaft; and a heat recovery steam generator (HRSG) configured to generate steam with the gas stream of the gas turbine engine to rotate a steam turbine; a storage system configured to store hydrogen produced by the hydrogen generation system; and a controller configured to: operate the hydrogen generation system with electricity from the grid power system when the grid power system has excess energy; and balance active and reactive loads on the grid power system using at least one of the hydrogen generation system and the gas turbine combined cycle power plant.

In Example 2, the subject matter of Example 1 optionally includes a power conversion device connecting the hydrogen generation system to the grid power system, the power conversion device comprising: a DC converter to convert DC power from the hydrogen generation system to clean AC power for the grid power system; and an AC converter to convert AC power from the grid power system to DC power for the hydrogen generation system.

In Example 3, the subject matter of any one or more of Examples 1-2 optionally include wherein: the DC converter comprises a chopper converter or thyristor converter; and the AC converter comprises a power conversion system.

In Example 4, the subject matter of any one or more of Examples 1-3 optionally include wherein: the gas turbine engine is connected to a gas turbine electric generator via a first clutch; and the controller is configured to selectively activate the first clutch to permit the gas turbine electric generator to spin freely to absorb reactive loads.

In Example 5, the subject matter of any one or more of Examples 1-4 optionally include wherein: the steam turbine is connected to a steam turbine electric generator via a second clutch; and the controller is configured to selectively activate the second clutch to permit the steam turbine electric generator to spin freely to absorb reactive loads.

In Example 6, the subject matter of any one or more of Examples 1-5 optionally include a battery connected to the grid power system to provide load and frequency support.

In Example 7, the subject matter of Example 6 optionally includes a renewable energy producer connected to the grid system, wherein the battery can be charged from the renewable energy producer without the grid power system.

In Example 8, the subject matter of any one or more of Examples 1-7 optionally include an auxiliary burner configured to burn hydrogen from the hydrogen production system to heat the hydrogen production system.

In Example 9, the subject matter of any one or more of Examples 1-8 optionally include wherein the hydrogen production system comprises an electrolyzer.

In Example 10, the subject matter of Example 9 optionally includes a heating source for heating the electrolyzer, the heating source comprising a resistance heater or a power conversion device.

In Example 11, the subject matter of any one or more of Examples 9-10 optionally include a heat exchange circuit connected to the electrolyzer to cool or heat the electrolyzer.

In Example 12, the subject matter of Example 11 optionally includes wherein the heat exchange circuit is connected to the gas turbine combined cycle power plant and is provided with steam.

In Example 13, the subject matter of any one or more of Examples 11-12 optionally include wherein: the electrolyzer is further configured to produce oxygen; and the power plant further comprises an oxygen storage system.

In Example 14, the subject matter of Example 13 optionally includes wherein the heat exchange circuit is provided with cooled oxygen from the electrolyzer.

In Example 15, the subject matter of any one or more of Examples 13-14 optionally include an oxygen turbine driven by oxygen from the electrolyzer; and an electrical generator driven by the oxygen turbine.

In Example 16, the subject matter of any one or more of Examples 9-15 optionally include a conduit connecting oxygen output of the electrolyzer to a HRSG of the gas turbine combined cycle power plant.

In Example 17, the subject matter of Example 16 optionally includes m/s or greater.

In Example 18, the subject matter of any one or more of Examples 1-17 optionally include burning the hydrogen in the HRSG using a supplemental firing burner.

In Example 19, the subject matter of any one or more of Examples 1-18 optionally include a natural gas source connected to the gas turbine engine and the gas turbine engine is configured to combust natural gas, hydrogen and combinations thereof.

In Example 20, the subject matter of any one or more of Examples 1-19 optionally include wherein the hydrogen storage system comprises an underground storage system.

In Example 21, the subject matter of Example 20 optionally includes wherein the hydrogen storage system comprises a salt cavern.

In Example 22, the subject matter of any one or more of Examples 20-21 optionally include wherein the hydrogen storage system comprises a plurality of pipes.

In Example 23, the subject matter of Example 22 optionally includes temporary support structure comprising hoists configured to place pipes in a trench; and a welding gantry operable with the temporary support structure to assemble sections of pipe.

Injector

Example 1 is a power plant configured to output power to a grid power system, comprising: an electrolyzer configured to produce hydrogen and oxygen; a gas turbine combined cycle power plant comprising: a gas turbine engine configured to combust hydrogen from the hydrogen generation system to generate a gas stream that can be used to rotate a turbine shaft; and a heat recovery steam generator (HRSG) configured to generate steam with the gas stream of the gas turbine engine to rotate a steam turbine; a storage system configured to store hydrogen produced by the hydrogen generation system; and a nozzle configured to introduce oxygen from the electrolyzer into the HRSG of the gas turbine combined cycle power plant.

In Example 2, the subject matter of Example 1 optionally includes wherein the nozzle comprises: an injector configured to receive fuel; and a housing into which the injector extends and into which the oxygen enters, the housing comprising a plurality of mixing ports arranged radially of the injector to allow mixed fuel and oxygen out of the nozzle.

In Example 3, the subject matter of Example 2 optionally includes wherein the plurality of radial mixing ports are configured to generate mixing vortices to reduce the production of NOX in the gas stream.

Example 4 is a method of combusting fuel using a thermal nozzle, the method comprising: (A) providing oxidant having an oxygen concentration of at least 30 volume percent at an initial velocity less than 300 fps within an oxidant supply duct communicating with a combustion zone; (B) providing fuel separately from oxidant into the oxidant supply duct at a high velocity of greater than 200 feet per second and greater than said oxidant initial velocity entraining oxidant into the high velocity fuel, combusting up to about 20 percent of the oxygen of the oxidant provided into the oxidant supply duct with the fuel to produce heat and combustion reaction products in a combustion reaction, and further entraining combustion reaction products and oxidant into the combustion reaction; (C) mixing combustion reaction products with remaining oxygen of the oxidant within the oxidant supply duct and raising the temperature of remaining oxidant within the oxidant supply duct; and (I)) passing heated oxidant out from the oxidant supply duct into the combustion zone at an exit velocity which exceeds the initial velocity by at least 300 feet per second; wherein the heated oxidant passes out of the oxidant supply duct from a plurality of orifices arranged in different orientations.

Hybrid Power Converter

In Example 1, the subject matter of Example undefined optionally includes, wherein the power converter is configured to convert: AC power from the grid power system to DC power for the electrolyzer; and DC power from the electrolyzer to AC power for the grid power system.

In Example 2, the subject matter of Example undefined optionally includes, wherein the power converter comprises: a DC converter comprising a chopper converter or thyristor converter; and a AC converter comprising a power conversion system.

In Example 3, the subject matter of Example undefined optionally includes, further comprising a battery configured to absorb active and reactive loads on the grid power system.

In Example 4, the subject matter of Example 3 optionally includes a renewable energy producer configured to supply power to the battery without the grid power system.

Operating State Methods

Example 1 is a method of operating an integrated power plant connected to a grid power system, the method comprising: operating a gas turbine engine to drive a first electric generator to provide power to the grid power system, the gas turbine engine operable on at least one of hydrogen and natural gas; operating an electrolyzer to generate hydrogen and oxygen with electricity from the grid power system; storing hydrogen produced by the electrolyzer in a storage system; and coordinating operation of the gas turbine engine and electrolyzer to power demand of the grid power system.

In Example 2, the subject matter of Example 1 optionally includes wherein coordinating operation of the gas turbine engine and electrolyzer to power demand of the grid power system comprises: starting the gas turbine engine from shut down to operate at maximum output; and shutting down operation of the electrolyzer; wherein the demand of the grid power system is a call for maximum power.

In Example 3, the subject matter of Example 2 optionally includes wherein: the gas turbine engine is starting from 0% load; and the electrolyzer is starting from 100% load operating from renewable energy connected to the grid power system.

In Example 4, the subject matter of any one or more of Examples 1-3 optionally include wherein coordinating operation of the gas turbine engine and electrolyzer to power demand of the grid power system comprises: ramping up operation of the gas turbine engine from a partial load status at a maximum ramp rate; and shutting down operation of the electrolyzer; wherein the demand of the grid power system is a call for maximum power.

In Example 5, the subject matter of Example 4 optionally includes wherein: the gas turbine engine is starting from 30% load and is operating with natural gas; and the electrolyzer is starting from 100% load.

In Example 6, the subject matter of any one or more of Examples 1-5 optionally include wherein coordinating operation of the gas turbine engine and electrolyzer to power demand of the grid power system comprises: ramping down operation of the gas turbine engine from a maximum load status; and starting operation of the electrolyzer; wherein the demand of the grid power system changes from maximum power to a reduced power demand.

In Example 7, the subject matter of Example 6 optionally includes wherein: the gas turbine engine is starting from 100% load and is operating with natural gas and hydrogen from the electrolyzer; and the electrolyzer is starting from 0% load.

In Example 8, the subject matter of any one or more of Examples 1-7 optionally include wherein coordinating operation of the gas turbine engine and electrolyzer to power demand of the grid power system comprises: operating the gas turbine engine in a standby mode; and shutting down operation of the electrolyzer; wherein the demand of the grid power system is constant.

In Example 9, the subject matter of Example 8 optionally includes wherein: the gas turbine engine is starting from being shut down; the electrolyzer is one of a plurality of electrolyzers, wherein 50% of the plurality of electrolyzers are starting from 0% load and 50% of the electrolyzers are starting from 100% load; and wherein power being supplied to the grid power supply by renewable energy output drops.

In Example 10, the subject matter of any one or more of Examples 1-9 optionally include wherein coordinating operation of the gas turbine engine and electrolyzer to power demand of the grid power system comprises: ramping up operation of the gas turbine engine to full speed; and reducing output of the electrolyzer; wherein the demand of the grid power system is increased.

In Example 11, the subject matter of Example 10 optionally includes wherein: the gas turbine engine is brought up to speed with no load and is operating with natural gas and hydrogen from the electrolyzer; and the electrolyzer is starting from 100% load operating from renewable energy connected to the grid power system.

In Example 12, the subject matter of any one or more of Examples 1-11 optionally include wherein coordinating operation of the gas turbine engine and electrolyzer to power demand of the grid power system comprises: ramping up operation of the gas turbine engine from a non-operating state; and shutting down operation of the electrolyzer; wherein the demand of the grid power system is increasing.

In Example 13, the subject matter of Example 12 optionally includes wherein: the gas turbine engine is starting from performing grid condensing operations and initiates operation with natural gas first and then hydrogen; and the electrolyzer is starting from 100% load.

In Example 14, the subject matter of any one or more of Examples 1-13 optionally include operating a heat recovery steam generator (HRSG) to with exhaust gas of the gas turbine engine to rotate a steam turbine to drive a second electric generator.

In Example 15, the subject matter of any one or more of Examples 1-14 optionally include heating the electrolyzer with steam from the HRSG.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A hydrogen generation system comprising:
an electrolyzer system configured to produce hydrogen;
a power conversion device connecting the electrolyzer system to a consumer power grid, wherein the power conversion device comprises an AC converter and a DC converter positioned in series between the electrolyzer system and the consumer power grid, the power conversion device configured to:
convert DC power from the hydrogen generation system to AC power for the consumer power grid; and
convert AC power from the consumer power grid to DC power for the electrolyzer system; and
a controller configured to:
operate the electrolyzer system with electricity from the consumer power grid when the consumer power grid has excess energy; and
balance active and reactive loads on the consumer power grid using the electrolyzer system.

2. The hydrogen generation system of claim 1,
the DC converter is configured to convert DC power from the hydrogen generation system to AC power for the consumer power grid; and
the AC converter is configured to convert AC power from the consumer power grid to DC power for the electrolyzer system.

3. The hydrogen generation system of claim 2, wherein the DC converter is configured to produce clean AC power for the consumer power grid that is free of ripple and harmonics.

4. The hydrogen generation system of claim 2, wherein the DC converter and the AC converter comprise a hybrid converter.

5. The hydrogen generation system of claim 4, wherein:
the DC converter comprises a chopper converter or thyristor converter;
the AC converter comprises an insulated-gate bipolar transistor; and
the DC converter and the AC converter are integrated into a common device.

6. The hydrogen generation system of claim 4, wherein, the power conversion device comprises a bi-directional inverter.

7. The hydrogen generation system of claim 1, further comprising:
a first breaker connecting the power conversion device to the consumer power grid;
a second breaker positioned between the power conversion device and the electrolyzer system; and
a third breaker positioned between the second breaker and the electrolyzer system.

8. The hydrogen generation system of claim 7, further comprising a transformer positioned between the first breaker and the power conversion device.

9. The hydrogen generation system of claim 7, further comprising:
a battery system configured to receive power form the consumer power grid to absorb active and reactive loads on the consumer power grid with the power conversion device;
a first DC/DC converter connected to the battery system; and
a fourth breaker connecting the first DC/DC converter to the power conversion device between the second breaker and the third breaker.

10. The hydrogen generation system of claim 7, further comprising:
a renewable energy producer configured to supply power to the hydrogen generation system;
a second DC/DC converter connected to the renewable energy producer; and
a fifth breaker connecting the second DC/DC converter to the power conversion device between the second breaker and the third breaker.

11. The hydrogen generation system of claim 1, further comprising:
a gas turbine combined cycle power plant comprising:
a gas turbine engine configured to combust hydrogen from the electrolyzer system to generate a gas stream that can be used to rotate a turbine shaft; and
a heat recovery steam generator (HRSG) configured to generate steam with the gas stream of the gas turbine engine to rotate a steam turbine; and
a storage system configured to store hydrogen produced by the hydrogen generation system.

12. The hydrogen generation system of claim 11, wherein:
the gas turbine engine is connected to a gas turbine electric generator via a first clutch;
the controller is configured to selectively activate the first clutch to permit the gas turbine electric generator to spin freely to absorb reactive loads;
the steam turbine is connected to a steam turbine electric generator via a second clutch; and
the controller is configured to selectively activate the second clutch to permit the steam turbine electric generator to spin freely to absorb reactive loads.

13. The hydrogen generation system of claim 1, wherein the controller is configured to:
close a first breaker to connect the power conversion device to the consumer power grid; and
close a second breaker and a third breaker to connect the power conversion device to the electrolyzer system;
whereby the power conversion device is allowed to convert AC power from the consumer power grid to DC power to operate the electrolyzer system.

14. The hydrogen generation system of claim 13, wherein the controller is configured to:
close a fourth breaker between the second breaker and the third breaker to charge a battery system.

15. The hydrogen generation system of claim 14, wherein the controller is configured to:
open the third breaker to discharge power from the battery system to the consumer power grid; and
whereby the power conversion device is allowed to convert DC power from the battery system to AC power for the consumer power grid.

16. The hydrogen generation system of claim 14, wherein the controller is configured to:
close a fifth breaker between the second breaker and the third breaker to connect a renewable energy producer to the hydrogen generation system;
whereby the renewable energy producer is allowed to generate electricity for the hydrogen generation system.

17. The hydrogen generation system of claim 16, wherein the controller is configured to:
open the second breaker to charge the battery system with the renewable energy producer;
whereby the power conversion device is allowed to provide reactive power services to the consumer power grid.

18. The hydrogen generation system of claim 14, wherein the controller is configured to:
open the first breaker and the second breaker to operate the electrolyzer system with the battery system.

19. The hydrogen generation system of claim 14, wherein the controller is configured to:
open the second breaker, the third breaker and the fourth breaker to connect the power conversion device to the consumer power grid to provide reactive power services.

20. A hydrogen generation system comprising:
an electrolyzer system configured to produce hydrogen;
a power conversion device connecting the electrolyzer system to a consumer power grid, the power conversion device configured to:
convert DC power from the hydrogen generation system to AC power for the consumer power grid; and
convert AC power from the consumer power grid to DC power for the electrolyzer system;
a controller configured to:
operate the electrolyzer system with electricity from the consumer power grid when the consumer power grid has excess energy; and
balance active and reactive loads on the consumer power grid using the electrolyzer system;
a first breaker connecting the power conversion device to the consumer power grid;
a second breaker positioned between the power conversion device and the electrolyzer system; and
a third breaker positioned between the second breaker and the electrolyzer system.

21. A hydrogen generation system comprising:
an electrolyzer system configured to produce hydrogen;
a power conversion device connecting the electrolyzer system to a consumer power grid, the power conversion device configured to:
convert DC power from the hydrogen generation system to AC power for the consumer power grid; and
convert AC power from the consumer power grid to DC power for the electrolyzer system; and
a controller configured to:
operate the electrolyzer system with electricity from the consumer power grid when the consumer power grid has excess energy;

balance active and reactive loads on the consumer power grid using the electrolyzer system;

close a first breaker to connect the power conversion device to the consumer power grid; and close a second breaker and a third breaker to connect the power conversion device to the electrolyzer system;

whereby the power conversion device is allowed to convert AC power from the consumer power grid to DC power to operate the electrolyzer system.

22. A hydrogen generation system connected to a consumer power grid, the hydrogen generation system comprising:

an electrolyzer system configured to produce hydrogen;

a first access point to the consumer power grid for the electrolyzer system;

a battery storage system for storing electrical power in the electrolyzer system;

a second access point to the consumer power grid for the battery storage system;

a third access point to the consumer power grid for a renewable energy producer;

a power conversion device connecting the electrolyzer system to a consumer power grid, wherein the power conversion device comprises a gateway for all power to the first access point and the second access point and all power from the second access point and the third access point to the consumer power grid, the power conversion device configured to;

convert DC power from the hydrogen generation system to AC power for the consumer power grid; and convert AC power from the consumer power grid to DC power for the electrolyzer system; and a controller configured to:

operate the electrolyzer system with electricity from the consumer power grid when the consumer power grid has excess energy; and balance active and reactive loads on the consumer power grid using the electrolyzer system.

* * * * *